US012711842B2

(12) United States Patent
Ogawa et al.

(10) Patent No.: US 12,711,842 B2
(45) Date of Patent: Aug. 18, 2026

(54) PRIZE SUPPORT UNIT AND PRIZE ACQUISITION GAME DEVICE

(71) Applicant: SEGA CORPORATION, Tokyo (JP)

(72) Inventors: Masayoshi Ogawa, Tokyo (JP); Akira Wakou, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 187 days.

(21) Appl. No.: 18/828,422

(22) Filed: Sep. 9, 2024

(65) Prior Publication Data

US 2024/0428663 A1 Dec. 26, 2024

Related U.S. Application Data

(63) Continuation of application No. PCT/JP2023/006323, filed on Feb. 21, 2023.

(30) Foreign Application Priority Data

Mar. 9, 2022 (JP) ................................ 2022-036264

(51) Int. Cl.
*G07F 17/32* (2006.01)
*A63F 9/30* (2006.01)

(52) U.S. Cl.
CPC ............ *G07F 17/3297* (2013.01); *A63F 9/30* (2013.01); *G07F 17/3216* (2013.01)

(58) Field of Classification Search
CPC .... G07F 17/3216; G07F 17/3297; A63F 9/00; A63F 9/30
USPC ........................................ 273/440, 447, 448
See application file for complete search history.

(56) References Cited

U.S. PATENT DOCUMENTS 7,648,142 B2 * 1/2010 Watanabe ........... G07F 17/3297 273/448
9,120,008 B2 * 9/2015 Shiino ................... G07F 11/165
2008/0090629 A1 * 4/2008 Matsuda .................. A63F 9/30 463/7

(Continued)

FOREIGN PATENT DOCUMENTS

JP 6307721 B2 4/2018

OTHER PUBLICATIONS

International Search Report issued in corresponding International Application No. PCT/JP2023/006323 mailed Apr. 11, 2023 (7 pages).

(Continued)

*Primary Examiner* — Luan K Bui
(74) *Attorney, Agent, or Firm* — Osha Bergman Watanabe & Burton LLP

(57) ABSTRACT

A prize support unit including: a main body that directly or indirectly supports prizes, and couplers that are disposed around a periphery of the main body and couples the prize support unit with another prize support unit. Each coupler includes: a rotary body that is rotatable with respect to the main body, and a support that sandwiches and supports both sides of the rotary body in a thickness direction, and guides a rotation of the rotary body. The rotary body has, as a first part, a raised part or a recessed part that is disposed on a first surface of the rotary body on one side in the thickness direction, and the support has, as a second part, a recessed part or a raised part that corresponds to the first part and is disposed on a second surface of the rotary body opposite to the first surface.

8 Claims, 35 Drawing Sheets

(56) References Cited

U.S. PATENT DOCUMENTS

| | | | | |
|---|---|---|---|---|
| 2009/0267302 | A1* | 10/2009 | Fukazawa | G07F 17/3295<br>273/447 |
| 2012/0025469 | A1* | 2/2012 | Shiino | G07F 17/3295<br>273/447 |

OTHER PUBLICATIONS

Witten Opinion issued in corresponding International Application No. PCT/JP2023/006323 mailed Apr. 11, 2023 (3 pages).

* cited by examiner

"Weak spring" – During approach movement

"Weak spring" – In contact with prize

"Strong spring" – Moving

"Strong spring" – In contact with prize

PRIZE SUPPORT UNIT AND PRIZE ACQUISITION GAME DEVICE

BACKGROUND

Technical Field

The present invention relates to a prize support unit for configuring a prize display unit of a prize acquisition game device, and to a prize acquisition game device equipped with prize support units.

Description of Related Art

There are conventional prize acquisition game machines such as claw cranes comprising a prize accommodating unit, a prize acquisition unit, a hanging member for hanging the prize acquisition unit, a raising and lowering means for moving the prize acquisition unit up and down, a lift biasing means for biasing the prize acquisition unit in the lifting direction, a lift biasing force changing means for changing the biasing force of the lift biasing means, a movement means for moving the prize acquisition unit in the horizontal direction, a control means for controlling the horizontal movement and the raising and lowering of the prize acquisition unit, an operation means for allowing the player to manipulate the horizontal movement of the prize acquisition unit, and a descent stoppage means for stopping the descent of the prize acquisition unit, wherein the lift biasing force changing means has a drive means, and the drive means is actuated by an operation command from the outside to steplessly vary the biasing force of a biasing member (see, for example, Patent Literature 1).

Patent Literature 1: Japanese Patent No. 6307721

Technological Problem to be Solved by the Invention

With a conventional prize acquisition game device such as that disclosed in Patent Literature 1, the prize acquisition units were linked together with screws. When linking prize acquisition units with screws, a large number of screws are often required to ensure secure linking, and inserting all these screws takes a considerable amount of time and effort. As a result, linking up the prize acquisition units becomes a bottleneck, which ends up reducing the productivity in manufacturing the device.

SUMMARY

One or more embodiments of the present invention are conceived in light of the above technological problem, and provide a prize acquisition game device with which prize support units can be linked together with a simple structure without using any screws, thereby improving the productivity of the linking work.

According to one or more embodiments of the present invention, the prize support unit for the prize display case of the prize acquisition game device comprises a main body that directly or indirectly supports prizes, and couplers that are disposed around a periphery of the main body and couples the prize support unit with another prize support unit; wherein each of the couplers comprises a rotary body that is rotatable with respect to the main body, and a support that sandwiches and supports both sides of the rotary body in a thickness direction of the rotary body, and guides a rotation of the rotary body; the rotary body has a first part, which is a raised part or a recessed part, that is provided on a first surface on at least one side in the thickness direction, the support has a second part, which is a recessed part or a raised part corresponding to the first part, that is provided on a second surface opposite the first surface, the first part and the second part are rotatably engaged, and with the rotation of the rotary body, one portion of the first part maintains engagement with the second part while another portion of the first part can engage with a second part of a support of a coupler of the other prize support unit.

Employing this configuration allows the prize support units to be linked together with a simple structure without using any screws, thereby improving the productivity of the linking work. More specifically, when linking work is performed using this configuration, fewer components are needed in the linking work than when screws are used to perform the linking work, so the linking work can be simplified, which reduces the amount of work and cost entailed by the linking work. As a result, the productivity of the linking work can be improved.

In the prize support unit of one or more embodiments of the present invention, the configuration may be such that the first part has a first side surface, and the second part has a second side surface that contacts the first side surface, and each of the first side surface and the second side surface has an arc shape in a plan view, and the first part is rotatable relative to the second part with a slide of the first side surface along the second side surface.

Employing this configuration allows the second part to be used as a component that guides the rotation of the first part, thereby simplifying the configuration of the couplers. In the prize support unit of one or more embodiments of the present invention, the configuration may be such that the support has a holding space including an opening formed in a side surface of the main body, and the rotary body is positioned inside the holding space such that the first surface intersects the side surface and such that the rotary body can enter and exit the holding space through the opening with the rotation of the rotary body.

Employing this configuration allows the rotary body to easily enter and exit the holding space.

In the prize support unit of one or more embodiments of the present invention, the second part may be configured such that once the opening communicates with an opening of the support of the other prize support unit, the second side surface of the second part and a second side surface of the second part of the other prize support unit are located on a single circle in a plan view.

Employing this configuration allows the prize support units to be linked together smoothly and stably.

In the prize support unit of one or more embodiments of the present invention, the configuration may be such that the first part and the second part respectively have a first stopper and a second stopper that are raised parts on mutually opposing surfaces of the first part and the second part, and the first stopper and the second stopper come into contact with each other, with the rotation of the rotary body, and stop a rotation of the first part relative to the second part.

Employing this configuration allows the rotation of the first part to be stopped with a simple structure.

In the prize support unit of one or more embodiments of the present invention, the configuration may be such that the first stopper and the second stopper come into contact with each other when another portion of the first part engages with the second part of the other prize support unit.

Employing this configuration allows the linking between the prize support units to be easily maintained.

In the prize support unit of one or more embodiments of the present invention, the configuration may be such that the holding space has a second opening that is disposed opposite to said opening, and the rotary body has a main body including the first part and a knob for controlling the rotation of the main body; the knob extends from the main body, through the second opening, to an outside of the holding space, and come into contact with first and second ends of the second opening with the rotation of the rotary body, and while the knob contacts the first end, the entire main body is held inside the holding space, and while the knob contacts the second end, a half of the first part is located outside the holding space and can engage with the second part of the other prize support unit.

Employing this configuration allows the rotation range of the rotary body and the stability of the linking between prize support units to be adjusted with a simple structure.

The prize acquisition game device according to one or more embodiments of the present invention comprises a prize display case that comprises a casing defining a game space and any one of the prize support units described above that supports the prizes in the game space.

Employing this configuration allows the prize support units to be linked together with a simple structure without using any screws, thereby improving the productivity of the linking work.

With one or more embodiments of the present invention, it is possible to provide a prize acquisition game device with which prize support units can be linked together with a simple structure without using any screws, thereby improving the productivity of the linking work.

DETAILED DESCRIPTION

Figure 1:
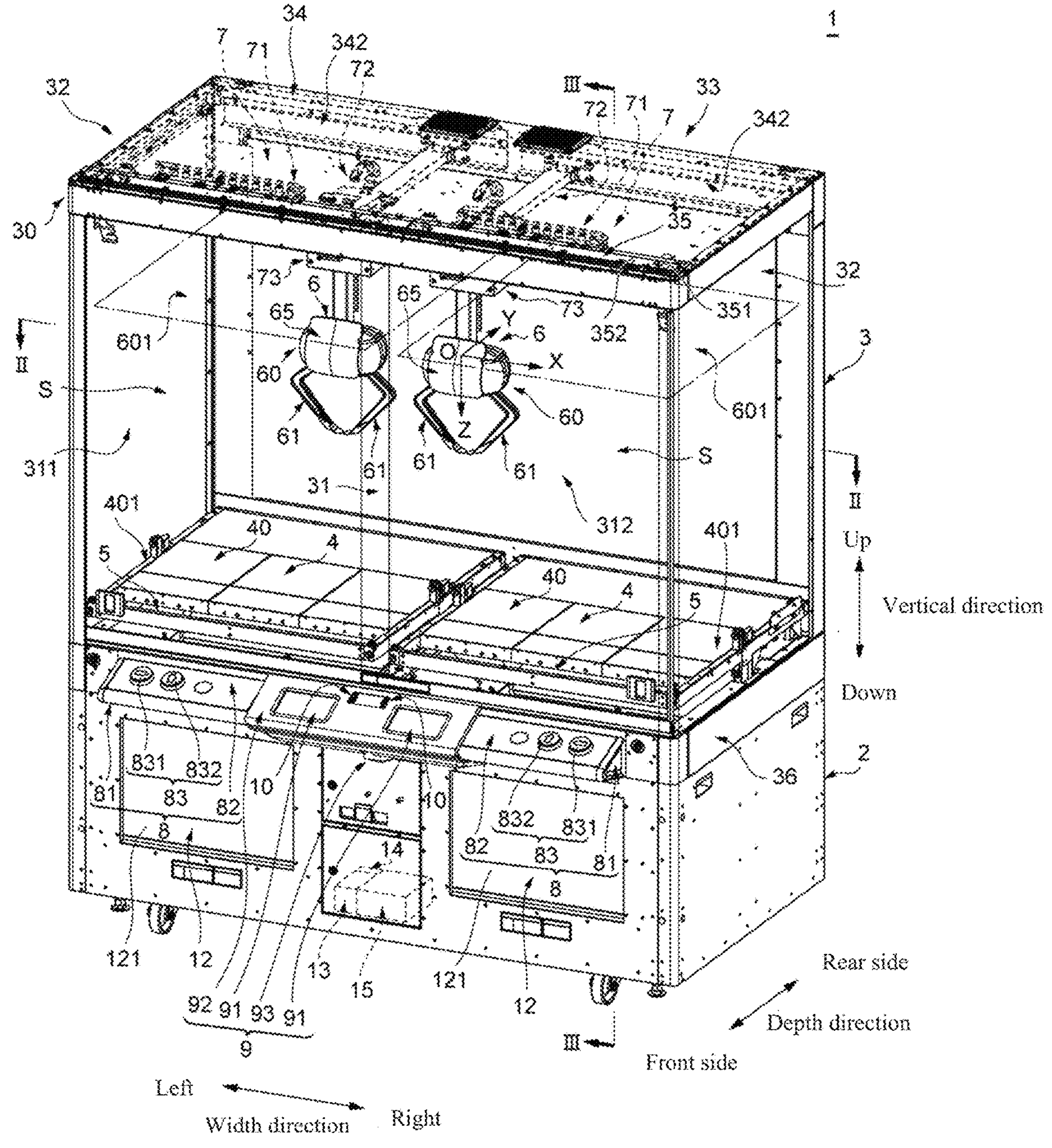
FIG. 1 is an oblique view illustrating the configuration of a prize acquisition game device according to one or more embodiments.

Embodiments will now be described with reference to the drawings. The positional relationships, such as the up, down, left, and right in the drawings, are based on the positional relationships shown in the drawings, unless otherwise specified. Also, the dimensional ratios in the drawings are not limited to those that are depicted. Furthermore, the following embodiments are given for the sake of describing the present invention, and is not intended to limit the present invention to each embodiment alone. Moreover, the present invention can be modified in various ways without departing from the gist thereof.

Overview of Prize Acquisition Game Device 1

First, an overview of the prize acquisition game device 1 according to one or more embodiments will be described with reference to FIG. 1. FIG. 1 is an oblique view of the prize acquisition game device 1.

The prize acquisition game device 1 according to one or more embodiments is an example of a device that allows a prize acquisition game, in which a prize is grasped and acquired, to be played. For example, the prize acquisition game device 1 may be a claw crane. As shown in FIG. 1, the prize acquisition game device 1 comprises a main body 2 that is provided at the bottom part of the prize acquisition game device 1, a prize display unit (or prize display case) 3 that is provided above the main body 2 and has a game space S, a prize support plate 4 that supports prizes in the game space S, a prize drop opening 5 that is provided so as to couple the main body 2 and the prize display unit 3 and that allows the prizes to fall, a prize acquisition unit (or prize acquisition device) 6 that is provided movably in the game space S and is used to acquire prizes, and a drive unit (or drive device) 7 that is provided above the game space S and drives the prize acquisition unit 6.

Here, the game space S is a space in which prizes are displayed and the prize acquisition unit 6 performs the operation of acquiring a prize. The prize may be any object that can be grasped by the prize acquisition unit 6, for example a toy such as a stuffed animal or a doll (including a toy in a box). Also, prizes are displayed in the prize display unit 3 upon being placed on the prize support plate 4.

Also, as shown in FIG. 1, the prize acquisition game device 1 is a two-player game device in which two players can simultaneously play a prize acquisition game. Accordingly, the above configuration of the prize acquisition game device 1 (except for a display unit (or display device) 9 of the main body 2 (discussed below)) is provided in two sets, on the left and right sides in the width direction of the prize acquisition game device 1. Unless specified otherwise, the following description will focus on the set on the right side.

Details of Prize Acquisition Game Device 1

Next, the components of the prize acquisition game device 1, that is, the main body 2, the prize display unit 3, the prize support plate 4, the prize drop opening 5, the prize acquisition unit 6, and the drive unit 7, will be described in order, with reference to FIGS. 1 to 28. FIGS. 1 to 9 are diagrams illustrating the main body 2 and the prize display unit 3 in detail. FIGS. 10 to 18 are diagrams illustrating the prize support plate 4 in detail. FIGS. 19 to 28 are diagrams illustrating the drive unit 7 in detail.

The width direction, depth direction, and vertical direction of the prize acquisition game device 1 and the game space S will sometimes be referred to as the "X direction," the "Y direction," and the "Z direction," respectively. Also, unless specified otherwise, the "user" in the following description includes both the administrator who manages the prize acquisition game device 1 and the players who use the prize acquisition game device 1 to play a prize acquisition game.

Main Body 2

First, the main body 2 will be described in detail with reference to FIGS. 1 to 9.

As shown in FIG. 1, the main body 2 has an operation unit (or operation device) 8 that is provided on the front side, the display unit 9 for displaying play information related to the game, initializing game conditions, and so forth, a coin insertion slot 10 for accepting game fees, a prize accommodating unit 11 that communicates with a prize drop opening 5, and a prize payout opening 12, which is an opening to the outside of the prize accommodating unit 11. Also, the main body 2 has a storage unit (or storage) 13 that stores data and instructions such as programs used in a prize acquisition game, a timer 14 that acquires the current time, and a control unit (or control device) 15 for controlling various operations of the prize acquisition game device 1, which are functional components housed inside the main body 2. The control unit 15 may comprise a central processing unit (CPU) and various coprocessors, a read-only memory (ROM), and random-access memory (RAM), and executes various processing in cooperation with other units/devices.

Operation Unit 8

The operation unit 8 is used to perform various operations related to the prize acquisition game. The operation unit 8 has a housing 81, a control panel 82 that is provided on the top surface of the housing 81, an operation unit 83 that is provided to the control panel 82 and is operated by the user, and a speaker (not shown) that is provided on the lower side of the housing 81.

Figure 4:
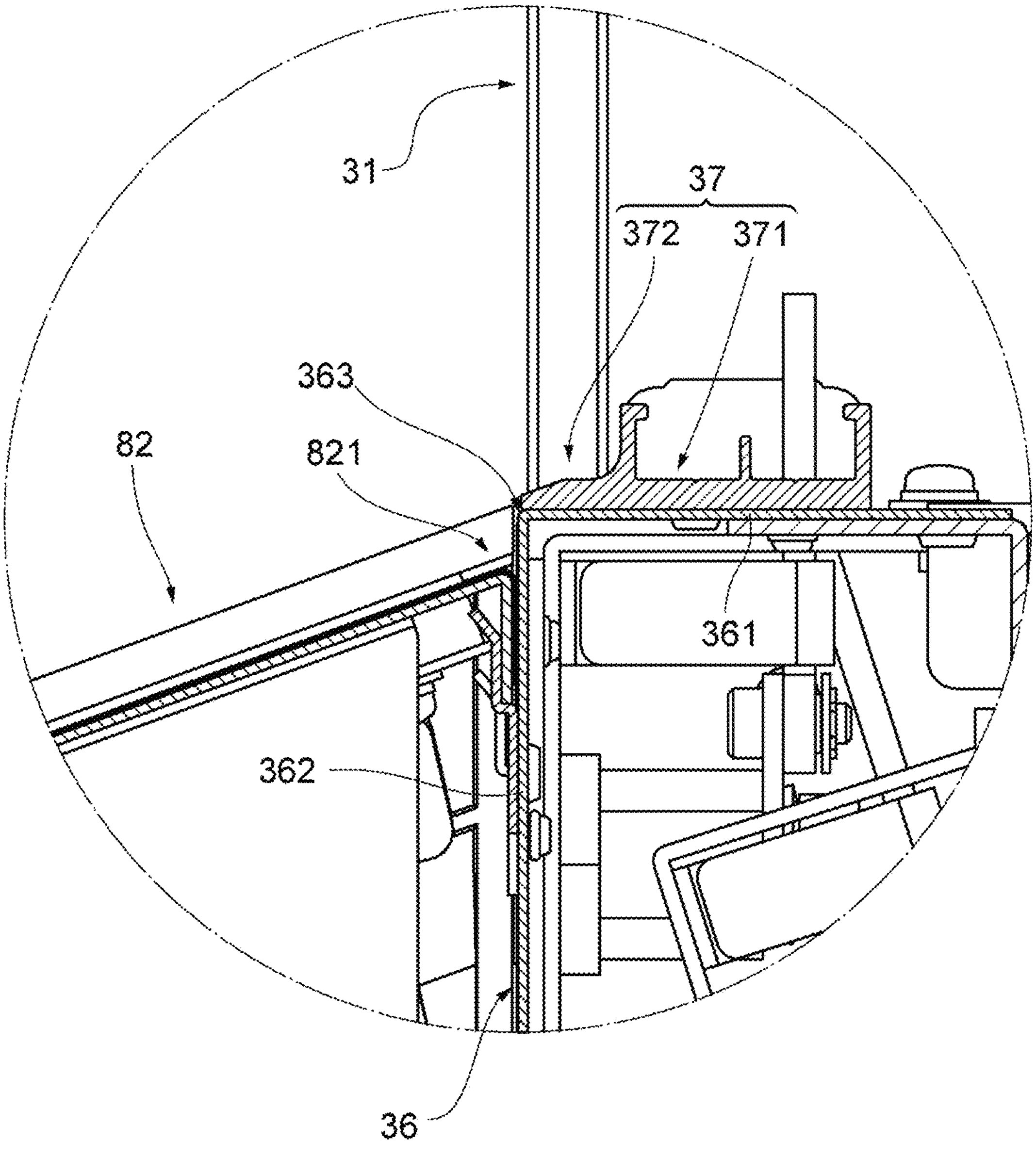
FIG. 4 is a detail view of part A in FIG. 3.

As shown in FIG. 4, the control panel 82 is disposed on the front side of the placing base 36 so as to cover an edge 363 of the placing base 36 of the prize display unit 3 (discussed below). The layout of the control panel 82 will be described in detail below along with a description of the placing base 36 of the prize display unit 3.

The operation unit 83 is configured for operating the prize acquisition unit 6. More specifically, the operation unit 83 is configured to receive a movement request corresponding to an operation of the prize acquisition unit 6 according to a user operation. Here, the movement request is a request made by the user to move the prize acquisition unit 6 in the X direction and/or the Y direction in a specific plane 601 within the game space S.

Also, the operation unit 83 has a first button 831 for receiving a request to move the prize acquisition unit 6 in the X direction, and a second button 832 for receiving a request to move the prize acquisition unit 6 in the Y direction. The operation unit 83 may be configured as something other than a button. For example, the operation unit 83 may be a joystick, a lever, or the like. Also, in addition to the first button 831 and the second button 832, the operation unit 83 may have a third button (see the third button 833 in the example shown in FIG. 5) for receiving a request to move the prize acquisition unit 6 in the Z direction.

The speaker is configured to output game sounds such as background music, alarm sounds, and so on. In a normal state, the speaker outputs game sounds such as background music. Meanwhile, the speaker can output an alarm sound in the event that the prize acquisition game device 1 is subjected to a certain impact.

Display Unit 9

Figure 7:
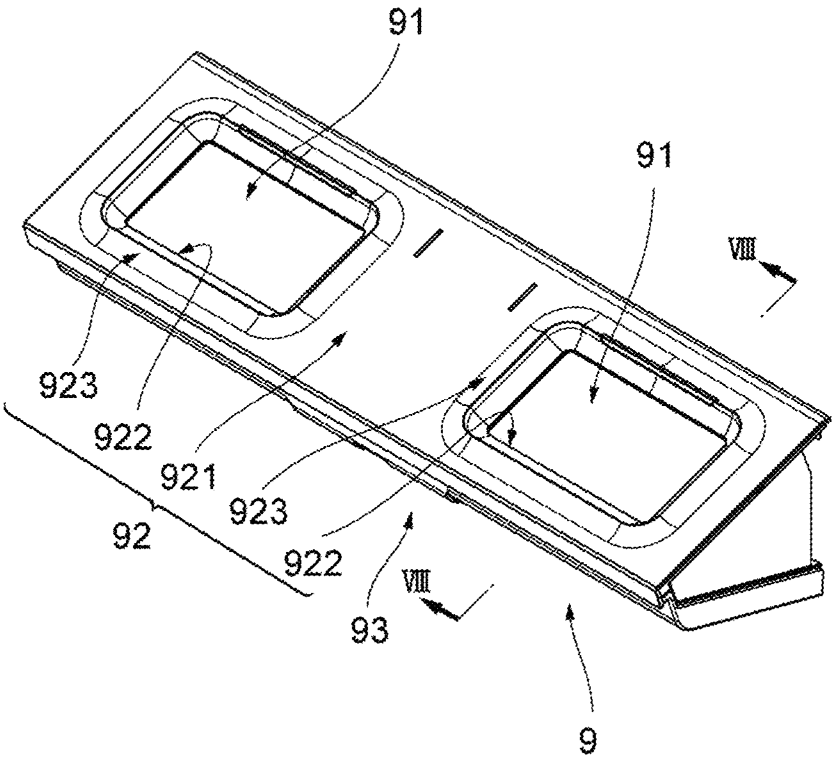
FIG. 7 is a diagram of the configuration of the display unit of the prize acquisition game device according to one or more embodiments.

The display unit 9 is configured to display and operate the sets on the right and left sides of the prize acquisition game device 1. As shown in FIG. 1, the display unit 9 is provided between the operation unit 8 of the set on the right side and the operation unit 8 of the set on the left side in the width direction. As shown in FIG. 7, the display unit 9 has two display and operation panels 91 provided on the upper side of the display unit 9, a panel protection part 92 provided on the two display and operation panels 91, and an administrator key identification unit (or administrator key identification device) 93 provided on the lower side of the display unit 9.

The two display and operation panels 91 are used for displaying play information, making initial settings for the game, and displaying the initial settings information for the prize acquisition game played in the set on the right side or the set on the left side of the corresponding prize acquisition game device 1. Here, the play information includes movement information about the prize acquisition unit 6 and the play history for each play. The initial setting information includes prize acquisition unit setting information related to the moving and stopping of the components of the prize acquisition unit 6 (namely, the main body 60 and the arms 61 discussed below), audio setting information related to the type of audio played through the speaker and its volume, and illumination setting information for the prize display unit 3.

Figure 8:
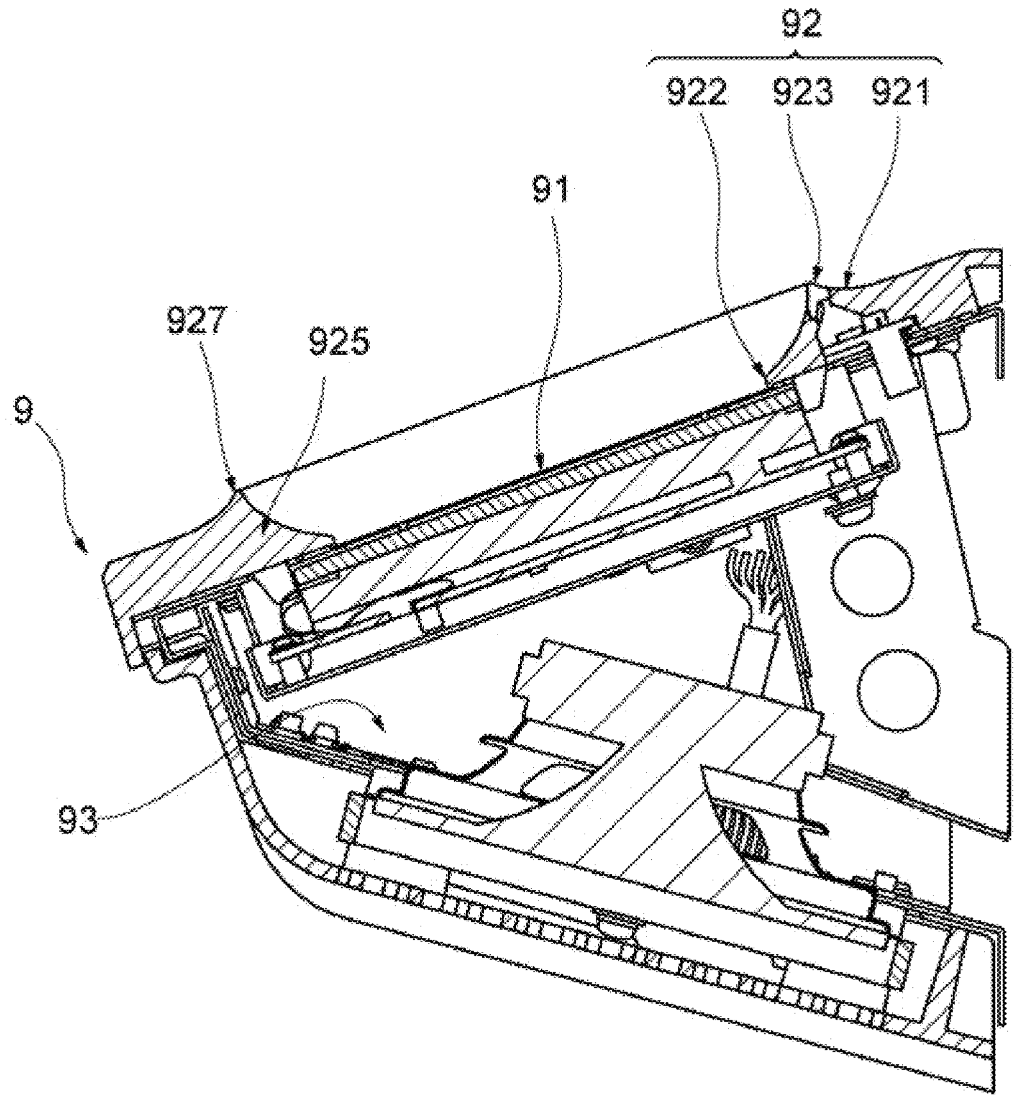
FIG. 8 is a cross sectional view along the VIII-VIII line in FIG. 7.

The panel protection part 92 is configured to prevent damage to the display and operation panels 91 attributable to excessive pressure being exerted on the display and operation panels 91 when the user sits on the display and operation panel 91 or forcibly presses on the display and operation panel 91 with the palm of their hand. As shown in FIGS. 7 and 8, the panel protection part 92 has a main body 921, window portions 922 for exposing the two display and operation panels 91 provided to the main body 921, and protrusion portions 923 provided so as to go all the way around the window portions 922.

The main body 921 and the protrusion portions 923 are formed above the display and operation panels 91 in the thickness direction of the display and operation panels 91. As shown in FIG. 8, the cross-sectional shape of the protrusion portions 923 is substantially triangular. That is, each protrusion portion 923 rises up from a base portion 925 located on the display and operation panel 91 side, becoming thinner toward a distal end portion 927 located on the side away from the display and operation panel 91. Also, the distal end portion 927 of the protrusion portion 923 rises up above the top surface of the main body 921 in the thickness direction of the display and operation panel 91.

With the panel protection part 92 having these protrusion portions 923, the distance from the distal end portions 927 of the protrusion portions 923 to the top surface of the display and operation panel 91 can be set to be greater than when the protrusion portions 923 are not provided. Consequently, even if the user should sit on the part of the panel protection part 92 corresponding to the display and operation panel 91, or forcibly press that part with the palm of their hand, since there is a certain distance from the distal end portions 927 of the protrusion portions 923 to the top surface of the display and operation panel 91, this reduces the pressing force on the display and operation panel 91 caused by the user's action. Also, since the distal end portions 927 of the protrusion portions 923 are thin, if the user sits on the part of the panel protection part 92 corresponding to the display and operation panel 91 or forcibly presses that part with the palm of their hand, the user will feel some pain. Therefore, the presence of distal end portions 927 of the protrusion portions 923 makes it less likely that the user will want to perform one of the above-mentioned actions. As a result, employing the protrusion portions 923 makes it less likely that the panel protection part 92 will be damaged by the user, and the panel protection part 92 can be reliably protected.

In the example shown in FIG. 7, the protrusion portions 923 are provided so as to go all the way around the window portions 922, but this is not the only option. The protrusion portions 923 may be formed only part of the way around the window portions 922, such as on the two sides of the window portions 922 in the width direction.

Figure 9:
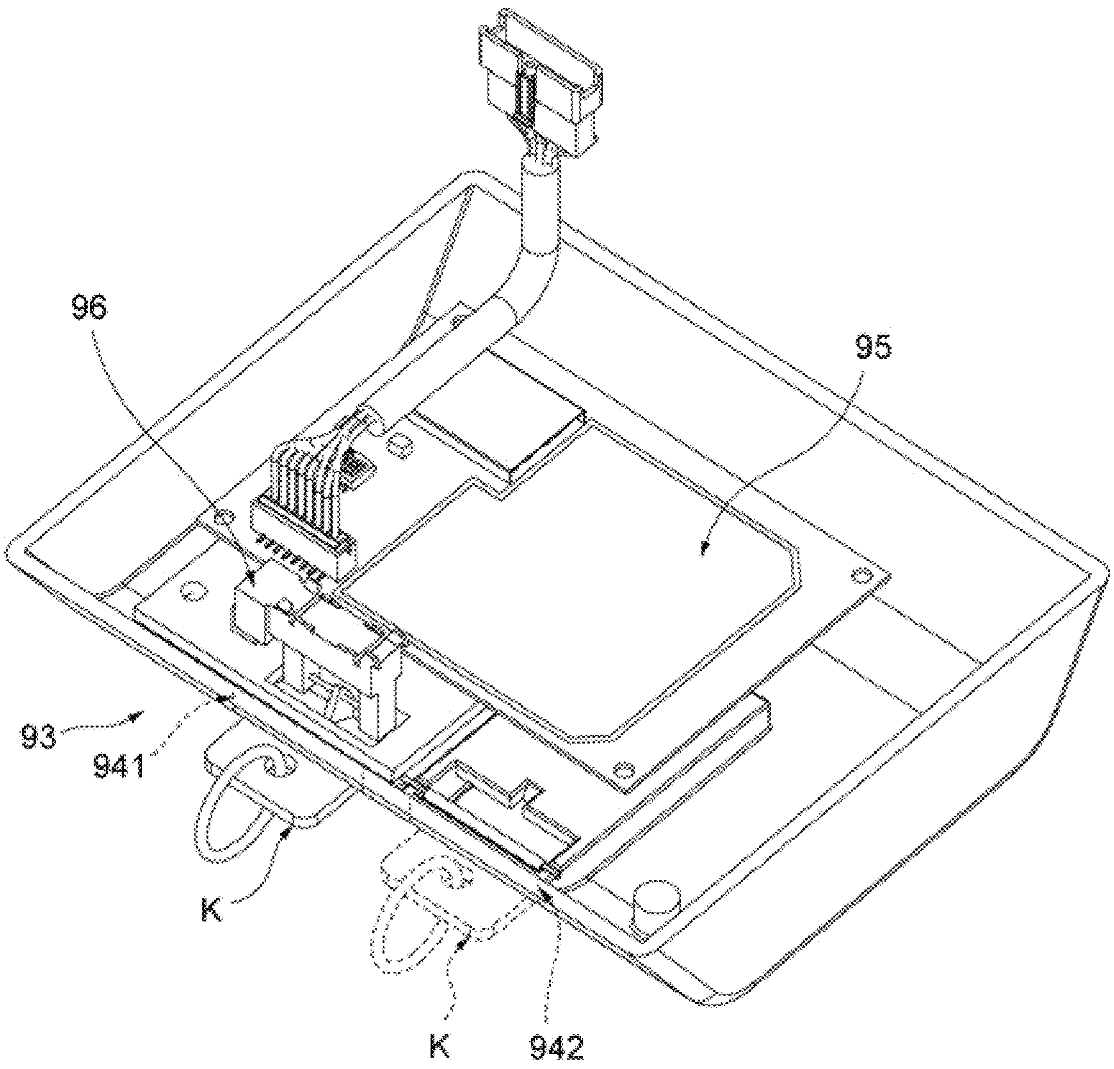
FIG. 9 is a diagram of the configuration of an administrator key identification unit of the prize acquisition game device according to one or more embodiments.

The administrator key identification unit 93 is configured to identify the "ID" of an administrator key K with which the administrator activates the administration mode, and to identify that the administrator key K has been inserted into an insertion port corresponding to either the set on the right side or the set on the left side of the prize acquisition game device 1. Here, the administration mode is a usage mode in which an administrator performs maintenance and makes settings on the prize acquisition game device 1, for example. The administration mode may include other administrative aspects. As shown in FIG. 9, the administrator key identification unit 93 has a left insertion slot 941, a right insertion slot 942, a single reading board 95 for identifying the ID of the administrator key K, and an insertion detector 96.

The left insertion slot 941 is used for inserting the administrator key K when the administrator wishes to activate the administration mode of the set on the left side of the prize acquisition game device 1. The right insertion slot 942 is used for inserting the administrator key K when the administrator wishes to activate the administration mode of the set on the right side of the prize acquisition game device 1.

The single reading board 95 is configured to allow identification of the "ID" of the administrator key K inserted in the left insertion slot 941 and the "ID" of the administrator key K inserted in the right insertion slot 942. When the single reading board 95 has identified the ID of the administrator key K, that information is transmitted to the control unit 15. However, the single reading board 95 is not able to identify whether the administrator key K "has been inserted" into the left insertion slot 941 or the right insertion slot 942.

The insertion detector 96 is used for detecting whether or not the administrator key K has been inserted into an insertion slot. The insertion detector 96 is provided above the left insertion slot 941, for example. When the insertion detector 96 detects that the administrator key K has been inserted into the left insertion slot 941, that information is transmitted to the control unit 15. Meanwhile, if the insertion detector 96 cannot detect that the administrator key K has been inserted into the left insertion slot 941, nothing is transmitted to the control unit 15.

Thus, when the control unit 15 receives transmissions from both the single reading board 95 and the insertion detector 96, it determines that the administrator key K has been inserted into the left insertion slot 941, and activates the administration mode of the set on the left side of the prize acquisition game device 1. Meanwhile, when the control unit 15 receives a transmission from only the single reading board 95 (that is, when it does not receive a transmission from the insertion detector 96), it determines that the administrator key K has been inserted into the right insertion slot 942, and activates the administration mode of the set on the right side of the prize acquisition game device 1.

In the example shown in FIG. 9, the insertion detector 96 is provided above the left insertion slot 941, but this is not the only option. The insertion detector 96 may instead be provided above the right insertion slot 942. In this case, the control unit 15 determines into which insertion slot the administrator key K has been inserted on the basis of whether there has been a transmission from the insertion detector 96, and activates the administration mode of the corresponding set on the left or right side of the prize acquisition game device 1.

Generally, for an administrator key identification unit having different insertion slots, it will be necessary to employ two reading boards corresponding to the two insertion slots in order to identify which of the insertion slots the administrator key K has been inserted into. In contrast, if the above-mentioned insertion detector 96 is employed, even if just the single reading board 95 is used, it will still be easy to identify whether the administrator key K has been inserted into the left insertion slot 941 or the right insertion slot 942. This combination of the insertion detector 96 and the single reading board 95 simplifies the identification processing performed by the control unit 15, and lowers the manufacturing costs of the administrator key identification unit 93, relative to when two reading boards 95 are used.

Prize Accommodating Unit 11

The prize accommodating unit 11 is configured to temporarily accommodate a dropped prize before the user removes from the prize acquisition game device 1 a prize that has dropped out of the prize drop opening 5. The prize accommodating unit 11 is provided below the prize drop opening 5.

Prize Payout Opening 12

The prize payout opening 12 is provided on the front side of the main body 2 so as to permit access to the prize accommodating unit 11. A door 121 that can be opened and closed is attached to the prize payout opening 12. When the door 121 closes, the prize payout opening 12 is closed to prevent prizes from coming out, and to prevent entry of foreign objects, etc. (including for the theft of prizes) into the prize acquisition game device 1 through the prize payout opening 12. On the other hand, when the door 121 opens, the prize payout opening 12 is opened, and the prizes stored in the prize accommodating unit 11 can be taken out.

Control Unit 15

The control unit 15 is configured to control the overall operation of the prize acquisition game device 1. Upon receiving the movement request accepted by the operation unit 83 and the display unit 9 and the time information acquired by the timer 14, the control unit 15 executes a prize acquisition game by controlling the movement of the prize acquisition unit 6 in the game space S, the output of the speaker, the lighting of the prize display unit 3, and so forth based on the data and instructions such as programs stored in the storage unit 13. The control unit 15 will be described in further detail below.

Prize Display Unit 3

Figure 5:
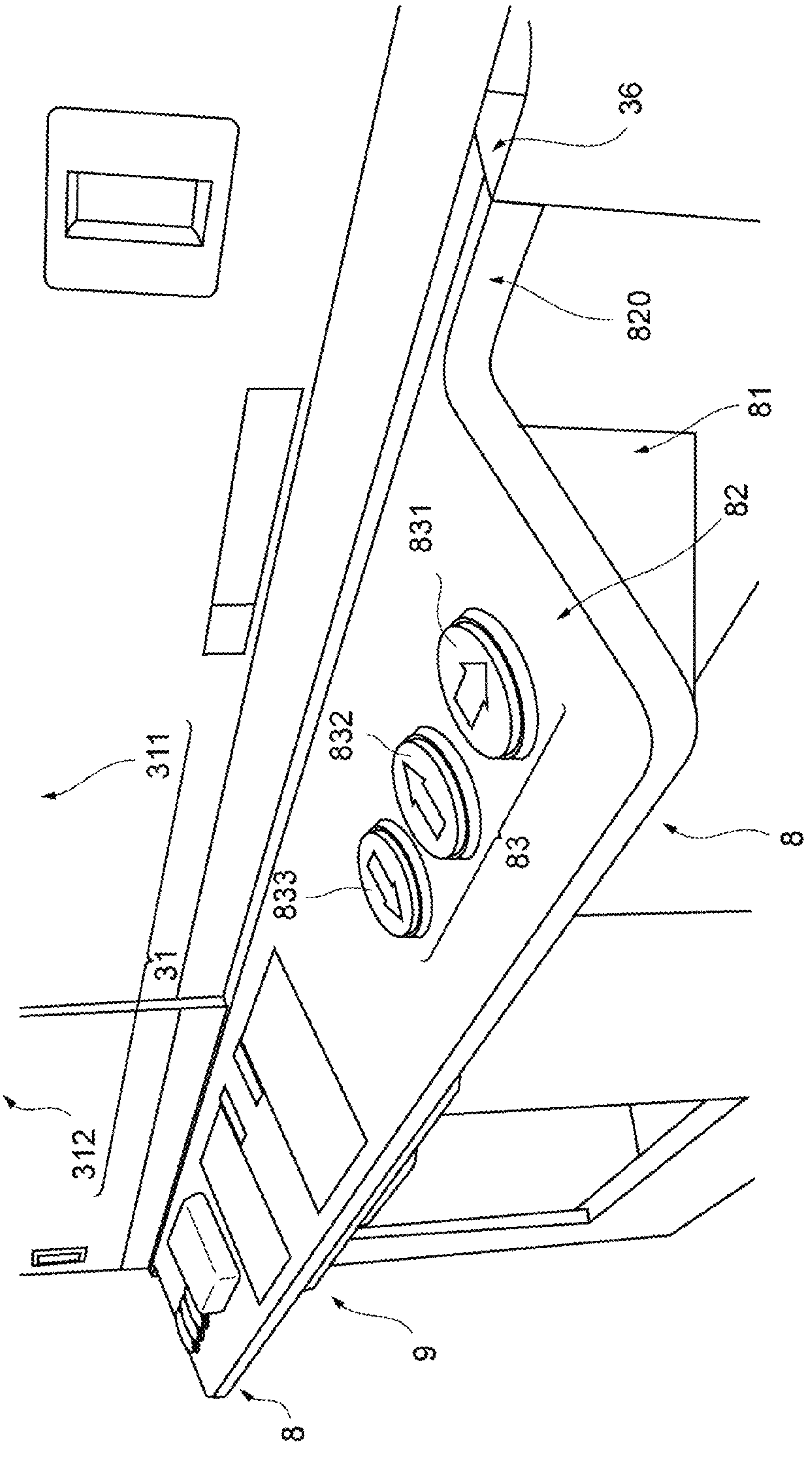
FIG. 5 is an oblique view of a modification example of the control panel of the prize acquisition game device according to one or more embodiments.
Figure 6:
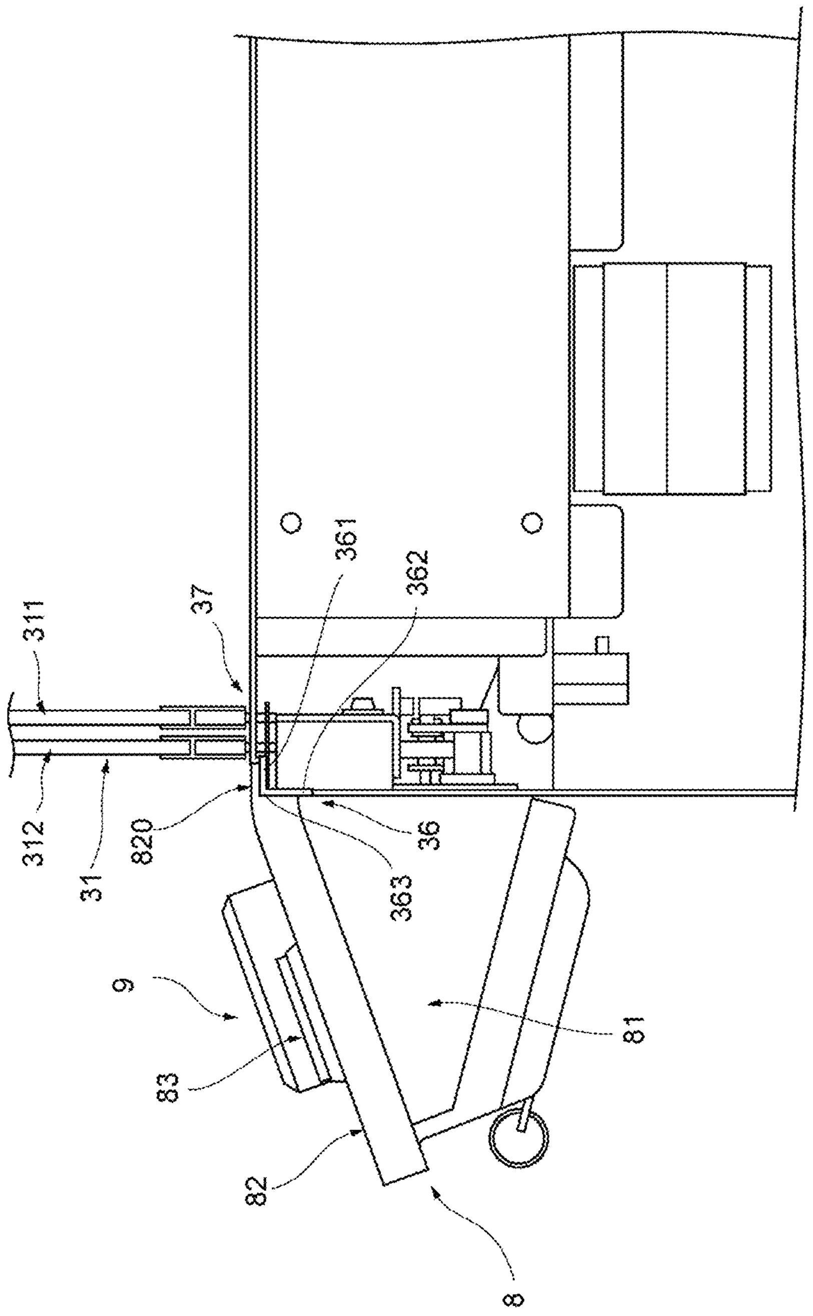
FIG. 6 is a side view of a modification example of the control panel of the prize acquisition game device according to one or more embodiments.

Next, the prize display unit 3 will be described in detail with reference to FIGS. 1 to 6. FIGS. 5 and 6 are diagrams illustrating modification examples of the cover portion of the placing base 36.

Figure 2:
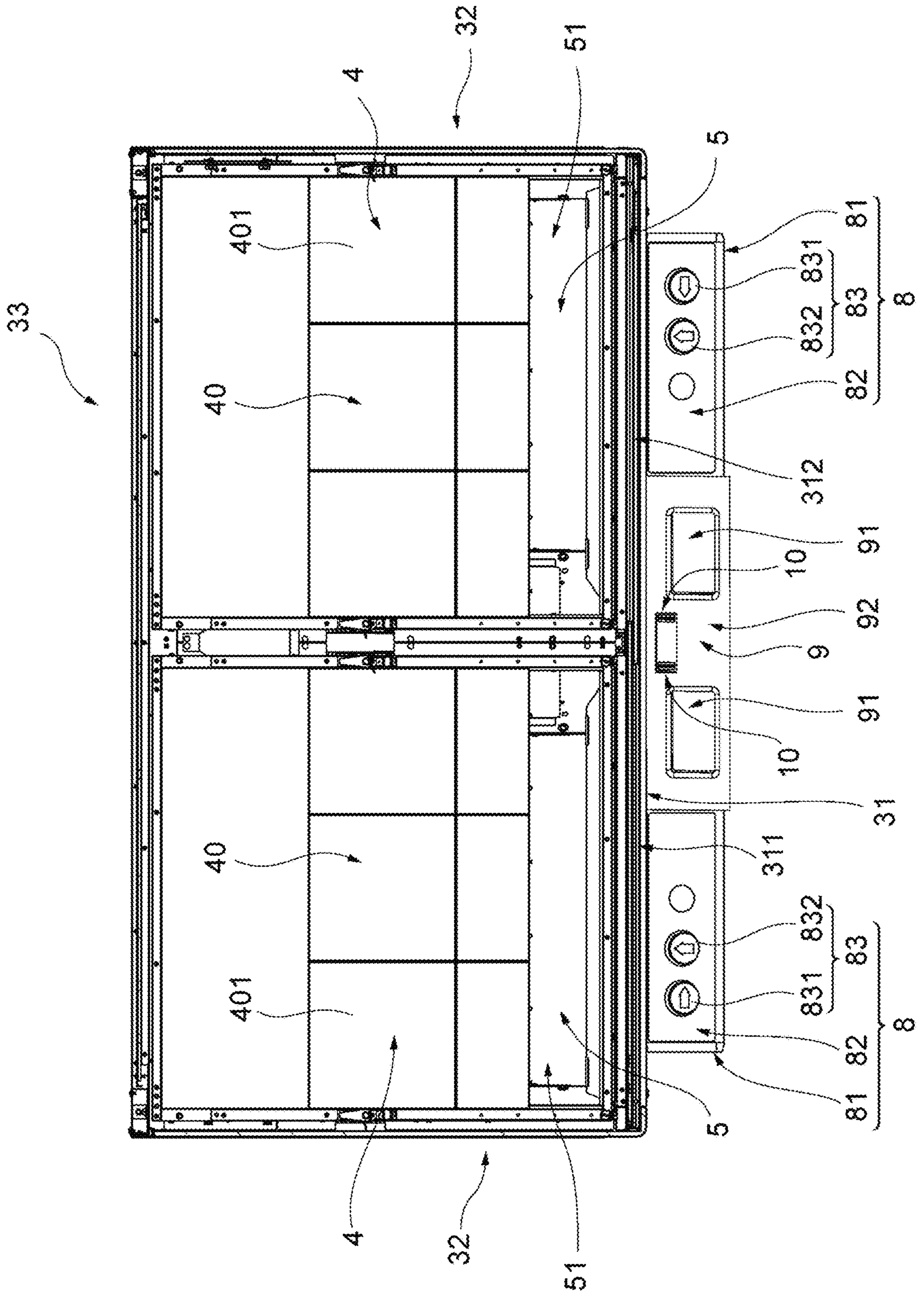
FIG. 2 is a cross sectional view along the II-II line in FIG. 1.
Figure 3:
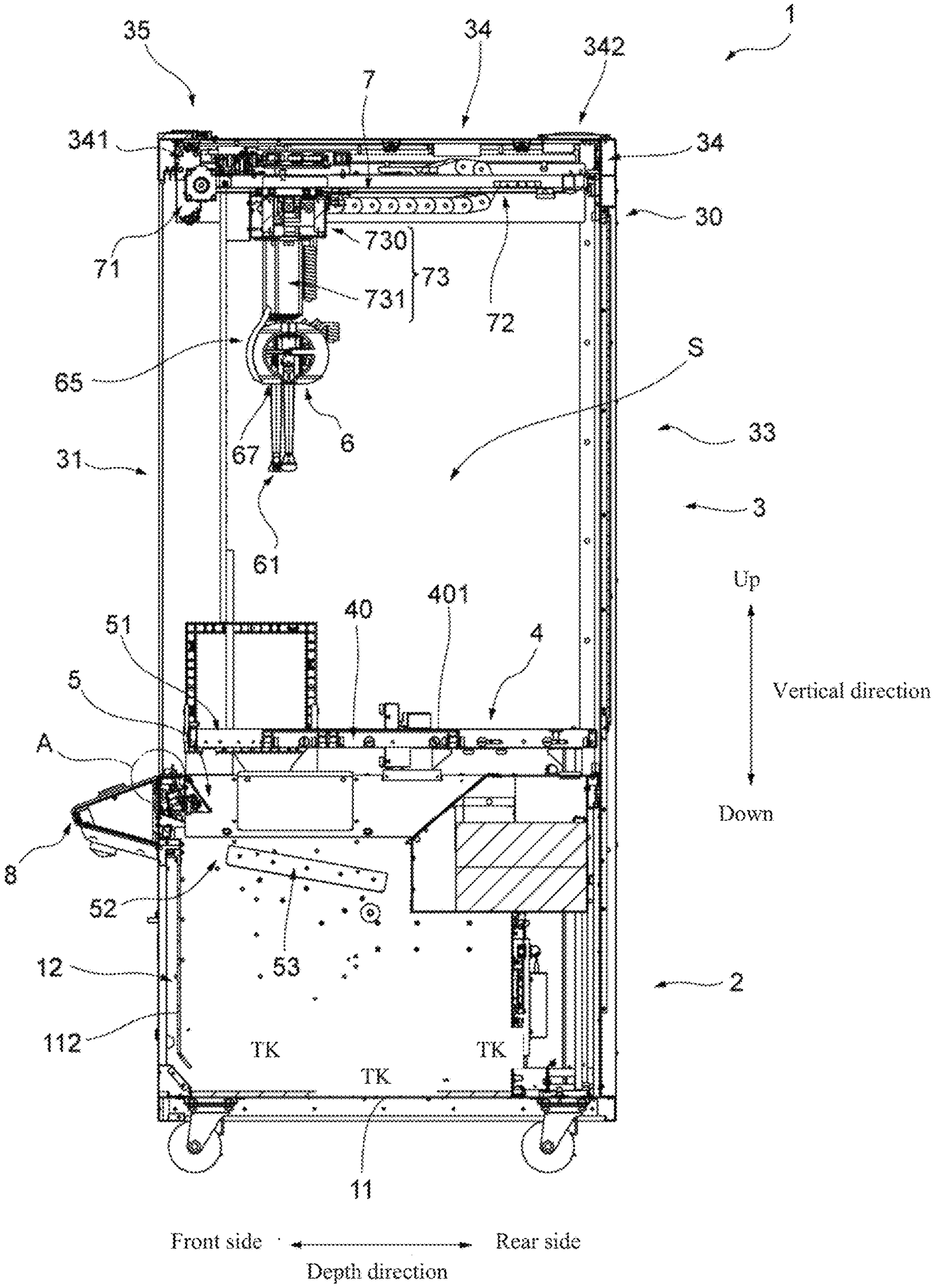
FIG. 3 is a cross sectional view along the III-III line in FIG. 1.

As shown in FIGS. 1 to 3, the prize display unit 3 has a casing 30; a front panel 31, side panels 32, and a back panel 33 respectively provided to the front, both sides, and the back of the casing 30; a support 34 that supports the drive unit 7 mounted on the upper side of the casing 30; an illumination unit (or illumination device or illuminator) 35 provided on the front side above the support 34; and a placing base 36 formed on the lower side of the casing 30 and on which the front panel 31 is placed.

Front Panel 31, Side Panels 32, and Back Panel 33

The front panel 31, the side panels 32, and the back panel 33 are configured to define the game space S. Also, the front panel 31, the side panels 32, and the back panel 33 are formed from a material through which light can pass, such as transparent acrylic resin or glass. This configuration affords a game space S that can be viewed from the front, both sides, and the back of the prize acquisition game device 1. The back panel 33 may be formed by a plate member of metal or the like.

As shown in FIGS. 1 and 2, the front panel 31 has a first front panel 311 and a second front panel 312 that are able to slide in the width direction. The first front panel 311 is provided closer to the back side than the second front panel 312. The first front panel 311 and the second front panel 312 are an example of a door that allows the game space S to be opened and closed by sliding in the width direction. With this configuration, the administrator of the prize acquisition game device 1 can open the game space S by opening the first front panel 311 and the second front panel 312 in order to operate or perform maintenance on the prize acquisition unit 6, add more prizes, or perform other such jobs. The first front panel 311 and the second front panel 312 are closed to close off the game space S except when the administrator is performing a job.

Placing Base 36

The placing base 36 is configured to movably support the first front panel 311 and the second front panel 312. The surface of the placing base 36 is painted, as are the other portions of the casing 30. Painting improves the aesthetic appearance of the visible portions of the placing base 36.

As shown in FIG. 4, the placing base 36 has a top surface 361, a front surface 362, an edge 363 formed between the top surface 361 and the front surface 362, and a sash 37 that is formed on the top surface 361 and slidably supports the first front panel 311 and the second front panel 312 from below. Here, the sash 37 is an example of a support that supports the first front panel 311 and the second front panel 312 from below such that these can be opened and closed. The support may be configured as something other than a sash, such as a configuration in which the first front panel 311 and the second front panel 312 are each rotated open and closed.

The sash 37 is attached to the top surface 361. As shown in FIG. 4, the sash 37 has a first portion 371 that is provided to the rear of the edge 363 of the top surface 361 and supports the first front panel 311 and the second front panel 312, and a second portion 372 that is provided in front of the first portion 371 and covers the top surface of the edge 363. Thus, the second portion 372 of the sash 37 can function as part of the cover portion that covers the top surface of the edge 363 of the placing base 36. Although the sash 37 has been described as being formed separately from the top surface 361, the sash 37 may instead be formed integrally with the top surface 361.

Next, the positional relationship between the control panel 82 of the operation unit 8 and the placing base 36 will be described. The control panel 82 is disposed so as to be inclined with respect to the front surface 362 of the placing base 36. To explain this in further detail, as shown in FIG. 4, the control panel 82 is disposed on the front surface 362 side of the placing base 36 such that the upper end 821 located near the front surface 362 will be positioned higher than the top surface 361 of the placing base 36. In other words, the upper end 821 is disposed so as to cover the front surface of the edge 363. Thus, the upper end 821 of the control panel 82 can function as another part of the cover portion that covers the front surface of the edge 363 of the placing base 36.

Therefore, the second portion 372 of the sash 37 and the upper end 821 of the control panel 82 form a cover portion that covers the edge 363 of the placing base 36 so as to protect the edge 363. With this cover portion, the paint can be prevented from peeling off of the edges 363 due to scratches or the like that would otherwise be caused by opening and closing the first front panel 311 and the second front panel 312. As a result, the aesthetic appearance of the placing base 36 can be improved and the durability of the placing base 36 increased.

Also, the layout of the control panel 82 is not limited to what was described above. For instance, the control panel 82 may be disposed such that the upper end 821 thereof is in the same plane as the top surface 361 of the placing base 36. Also, the control panel 82 may have a cover portion 820 that is configured integrally with the control panel 82, as shown in FIGS. 5 and 6. The cover portion 820 is an extension that is provided so as to extend from the upper end 821 of the control panel 82. Also, as shown in FIGS. 5 and 6, the cover portion 820 is provided so as to cover the front surface and top surface of the edge 363. Also, the cover portion 820 may be configured separately from the control panel 82 and the sash 37. Also, the three portions consisting of the cover portion 820, the control panel 82, and the sash 37 may be configured integrally.

Support 34

The support 34 is configured to movably support the drive unit 7 and to hold a portion of the drive unit 7 (a first drive unit 71 and a second drive unit 72; described below). As shown in FIG. 1, the support 34 has a rail 341 that is provided on its inner peripheral surface and that movably supports the drive unit 7. The attachment of the support 34 and the drive unit 7 will be explained in detail in conjunction with a description of the drive unit 7.

Illumination Unit 35

The illumination unit 35 is configured to emit light to the outside of the prize display unit 3. As shown in FIG. 1, the illumination unit 35 has a light guide member 351 and a plurality of light-emitting diodes 352 serving as light-emitting elements. The light guide member 351 is a transparent flat plate made of acrylic resin, and has a front emission surface and side emission surfaces. The plurality of light-emitting diodes 352 are provided on the back side of the light guide member 351.

Also, the light emitted by the plurality of light-emitting diodes 352 enters the end on the back side of the light guide member 351, is reflected inside the light guide member 351 and guided to the front side, and exits from the front emission surface and the side emission surfaces. In the normal state, the illumination unit 35 is lit. This improves the aesthetic appearance of the prize acquisition game device 1. On the other hand, in the event that the prize acquisition game device 1 is subjected to a certain impact, the illumination unit 35 flashes. Therefore, the illumination unit 35 can issue an alarm signal to the surroundings.

Prize Support Plate 4

Next, the prize support plate 4 will be described in detail with reference to FIGS. 1 to 3 and FIGS. 10 to 18.

The prize support plate 4 has a flat structure formed between the main body 2 and the prize display unit 3 in the vertical direction. As shown in FIGS. 1 and 3, the prize support plate 4 defines the game space S along with the front panel 31, the side panels 32, the back panel 33, and the support 34. The prize support plate 4 has a prize support surface 401 on the upper side in the thickness direction, on which prizes are placed.

As shown in FIGS. 1 and 2, the prize support plate 4 has a plurality of prize support units 40. The prize support units 40 are, for example, plate members made of a synthetic resin. A plurality of the prize support units 40 are connected to each other to form the prize support plate 4. Also, the plurality of prize support units 40 can be freely combined to form prize support plates 4 having different shapes. Consequently, the shape and size of the prize support surface 401 of the prize support plate 4 can be easily adjusted in response to changes in the type of prize or the game rules.

As shown in FIGS. 10 to 14, each prize support unit 40 has a main body 41 that directly or indirectly supports a prize, and a plurality of couplers 42 that are disposed around the periphery of the main body 41 and that link to other the prize support units 40.

Figure 12:
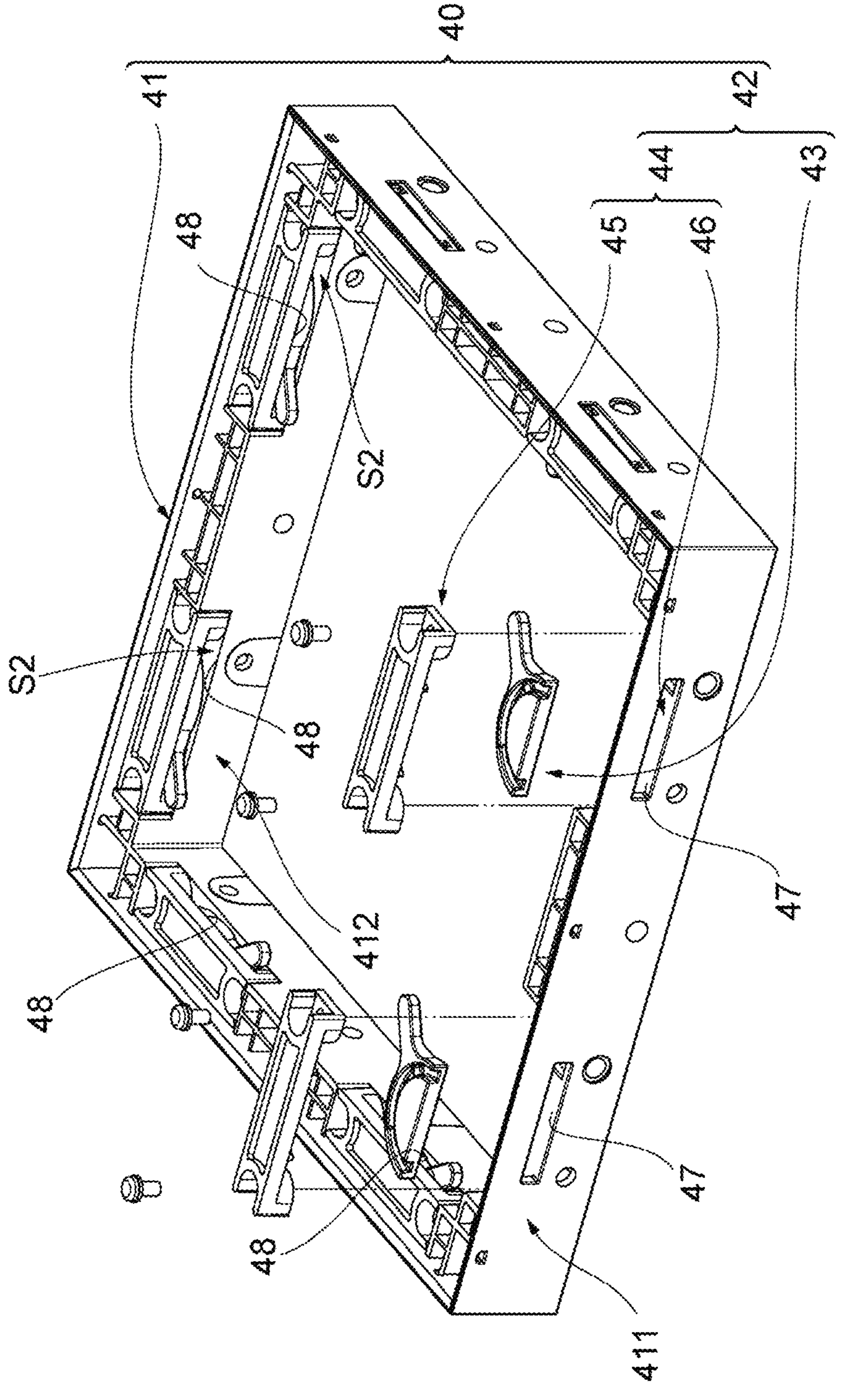
FIG. 12 is an exploded oblique view of the configuration of the prize support unit of the prize acquisition game device according to one or more embodiments.
Figure 13:
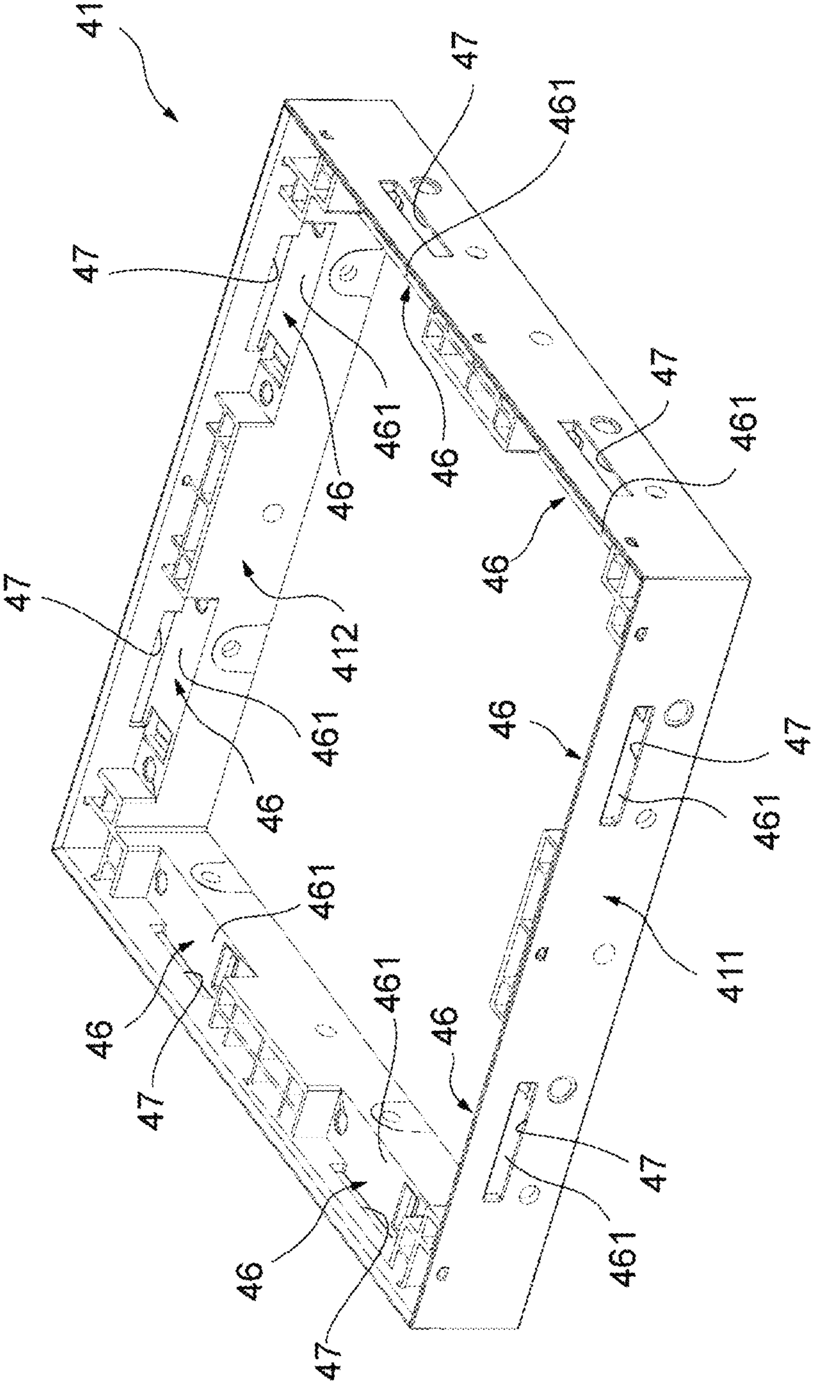
FIG. 13 is an oblique view of the configuration of the main body of the prize support unit of the prize acquisition game device according to one or more embodiments.

As shown in FIGS. 12 and 13, the main body 41 is a frame-shaped member which has an outer peripheral surface 411 and an inner peripheral surface 412 as side surfaces. Also, a plate member is provided on the top surface of the main body 41 for placing prizes (not shown).

As shown in FIG. 12, the couplers 42 each have a rotary body 43 that is provided to be able to rotate relative to the main body 41, and a support 44 that guides the rotation of the rotary body 43 while supporting the rotary body 43 by sandwiching it from both sides in the thickness direction of the rotary body 43. In the following description, a state in which the rotary body 43 is rotatably attached to the main body 41 by the support 44 will sometimes be referred to as the "assembled state."

Figure 10:
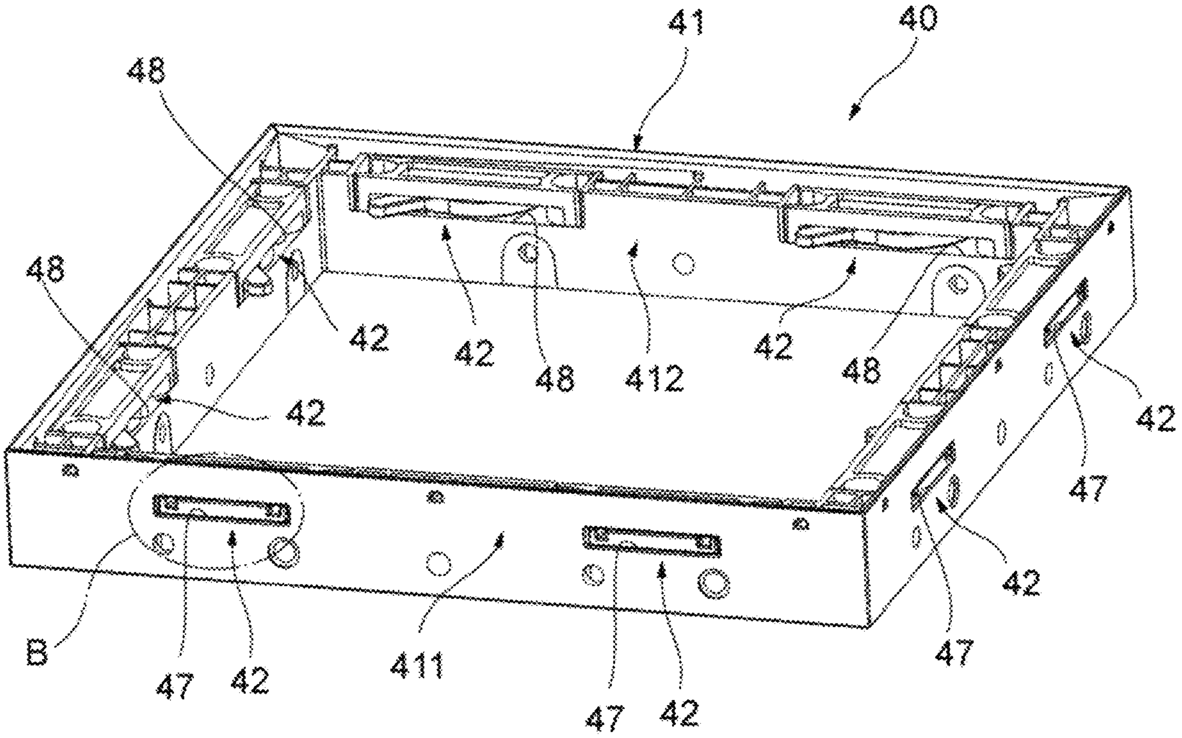
FIG. 10 is an oblique view illustrating a state in which the rotary body of the prize support unit of the prize acquisition game device according to one or more embodiments is housed.
Figure 11:
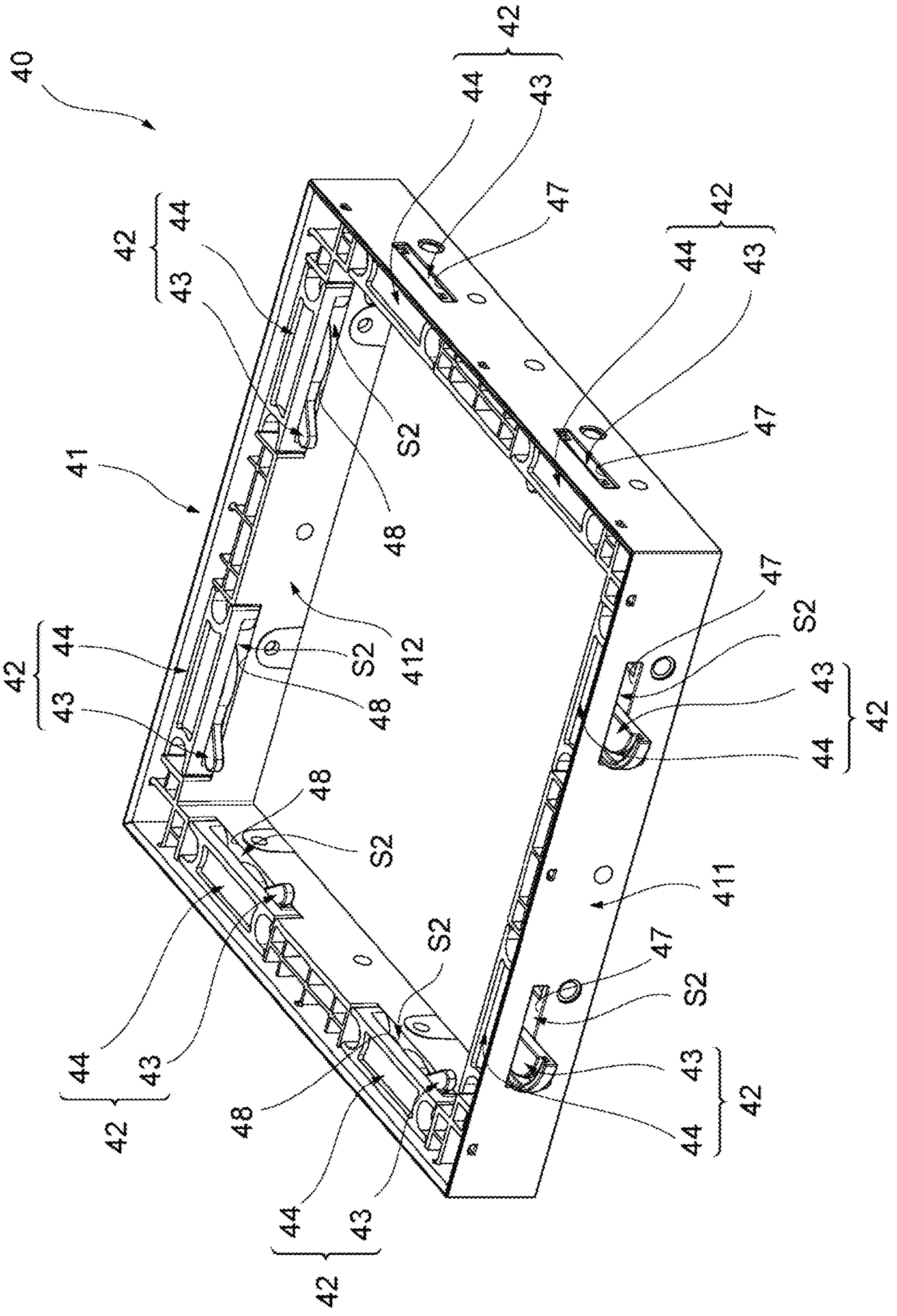
FIG. 11 is an oblique view of the prize support unit of the prize acquisition game device according to one or more embodiments in a state in which the rotary body of the prize support unit is protruding.

As shown in FIG. 12, the support 44 has a first support 45 that can be attached to the main body 41, and a second support 46 that is a part of the main body 41. As shown in FIGS. 11 and 12, a holding space S2 is formed between the first support 45 and the second support 46. As shown in FIGS. 10 to 12, the holding space S2 includes an opening 47 that opens to the outer peripheral surface 411 of the main body 41, and a second opening 48 that opens to the inner peripheral surface 412 of the main body 41 and is provided on the opposite side from the opening 47. As shown in FIGS. 10 and 11, the rotary body 43 is disposed in the holding space S2 that it can, by rotating, enter and exit the holding space S2 through the opening 47.

In the above description, the main body 41 was described as a single component, but may instead be configured to be divided into two sections, upper and lower, with the opening 47 as the boundary. In this case, either the upper or lower section of the main body 41 may include the support 44. In other words, the support 44 corresponds to either of the upper and lower sections of the main body 41. Also, the prize support unit 40 may be formed by sandwiching the rotary body 43 in between the upper and lower sections of the divided main body 41.

Figure 16:
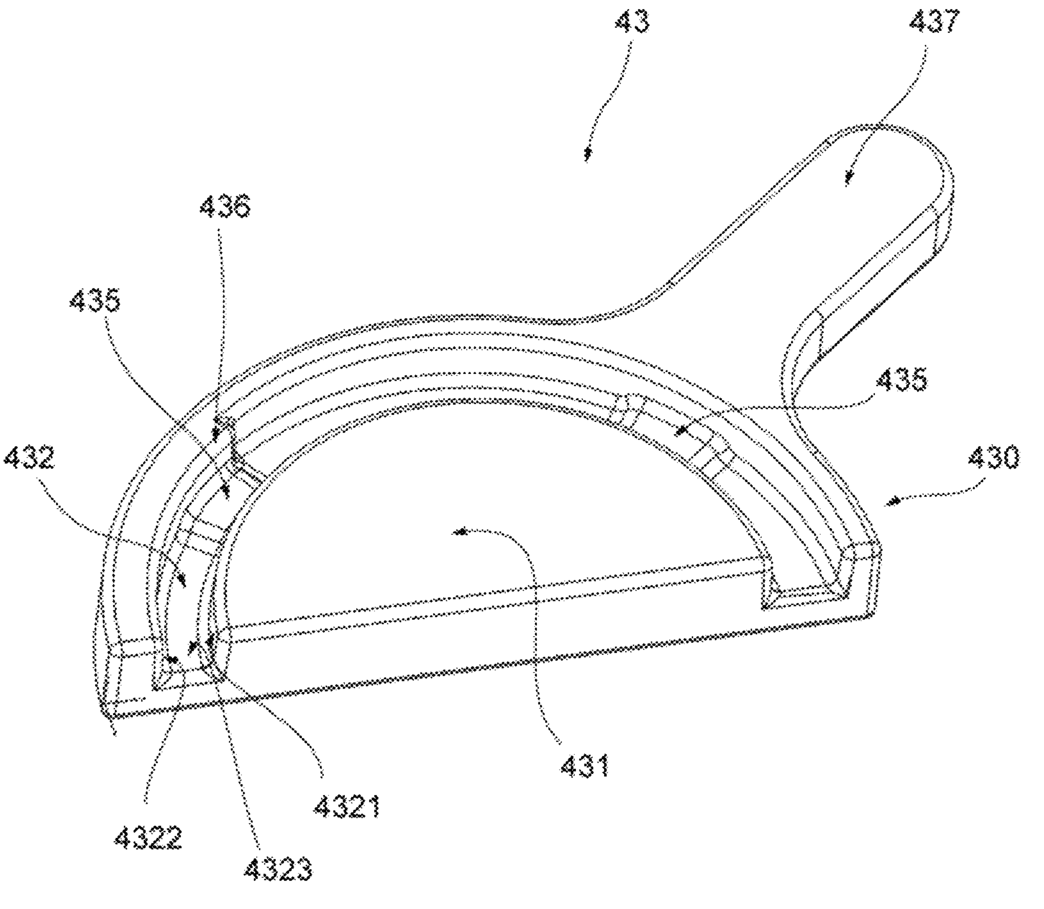
FIG. 16 is an oblique view of the configuration of the rotary body of the prize support unit of the prize acquisition game device according to one or more embodiments.

The configurations of the rotary body 43 and the first support 45 will now be described in greater detail. As shown in FIG. 16, the rotary body 43 has a main body 430 and a knob 437 used for rotating the main body 430. The main body 430 is a plate member having a substantially semicircular shape in plan view. The main body 430 has a first surface 431 on one side in its thickness direction, and a first part 432, which is a recessed part provided in the first surface 431. The rotary body 43 is provided such that the first surface 431 intersects the outer peripheral surface 411 such that it can, by rotating, enter and exit the holding space S2 through the opening 47.

Figure 17:
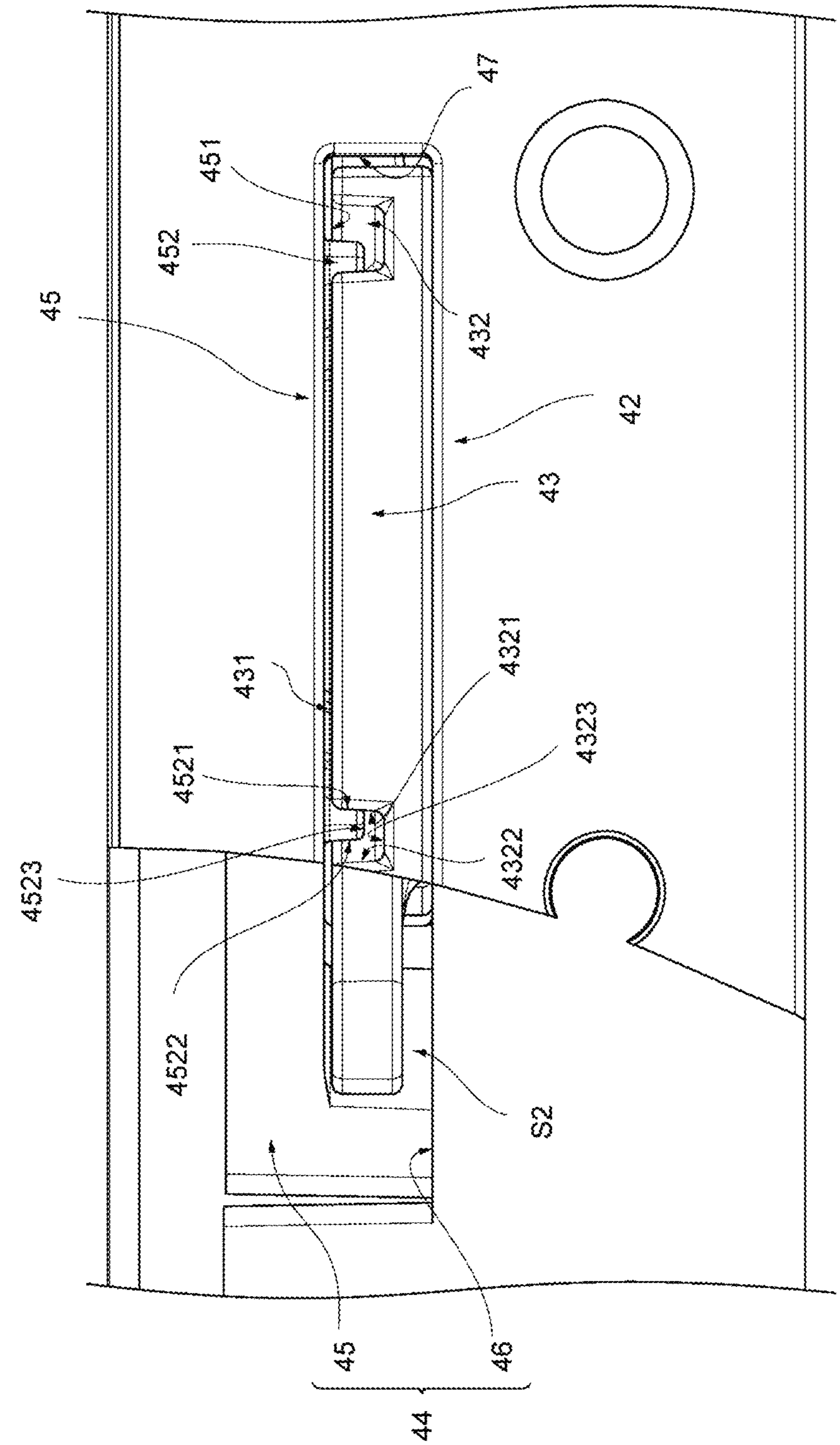
FIG. 17 is a detail view of part B in FIG. 10.

The first part 432 is a groove having a substantially semicircular ring shape in plan view. As shown in FIGS. 16 and 17, the first part 432 has a first side surface 4321, a third side surface 4322 opposing the first side surface 4321, and a bottom surface 4323 linking the first side surface 4321 and the third side surface 4322. As shown in FIG. 17, the first side surface 4321 is a portion that comes into contact with the first support 45. The first side surface 4321 is arc shaped in plan view.

As shown in FIG. 16, the bottom surface 4323 of the first part 432 is provided with two first bottom surface stoppers 435 that are raised parts, and the third side surface 4322 is provided with a first side surface stopper 436 that is also a raised part. The first bottom surface stopper 435 and the first side surface stopper 436 are examples of a first stopper.

Figure 18:
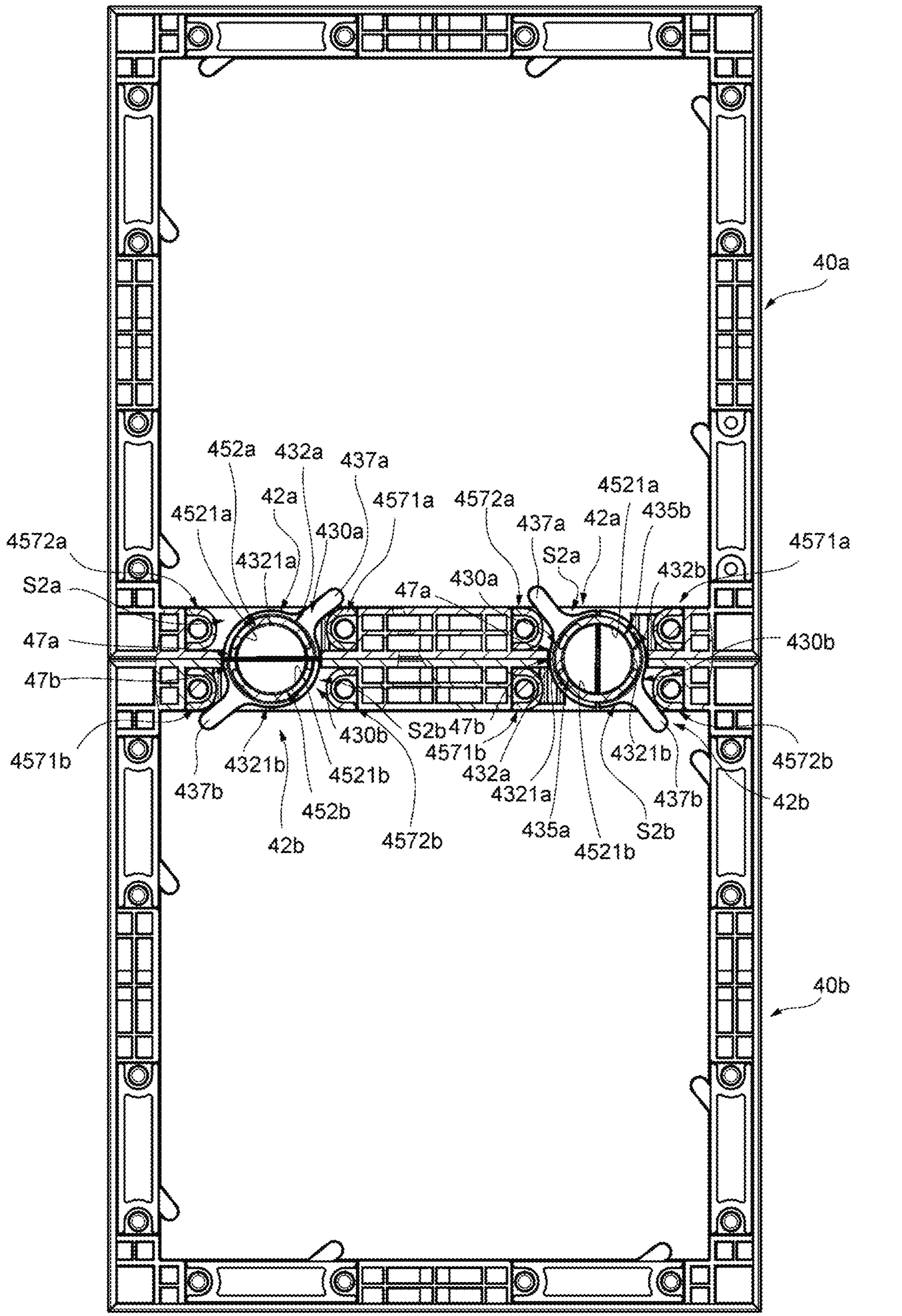
FIG. 18 is a diagram illustrating the linking of prize support units of the prize acquisition game device according to one or more embodiments.

As shown in FIG. 16, the knob 437 is provided so as to extend from the peripheral edge of the main body 430. In the assembled state, as shown in FIG. 18, the knob 437 extends through the second opening 48 to the outside of the holding space S2, and is provided so as to be able, by rotating, to come into contact with the two ends of the second opening 48 (that is, the first end part 4571 and the second end part 4572 of the first support 45 (discussed below)).

Figure 14:
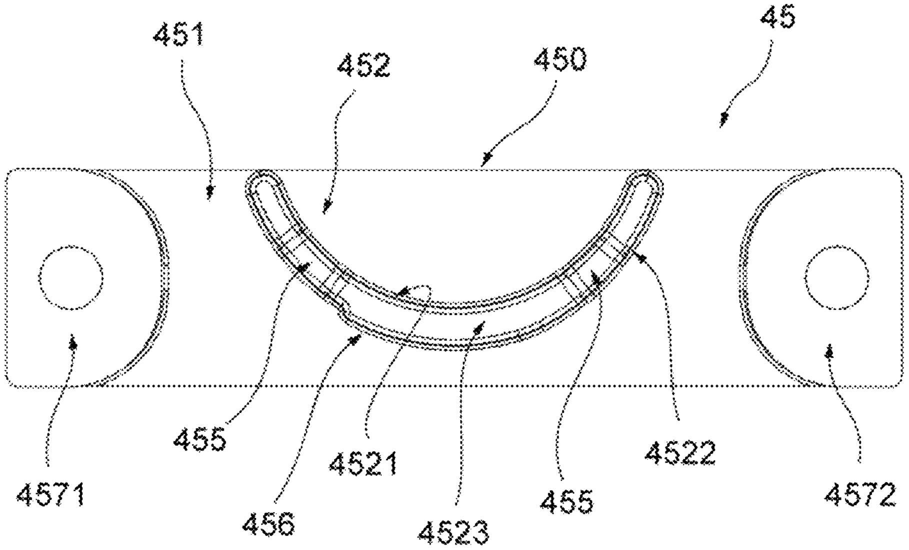
FIG. 14 is a plan view of the configuration of the first support of the prize support unit of the prize acquisition game device according to one or more embodiments.
Figure 15:
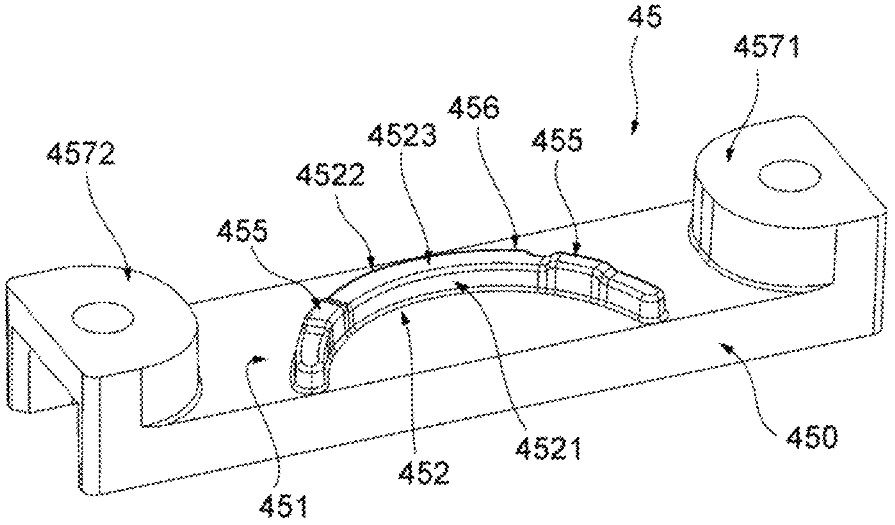
FIG. 15 is an oblique view of the configuration of the first support of the prize support unit of the prize acquisition game device according to one or more embodiments.

As shown in FIGS. 14 and 15, the first support 45 has a main body 450, a second surface 451 facing the first surface 431 of the rotary body 43 in the assembled state, a second part 452 that is a raised part corresponding to the first part 432 provided on the second surface 451, and a cylindrical first end part 4571 and second end part 4572 provided at the two ends of the second surface 451.

The second part 452 is a protrusion that can be inserted into the first part 432 and has a substantially semicircular ring shape in plan view. As shown in FIGS. 14 and 15, the second part 452 has a second side surface 4521, a fourth side surface 4522 opposing the second side surface 4521, and a bottom surface 4523 linking the second side surface 4521 and the fourth side surface 4522. As shown in FIG. 17, the second side surface 4521 is in contact with the first side surface 4321 of the first part 432. The second side surface 4521 is arc shaped in plan view. Also, the curvature of the second side surface 4521 in plan view is the same as the curvature of the first side surface 4321 in plan view. The curvature of the second side surface 4521 in plan view may be slightly greater than the curvature of the first side surface 4321 in plan view.

Also, as shown in FIGS. 14 and 15, two second bottom surface stoppers 455 that are raised parts are provided on the bottom surface 4523 of the second part 452, and a second side surface stopper 456 that is a raised part is provided on the fourth side surface 4522. The second bottom stopper 455 and the second side stopper 456 are examples of a second stopper.

In the assembled state, the first part 432 and the second part 452 are configured to rotatably engage. More specifically, the first part 432 is provided so as to be rotatable relative to the second part 452 when the first side surface 4321 smoothly slides along the second side surface 4521.

Next, the characteristics of the couplers 42 of the prize support units will be described in detail using an example of the linking between the prize support units. In the following description, in order to distinguish between two prize support units 40, one prize support unit 40 shall be called the prize support unit **40*a*, and the other prize support unit 40 the prize support unit 40*b*. When the openings 47*a* of the couplers 42*a* of the prize support unit 40*a* are disposed so as to communicate with the openings 47*b* of the couplers 42*b* of the other prize support unit 40*b*, as shown in FIG. 18, the plan view shape of the second side surface 4521*a* of the second part 452*a* of the couplers 42*a* and the plan view shape of the second side surface 4521*b* of the second part 452*b* of the couplers 42*b* are configured to be located on a single circle. Similarly, in this case, the plan view shape of the first side surface 4321*a* of the first part 432*a* of the couplers 42*a* and the plan view shape of the first side surface 4321*b* of the first part 432*b* of the couplers 42*b*** are also configured to be located on a single circle.

With the configuration described above, when the prize support unit **40*a* and the prize support unit 40*b* are linked, the first part 432*a* of the coupler 42*a* rotates smoothly along the second side surface 4521*a* of the coupler 42*a* and the second side surface 4521*b* of the coupler 42*b***, goes smoothly into the holding space S2*b* of the other prize support unit **40*b*, and can engage with the second part 452*b* of the coupler 42*b*. In this case, the first part 432*a* of the coupler 42*a* is configured such that one portion thereof maintains engagement with the second part 452*a* of the coupler 42*a*, and another portion thereof engages with the second part 452*b* of the coupler 42*b*. Similarly, the first part 432*b* of the coupler 42*b* is configured such that one portion thereof maintains engagement with the second part 452*b* of the coupler 42*b*, and portion thereof engages with the second part 452*b* of the coupler 42*b*. As a result, one prize support unit 40*a* and the other prize support unit 40*b* can be securely linked together by the couplers 42*a* and the couplers 42*b***.

Also, by rotating the first part **432*a* of the coupler 42*a*, the knob 437*a* can come into contact with the first end part 4571*a* or the second end part 4572*a*, which constitute the two ends of the second opening 48*a*. When the knob 437*a* hits the first end part 4571*a*, the main body 430*a* of the coupler 42*a*** is entirely housed within the holding space S2*a*, as shown in FIGS. 10 and 18. Meanwhile, when the knob **437*a* hits the second end part 4572*a*, the main body 430*a* of the coupler 42*a* is configured such that one half maintains its engagement with the second part 452*a*, and the other half can engage with the second part 452*b* of the other prize support unit 40*b*, as shown in FIGS. 11 and 18. The same holds true for the main body 430*b* of the coupler 42*b*. With this configuration, one prize support unit 40*a* and the other prize support unit 40*b*** can be linked together more stably.

Also, when the knob **437*a* hits the second end part 4572*a*, that is, when the respective halves of the couplers 42*a* and the couplers 42*b* are fitted together, the stoppers of the couplers 42*a* and the couplers 42*b* hit the corresponding stoppers. More specifically, in this case, although not depicted in the drawings, with the stoppers of the couplers 42*a*, the first bottom surface stopper 435*a* on one side of the coupler 42*a* hits the second bottom surface stopper 455*a*, the first bottom surface stopper 435*a* of the other side of the coupler 42*a* hits the second bottom surface stopper 455*b*, and the first side surface stopper 436*a* of the coupler 42*a* hits the first side surface stopper 436*a* and the second side surface stopper 436*b*. The same holds true for the stopper of the coupler 42*b*. When the stoppers hit each other in this way, this stops the rotation of first part 432 relative to second part 452. As a result, the rotation of the rotary body 43** can be locked.

Prize Drop Opening 5

The prize drop opening 5 will now be described with reference to FIGS. 2 and 3.

The prize drop opening 5 is configured to allow the game space S and the prize accommodating unit 11 to communicate. As shown in FIGS. 2 and 3, the prize drop opening 5 has a first drop opening 51 formed on the front side of the prize support plate 4, and a second drop opening 52 that is formed on the lower side of the first drop opening 51 and the prize support plate 4 and allows the first drop opening 51 and the prize accommodating unit 11 to communicate.

The size of the first drop opening 51 can be adjusted by changing the way the prize support units 40 of the prize support plate 4 are combined. As shown in FIG. 3, the second drop opening 52 is provided with a drop detector 53 that detects the dropping of a prize. This drop detector 53 affords accurate detection of whether or not the user has acquired a prize.

Prize Acquisition Unit 6

Next, the prize acquisition unit 6 will be described in detail with reference to FIG. 1 and FIGS. 19 to 21.

Figure 19:
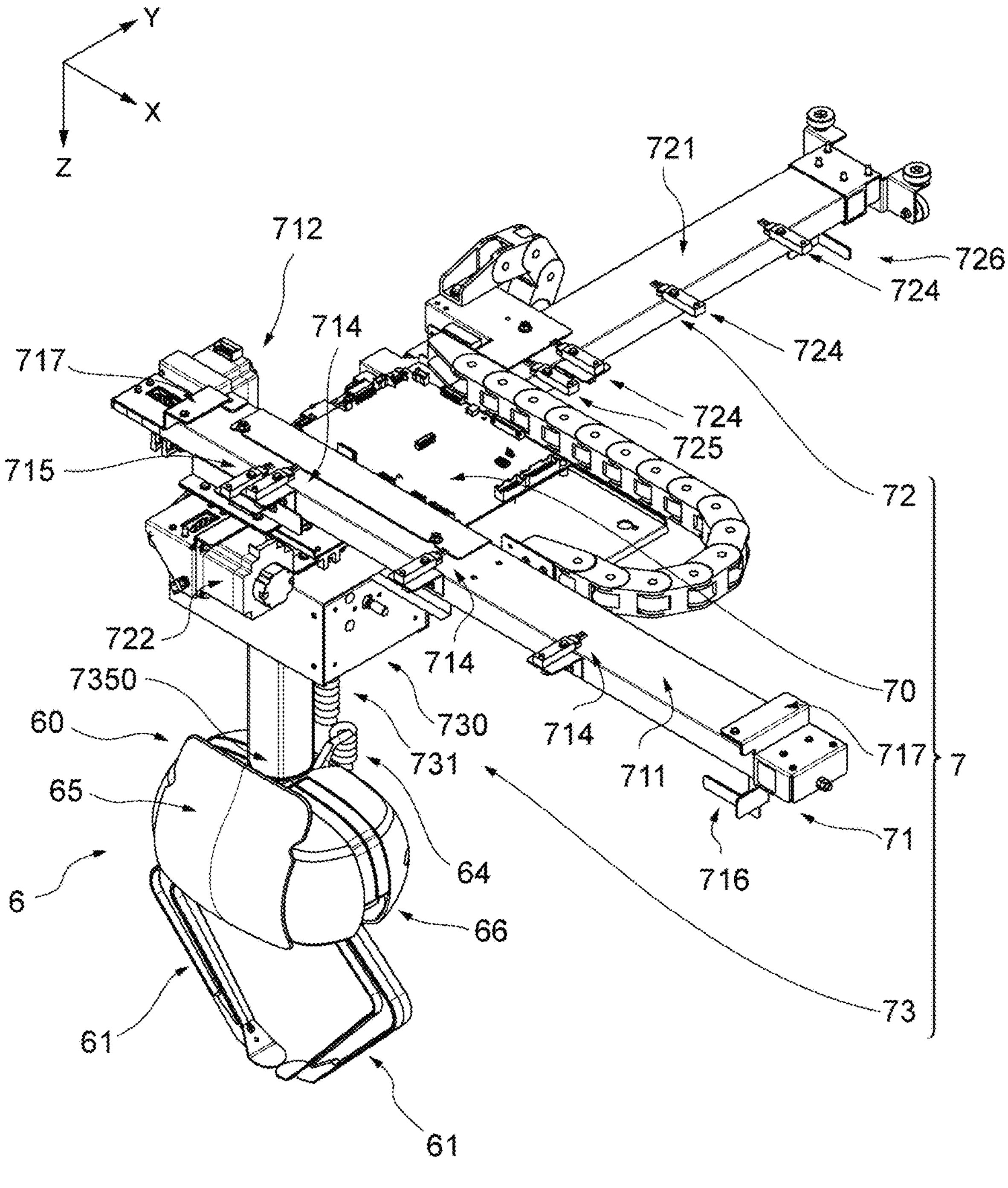
FIG. 19 is an oblique view illustrating a prize acquisition unit and a drive unit as seen from above the prize acquisition game device according to one or more embodiments.

The prize acquisition unit 6 is configured to move within the game space S and grasp a prize that has been placed on the prize support plate 4. The prize acquisition unit 6 is provided within the game space S so as to be suspended from the drive unit 7. As shown in FIG. 19, the prize acquisition unit 6 has a main body 60 that is provided movably in the game space S, and a pair of arms 61 that are provided so as to be able to move relative to the main body 60. Here, the pair of arms 61 are an example of arms for acquiring a prize. Also, the number of arms 61 is not limited to two. For example, the arm may be a single arm provided so as to hook onto a prize, or may be three or more arms provided so as to pinch a prize. The main body 60 is connected to the drive unit 7, and the pair of arms 61 extend downward from the main body 60. In the following description, the movement of the main body 60 and the pair of arms 61 will sometimes be referred to as "movement of the prize acquisition unit 6."

Figure 20:
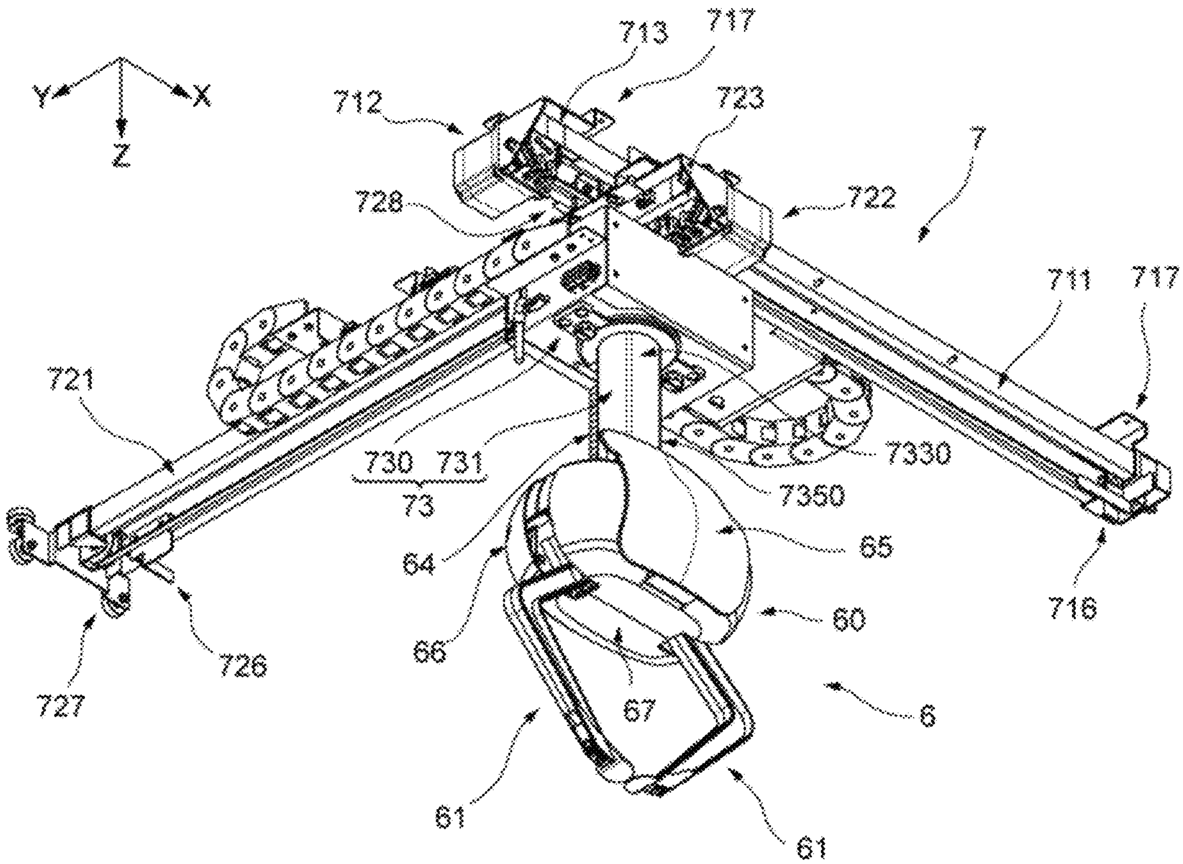
FIG. 20 is an oblique view illustrating the prize acquisition unit and the drive unit as seen from below the prize acquisition game device according to one or more embodiments.
Figure 21:
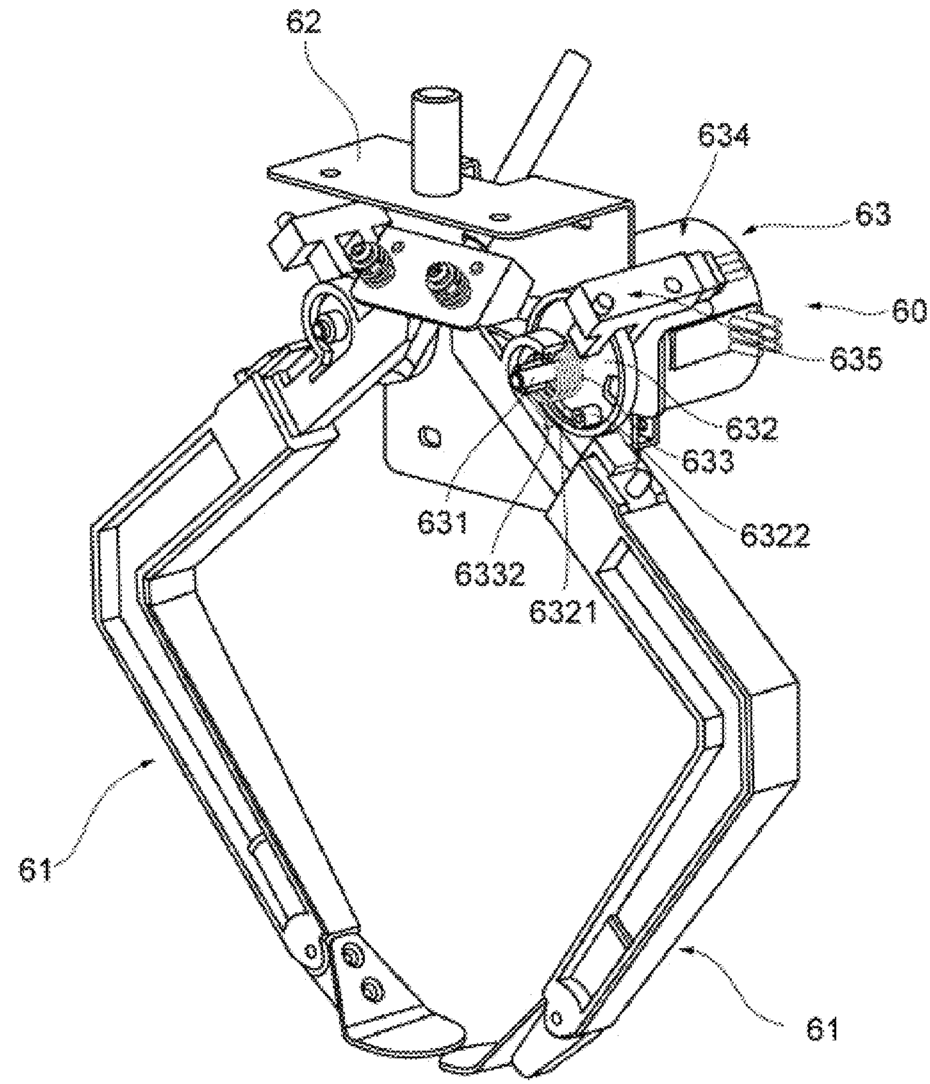
FIG. 21 is a diagram illustrating the configuration of a part the prize acquisition unit of the prize acquisition game device according to one or more embodiments.

As shown in FIGS. 19 to 21, the main body 60 has a housing 66, an attachment part 62 provided inside the housing 66 for attaching the prize acquisition unit 6 to the drive unit 7, and an arm drive unit (or arm driver) 63 that drives the opening and closing movement of the pair of arms 61. Here, the opening and closing movement of the pair of arms 61 is an example of arm movement, and includes when the pair of arms 61 move away from each other to open and when the pair of arms 61 move closer together to close. The pair of arms 61 may perform movement other than opening and closing.

The arm drive unit 63 is attached to the attachment part 62, and power is supplied thereto by a cable 64. The bottom part of the housing 66 constitutes the bottom part 67 of the main body 60 as shown in FIG. 20. On the bottom part 67 is mounted a bottom sensor (not shown) capable of sensing the pressure that the bottom part 67 of the main body 60 exerts on the prize. The bottom sensor may include, for example, a known pressure sensor, contact sensor, distance measurement sensor, or the like. As shown in FIGS. 1 and 19, the main body 60 also has a display part 65 for displaying a design sheet or the like formed on the front surface of the housing 66. Displaying a design sheet improves the aesthetic appearance of the main body 60.

As shown in FIG. 21, the arm drive unit 63 has a rotating shaft 631 that is fixed to the attachment part 62 and rotatably supports the arms 61, a gripping force action gear 632 that is rotatably attached to the rotating shaft 631, a coil spring 633 that is wound around the rotating shaft 631, a motor 634 that drives the rotation of the gripping force action gear 632, and an opening degree sensor 635 that senses the degree of opening of the arms 61.

The motor 634 has an output shaft to which is fitted a pinion gear (not shown). The gripping force action gear 632 is a disk-shaped gear that meshes with a pinion gear on the motor 634 side. The gripping force action gear 632 has an arc-shaped slot 6321 of a specific length provided on its peripheral edge, and a boss 6322 provided on one main surface in the thickness direction. The coil spring 633 is attached to the gripping force action gear 632 and the arms 61 such that one end (not shown) is loosely inserted into the slot 6321 so as to be freely movable, and the other end 6332 is fixed to the arms 61. The gripping force action gear 632 and the arms 61 are configured such that they can be interlocked by the coil spring 633.

The arm drive unit 63 drives the pair of arms 61 to open and close in order to grasp or release a prize. More specifically, under the control of the control unit 15, the motor 634 outputs a rotational force in a specific direction, and transmits this rotational force to the gripping force action gear 632 through the output shaft and pinion gear, thereby rotating the gripping force action gear 632. The rotation of the gripping force action gear 632 is transmitted to the arms 61 through the coil spring 633, causing the arms 61 to rotate open. After this, when the gripping force action gear 632 stops rotating, the arms 61 continue to rotate due to the spring force of the coil spring 633 until stopping after making contact with the boss 6322. In this way, the arm drive unit 63 can open the pair of arms 61 to a preset degree of opening via the output shaft, the pinion gear, the gripping force action gear 632, and the coil spring 633 under the operation of the motor 634.

Meanwhile, when the pair of arms 61 are to be closed, the motor 634 outputs a rotational force in the opposite direction from the specific direction under control by the control unit 15. Then, the arm drive unit 63 can close the pair of arms 61 via the output shaft, the pinion gear, the gripping force action gear 632, and the coil spring 633 under the reverse operation of the motor 634.

The opening degree sensor 635 is a sensor which senses the rotation angle of the gripping force action gear 632 and thereby senses the degree of opening of the pair of arms 61. When the opening degree sensor 635 senses the degree of opening of the arms 61, this information is transmitted to the control unit 15. When the control unit 15 detects that the opening degree information for the arms 61 transmitted from the opening degree sensor 635 has reached the set degree of opening, it stops the rotation of the gripping force action gear 632. This allows the degree of opening of the pair of arms 61 to be maintained at the set value. Also, when the control unit 15 detects that the opening degree information for the arms 61 transmitted from the opening degree sensor 635 has moved beyond a specific threshold value, it stops the movement of the main body 60. This allows the movement of the pair of arms 61 along with the main body 60 to be stopped.

Here, the above-mentioned set degree of opening and the specific threshold value related to that degree of opening are both initial information that is stored in the storage unit 13. The specific threshold value for the degree of opening is greater than the set degree of opening. For example, the specific threshold value for the degree of opening may be 90 degrees, and the set degree of opening may be an angle that is less than 90 degrees. The set degree of opening and the specific threshold value related to the degree of opening can both be changed in the settings.

Also, the set degree of opening is the degree of opening when the pair of arms 61 have been moved from their closed state to their open state for obtaining a prize under the control of the control unit 15 before the approach movement in which the main body 60 approaches the prize in the approach direction and when the main body 60 is stopped at the approach starting point (discussed below). Under the control of the control unit 15, when the pair of arms 61 receive just the drive force of the arm drive unit 63, the pair of arms 61 will not be opened to a degree greater than the set degree of opening.

Meanwhile, as the approach movement of the main body 60 progresses, one or both of the pair of arms 61 may come into contact with a prize or the prize support plate 4, resulting in movement beyond the specific threshold value. If such contact occurs, and the approach movement of the main body 60 continues, the arms 61 will make contact with the side surface of the housing 66 due to rebound from the prize or the prize support plate 4, and exert a large amount of pressure on the prize or the prize support plate 4 together with the main body 60. If this should happen, the pressure exerted by the arms 61 and the main body 60 on the prize or the prize support plate 4 is the combination of at least a portion of the weight of the arms 61 and the weight of the main body 60. By contrast, if such contact occurs and the approach movement of the main body 60 is halted, the pressure exerted on the prize or the prize support plate 4 will be just the weight of the arms 61, so the pressure exerted on the prize or the prize support plate 4 by the prize acquisition unit 6 can be reduced as compared to when the approach movement of the main body 60 is not stopped.

Also, the prize acquisition unit 6 can move in the X direction, the Y direction, and the Z direction within the game space S. Here, the Z direction includes the direction facing downward (hereinafter referred to as the "Z direction descent direction") and the direction facing upward (hereinafter referred to as the "Z direction ascent direction"). The Z direction descent direction is an example of an approach direction for approaching a prize, and the Z direction ascent direction is an example of a retreat direction, which is the opposite direction from the approach direction. In the following, movement along the Z direction descent direction will be referred to as "approach movement," movement along the Z direction ascent direction will be referred to as "retreat movement," and if no distinction is made between the two, they may be collectively referred to as "Z direction movement." Also, when no distinction is to be made in the X direction movement and/or the Y direction movement of the prize acquisition unit 6, the two may be collectively referred to as "planar movement." Also, the position where the prize acquisition unit 6 stops before the game starts is sometimes called the "standby position," and the position of the prize acquisition unit 6 after it has undergone planar movement but before it starts approach movement is sometimes called the "approach starting point."

The prize acquisition unit 6 is configured to perform Z direction movement after performing planar movement, for example. Also, the planar movement of the prize acquisition unit 6 is performed at the user's discretion, while the Z direction movement of the prize acquisition unit 6 is performed based on the initial settings, regardless of the user's intentions. In addition, if the operation unit 83 includes the third button 833 related to movement in the Z direction (see the example shown in FIG. 5), the Z direction movement of the prize acquisition unit 6 can be performed at the user's discretion, that is, when the user operates the third button 833.

The movement of the prize acquisition unit 6 will now be described in greater detail. The movement of the prize acquisition unit 6 in the X direction and the Y direction is realized either by a first method, in which the administrator of the prize acquisition game device 1 manually moves the prize acquisition unit 6 in administration mode, or a second method, in which the control unit 15 moves the prize acquisition unit 6 based on a movement request inputted by the administrator of the prize acquisition game device 1 in administration mode or by a player operating the first button 831 and the second button 832 of the operation unit 83 in player mode.

The first method is a method used to determine the standby position, movement range, and prize insertion position of the prize acquisition unit 6. Here, the standby position of the prize acquisition unit 6 is the origin of the coordinate space (XYZ space) in which the prize acquisition unit 6 can move. The origin may be a different position from the standby position. The movement range is the range over which the prize acquisition unit 6 can move in the XY plane of the coordinate space. The prize insertion position is the position where the prize acquisition unit 6 is above the prize drop opening 5 such that the prize can be inserted into the prize drop opening 5. Also, after the prize acquisition unit 6 has been moved to the standby position by the first method, the coordinates of the point corresponding to the position of the prize acquisition unit 6 are automatically acquired by the position sensor and encoder of the drive unit 7 (that is, the X direction origin sensor 715 and the X direction position sensor 714, and/or the Y direction origin sensor 725 and the Y direction position sensor 724, and the first encoder 713 and the second encoder 723 (discussed below)). The same holds true for the acquisition of the coordinates of the points corresponding to the movement range and the prize insertion position. With this first method, the administrator can easily acquire, change, etc., the origin, the standby position, the movement range, and the prize insertion position.

The second method is a method used in the acquisition of a prize by the prize acquisition unit 6. When the second method is used, the drive unit 7 drives the movement of the prize acquisition unit 6 in the X direction and/or the Y direction under the control of the control unit 15. Also, just as in the first method, after the prize acquisition unit 6 has been moved by the second method, the coordinates of the point corresponding to the position of the prize acquisition unit 6 are automatically acquired by the position sensors and encoders of the drive unit 7. With this second method, the administrator and the player can freely move the prize acquisition unit 6 and can acquire the coordinates of a point on the movement path of the prize acquisition unit.

Also, when either the first method or the second method is used, the prize acquisition unit 6 is moved along the rails of the drive unit 7 (first rail 711 and/or second rail 721 (discussed below)). The rails of the drive unit 7 are provided such that their lengthwise direction is parallel to the prize support surface 401. Consequently, the prize acquisition unit 6 can move in a specific plane 601 (see FIG. 1) whose center of gravity is parallel to the prize support surface 401.

The approach movement of the prize acquisition unit 6 is a movement that is automatically performed along the Z direction descent direction after a specific planar movement is performed in order to approach and grasp a prize. Also, the approach movement of the prize acquisition unit 6 is a movement driven by the drive unit 7 under the control of the control unit 15. More specifically, after the prize acquisition unit 6 undergoes planar movement, that is, after stopping at the approach starting point in a specific plane 601 of the prize acquisition unit 6, under the control of the control unit 15, the arm drive unit 63 opens the integrated arms 61 to a set degree of opening, and the drive unit 7 then drives the approach movement of the prize acquisition unit 6 based on the initial setting. After this, when the arms 61 of the prize acquisition unit 6 have moved beyond a specific threshold value, or when the bottom sensor detects that the bottom part 67 of the main body 60 of the prize acquisition unit 6 has pressed against a prize with a specific pressure, the approach movement of the main body 60 is stopped. After this, under the control of the control unit 15, first pressure adjustment is performed to adjust the pressure applied by the arms 61 to the prize or the prize support unit 40, or second pressure adjustment is performed to adjust the pressure applied by the main body 60 to the prize.

Here, the first pressure adjustment is performed to reduce the pressure applied by the arms 61 to the prize or prize support unit 40 by stopping the approach movement of the main body 60 when the arms 61 of the prize acquisition unit 6 have moved beyond a specific threshold value. The second pressure adjustment is performed by adjusting the positions of the bottom part 67 of the main body 60 and the prize. More specifically, in this adjustment, when the bottom sensor detects that the bottom part 67 of the main body 60 has pressed against the prize with a specific pressure, the approach movement of the main body 60 is stopped, and the main body 60 is then moved a first distance in the retreat direction and then stopped again, thereby reducing the pressure exerted by the main body 60 on the prize.

Also, the first distance related to the second pressure adjustment is a distance that can reduce the pressure exerted by the main body 60 on the prize to a specific value while maintaining contact between the bottom part 67 of the main body 60 and the prize, an example being a few millimeters. The first distance is determined by the control unit 15 so as to reduce the pressure exerted by the main body unit 60 on the prize to a specific value while maintaining contact between the bottom part 67 of the main body 60 and the prize, depending on the type of prize. This first distance allows the pressure exerted by the main body 60 on the prize to be reduced while maintaining a state in which the orientation of the main body 60 relative to the prize remains almost unchanged. This diminishes the effect that the second pressure adjustment has on the prize acquisition operation. In addition, a bottom sensor including a contact sensor or distance measurement sensor mounted on the bottom part 67 may be used to reduce the pressure exerted by the arms 61 on the prize or prize support unit 40 before pressure is applied to the prize.

The opening and closing of the pair of arms 61 varies with changes to the position of the prize acquisition unit 6 under the control of the control unit 15. More specifically, the pair of arms 61 are closed when the prize acquisition unit 6 is in the standby position, open at a set degree of opening after the prize acquisition unit 6 moves to the approach starting point via planar movement, close so as to grasp the prize after the prize acquisition unit 6 performs approach movement and stops, open so as to release the grasped prize after the prize acquisition unit 6 moves to the prize insertion position via retreat movement, and then reclose. After this, the prize acquisition unit 6 returns to the standby position while the pair of arms 61 are still closed.

Drive Unit 7

Next, the drive unit 7 will be described in detail with reference to FIG. 1 and FIGS. 19 to 28.

The drive unit 7 is configured to support the prize acquisition unit 6 so as to be suspended from the drive unit 7, and to drive the prize acquisition unit 6 in a specific plane 601 of the game space S based on control by the control unit 15. The drive unit 7 has a first drive unit 71 that drives movement of the prize acquisition unit 6 in the X direction, a second drive unit 72 that drives movement of the prize acquisition unit 6 in the Y direction, and a third drive unit 73 that drives movement of the prize acquisition unit 6 in the Z direction. Also, the drive unit 7 is configured to be able to communicate with the control unit 15, and has a control board 70 that, along with the control unit 15, controls the electrical configuration of each of the first drive unit 71, the second drive unit 72, and the third drive unit 73.

The first drive unit 71 has a first rail 711, a first motor 712 and a first encoder 713 provided on one end of the first rail 711, an X direction origin sensor 715 and three X direction position sensors 714 provided along the lengthwise direction of the first rail 711, dogs 716 provided at both ends of the first rail 711, and an attachment component 717 that is provided at both ends of the first rail 711 and is used for attaching the first rail 711 to the support 34.

The first rail 711 is provided so as to be movable with respect to the support 34 in the width direction, by attachment of the roller of the first drive unit 71 and the rail 341 of the support 34. Since the first rail 711 is provided such that its lengthwise direction is parallel to the prize support surface 401, the lengthwise direction of the first rail 711 corresponds to the X direction of movement of the prize acquisition unit 6.

The first motor 712 is configured to move the second drive unit 72 and the third drive unit 73 along the first rail 711 (that is, in the X direction), and thereby realize movement of the prize acquisition unit 6 attached to the third drive unit 73 in the X direction. The first encoder 713 is configured to sense the distance traveled by the prize acquisition unit 6 in the X direction by sensing the rotational state of the first motor 712 (such as the rotational movement amount and angle of the first motor 712). This first encoder 713 allows the distance traveled by the prize acquisition unit 6 in the X direction to be accurately sensed with a simple configuration.

The X direction origin sensor 715 and the three X direction position sensors 714 are examples of position sensors that sense the position of the prize acquisition unit 6, that is, the coordinates of a specific point on the movement path of the prize acquisition unit 6. The X direction origin sensor 715 is a sensor that, together with the Y direction origin sensor 725 (discussed below), senses the standby position of the prize acquisition unit 6 as the origin. Acquiring the origin coordinates makes it possible to determine the coordinate space (XYZ space) in which the prize acquisition unit 6 is located. Here, the standby position of the prize acquisition unit 6 is above the front end of the game space S. Also, the standby position of the prize acquisition unit 6 is a position specified by the administrator of the prize acquisition game device 1 by manually moving the prize acquisition unit 6.

The three X direction position sensors 714 are sensors that sense the X coordinate of points on the movement path of the prize acquisition unit 6. The two dogs 716 are detection pieces provided at both ends of the movement range of the prize acquisition unit 6 in the X direction. These two dogs 716 allow the prize acquisition unit 6 to move within the movement range in the X direction.

The second drive unit 72 has a second rail 721, a second motor 722 provided at one end of the second rail 721, a second encoder 723 that senses the rotational state of the second motor 722, a Y direction origin sensor 725 and three Y direction position sensors 724 provided along the lengthwise direction of the second rail 721, and dogs 726 provided at both ends of the second rail 721. The second drive unit 72 also has rollers 727 provided at both ends of the second rail 721 for movably attaching to a rail 342 of the support 34, and an attachment part 728 for movably attaching to the first rail 711.

The second rail 721 is provided so as to be movable with respect to the support 34 and the drive unit 71 in the depth direction by means of attachment of the rollers 727 and the rail 342 of the support 34, and the attachment of the attachment part 728 and the first rail 711. Since the second rail 721 is provided such that its lengthwise direction is parallel to the prize support surface 401, the lengthwise direction of the second rail 721 corresponds to the Y direction of movement of the prize acquisition unit 6.

The second motor 722 is configured to move the third drive unit 73 and the first drive unit 71 along the second rail 721 (that is, in the Y direction), thereby realizing movement in the Y direction of the prize acquisition unit 6 attached to the third drive unit 73. The second encoder 723 is configured to sense the distance traveled by the prize acquisition unit 6 in the Y direction by sensing the rotational state of the second motor 722 (such as the rotational movement amount and angle of the second motor 722). With this second encoder 723, the distance traveled by the prize acquisition unit 6 in the Y direction can be accurately sensed with a simple configuration.

The Y direction origin sensor 725 and the three Y direction position sensors 724 are examples of position sensors that sense the position of the prize acquisition unit 6, that is, the coordinates of a specific point on the movement path of the prize acquisition unit 6. The Y direction origin sensor 725 is a sensor that, along with the X direction origin sensor 715, senses the standby position of the prize acquisition unit 6 as the origin. The three Y direction position sensors 724 are sensors that sense the Y coordinate of points on the movement path of the prize acquisition unit 6. The two dogs 726 are detection pieces provided at both ends of the movement range of the prize acquisition unit 6 in the Y direction. These two dogs 726 allow the prize acquisition unit 6 to move within the movement range in the Y direction.

The third drive unit 73 has a main body 730 and a support 731 that supports the prize acquisition unit 6 such that it can be raised and lowered.

Figure 23:
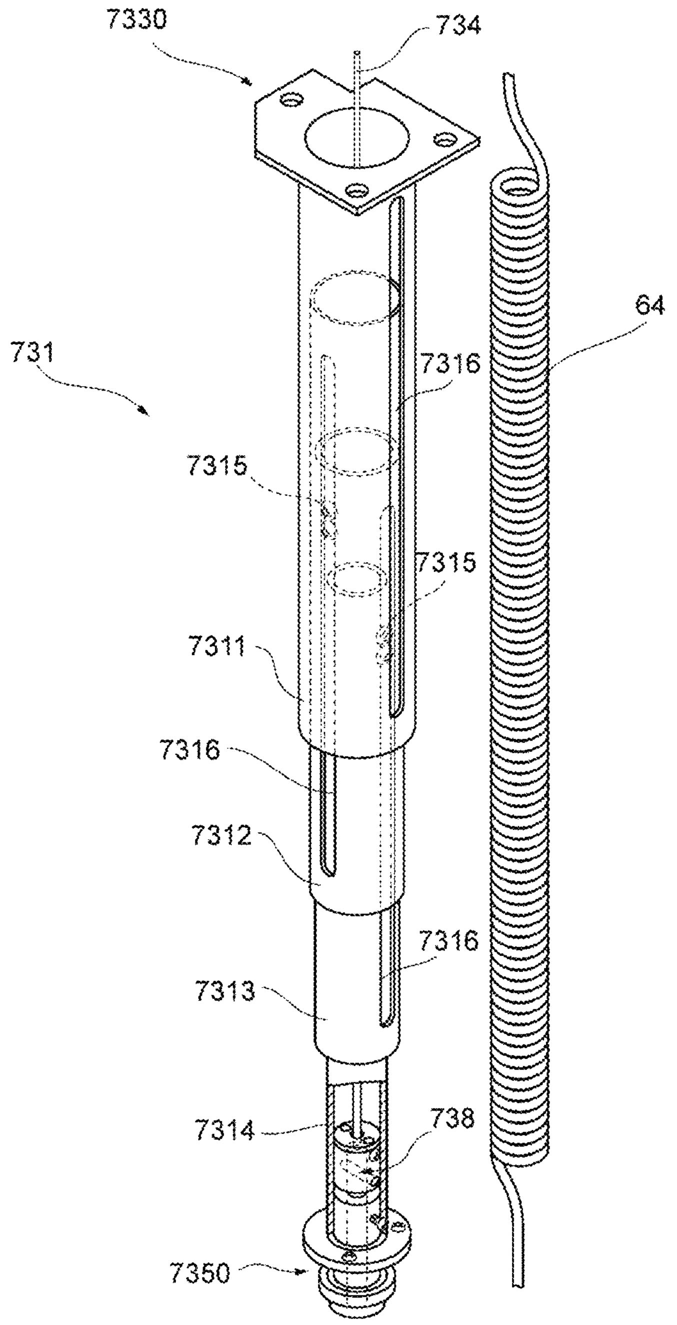
FIG. 23 is a diagram illustrating the configuration of the support of the third drive unit of the prize acquisition game device according to one or more embodiments.

As shown in FIG. 23, the support 731 is a stretchable pipe formed by fitting four pipes 7311, 7312, 7313, and 7314 having successively smaller diameters in a nested manner so as to be freely slidable. The pipes 7311, 7312, 7313, and 7314 are configured so as not to rotate relative to one another or to come loose due to engagement between stoppers 7315 provided at the peripheral surfaces of the pipes and grooves 7316. The support 731 also has an upper end 7330 provided above the pipe 7311 and a lower end part 7350 provided below the pipe 7314. The support 731 allows the prize acquisition unit 6 to be attached to the third drive unit 73 via the connection between the upper end 7330 and the housing of the main body 730, and the connection between the lower end part 7350 and the attachment part 62 of the prize acquisition unit 6.

When the prize acquisition unit 6 is positioned in a specific plane 601, the weight of the pipes 7311, 7312, 7313, and 7314 is exerted on the prize acquisition unit 6. Meanwhile, as the approach movement of the prize acquisition unit 6 progresses, the stopper 7315 of the pipe 7312 reaches the lower end of the groove 7316 of the pipe 7311, such that the weight of the pipe 7312 is supported by the pipe 7311, then the weight of the pipe 7313 is supported by the pipe 7312, and then the weight of the pipe 7314 is supported by the pipe 7313.

Figure 22:
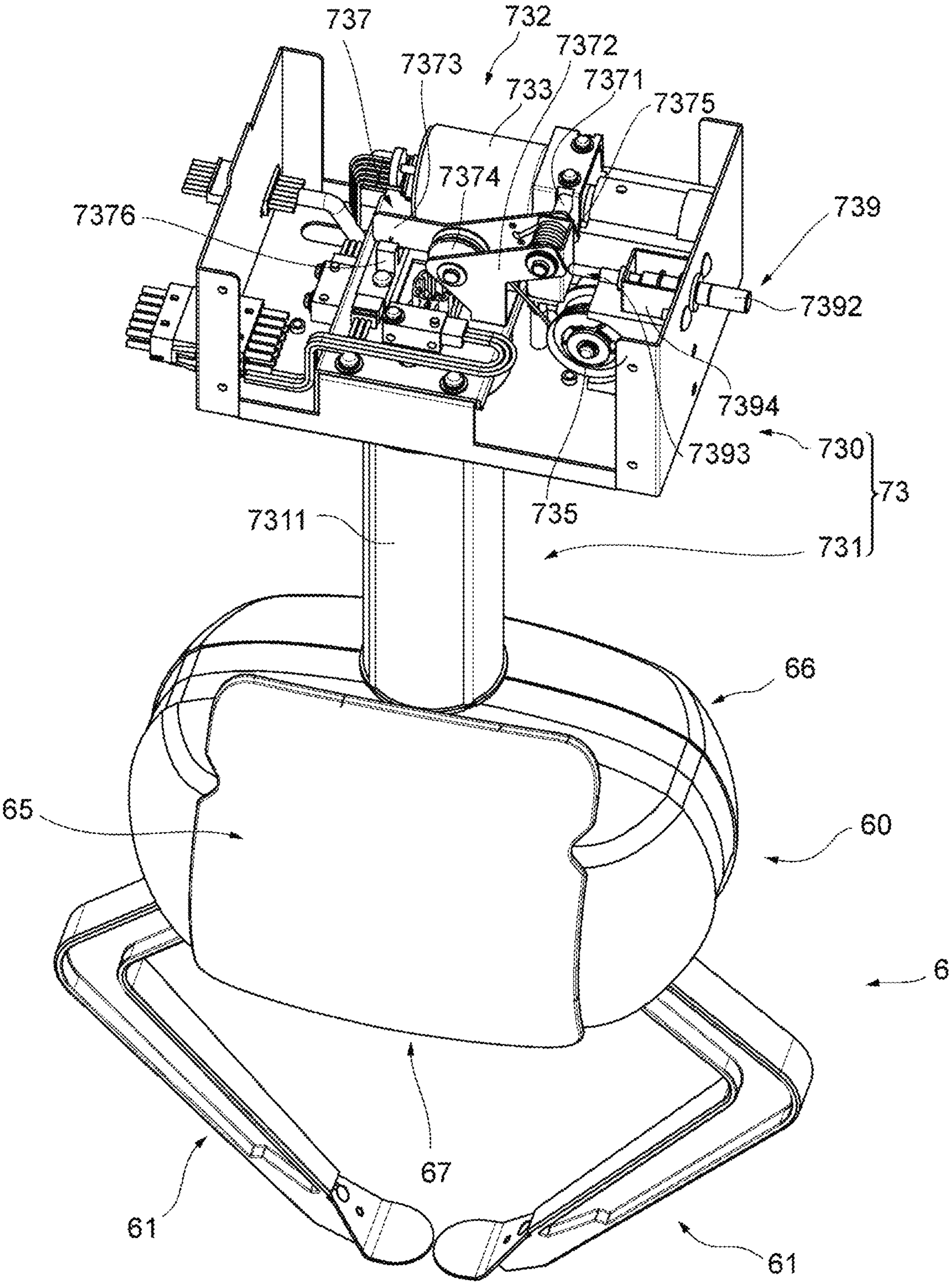
FIG. 22 is a diagram illustrating the configuration of the prize acquisition unit and a third drive unit of the prize acquisition game device according to one or more embodiments.
Figure 24:
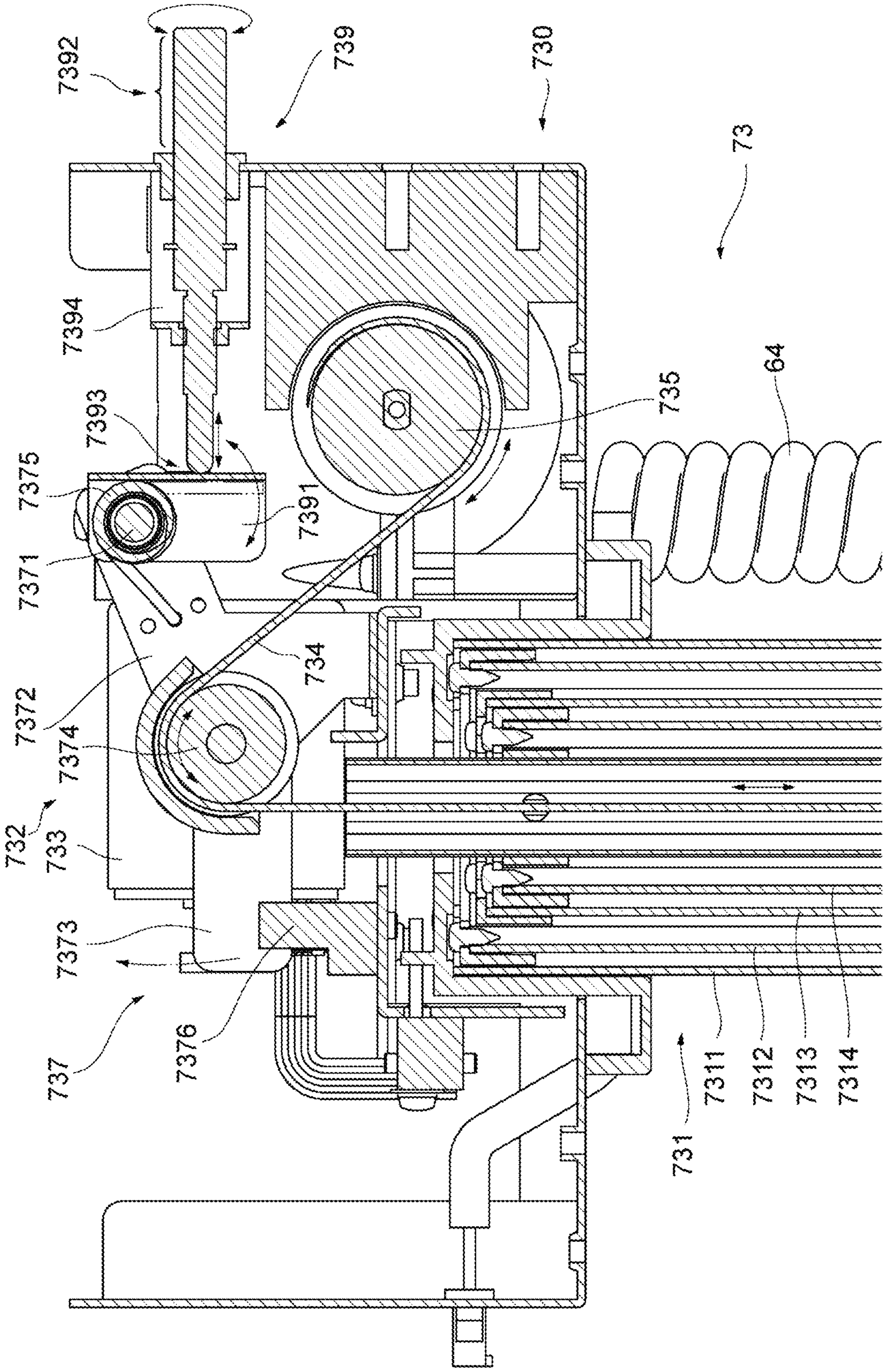
FIG. 24 is a diagram illustrating the configuration of the main body of the third drive unit of the prize acquisition game device according to one or more embodiments.

As shown in FIGS. 22 and 24, the main body 730 has a winding and unwinding part 732 that is attached to the prize acquisition part 6 and is provided inside the housing of the main body 730, and a wire 734 wound up by the winding and unwinding part 732.

As shown in FIGS. 22 and 24, the winding and unwinding part 732 has a third motor 733, a reduction gear part (not shown), a wire winding pulley 735, a Z direction movement stop part 737, and a biasing force adjustment part 739. The third motor 733 plays out or winds up the wire 734 by rotating the wire winding pulley 735 forward or backward via deceleration of the reduction gear part. By playing out or winding up the wire 734, the prize acquisition unit 6 fixed to the wire 734 can perform approach movement or retreat movement in the Z direction. In this case, the support 731 expands and contracts in the Z direction as the length of the wire 734 changes due to unwinding and winding.

The Z direction movement stop part 737 is configured to stop the Z direction movement of the main body 60, that is, the approach movement or ascent movement, when the bottom part 67 of the main body 60 makes contact with a prize and pushes on the prize with a specific pressure due to the approach movement of the main body 60. The Z direction movement stop part 737 has a dog rotation shaft 7371, a swing arm 7372 that can swing around the dog rotation shaft 7371, a Z direction dog 7373 that is provided at one end of the swing arm 7372 and swings along with the swing arm 7372, a tension pulley 7374 that is rotatably supported by the swing arm 7372, a coil spring 7375 that biases the swing arm 7372 in the lifting direction of the prize acquisition unit 6 so as to press the tension pulley 7374 against the wire 734, an approach stop sensor 7376 for stopping approach movement (descent movement) in the Z direction, and an ascent stop sensor for stopping ascent movement in the Z direction.

One end of the wire 734 is wound up by a wire winding pulley 735 of the winding and unwinding part 732, and the other end is played out from a tension pulley 7374 of the Z direction movement stop part 737 and passes through the inside of the pipes 7311, 7312, 7313, and 7314 of the support 731. Also, as shown in FIG. 23, a cylindrical coupler 738 that is vertically movable within the pipe 7314 is provided at the other end of the wire 734. The wire 734 is fixed to the attachment part 62 of the prize acquisition unit 6 via the coupler 738. Thus, the prize acquisition unit 6 is provided so as to be suspended from the wire 734.

As shown in FIGS. 22 and 24, the biasing force adjustment part 739 is configured to change the biasing force in the lifting direction produced by a coil spring 7375.

The biasing force adjustment part 739 has a movable control plate member 7391, an adjustment knob 7392, and a knob support member 7394 that supports the adjustment knob 7392.

The movable control plate member 7391 is a flat member that is rotatably attached to the dog rotating shaft 7371, and is disposed such that the end of the coil spring 7375 comes into contact with it. Here, one end of the coil spring 7375 is hooked on and fixed to the swing arm 7372, and the other end is hooked on the movable control plate member 7391. Accordingly, when the movable control plate member 7391 is rotated around the dog rotating shaft 7371, this changes the biasing force of the coil spring 7375 according to the amount of rotation, that is, the tension of the biasing force when the swing arm 7372 is biased in the lifting direction of the prize acquisition unit 6 by pressing the tension pulley 7374 against the wire 734.

The adjustment knob 7392 is used to change the angle of the movable control plate member 7391, and has a threaded portion that displaces the position of the distal end portion 7393 according to the amount of rotation. The distal end portion 7393 is provided so as to come into contact with the outer surface of the movable control plate member 7391 and press against the repulsive force of the coil spring 7375.

Also, an adjustment knob 7392 is rotatably supported, at two places in one or more embodiments, by a knob support member 7394 attached to the housing of the main body 730. Since the finger portion of adjustment knob 7392 is located outside of the housing of main body 730, an administrator can grasp the finger portion from outside the housing of main body 730 and operate the adjustment knob 7392, making it easy to change the biasing force. Also, the biasing force of the coil spring 7375 can be steplessly varied by using the adjustment knob 7392, which consists of a screw mechanism.

Figure 27:
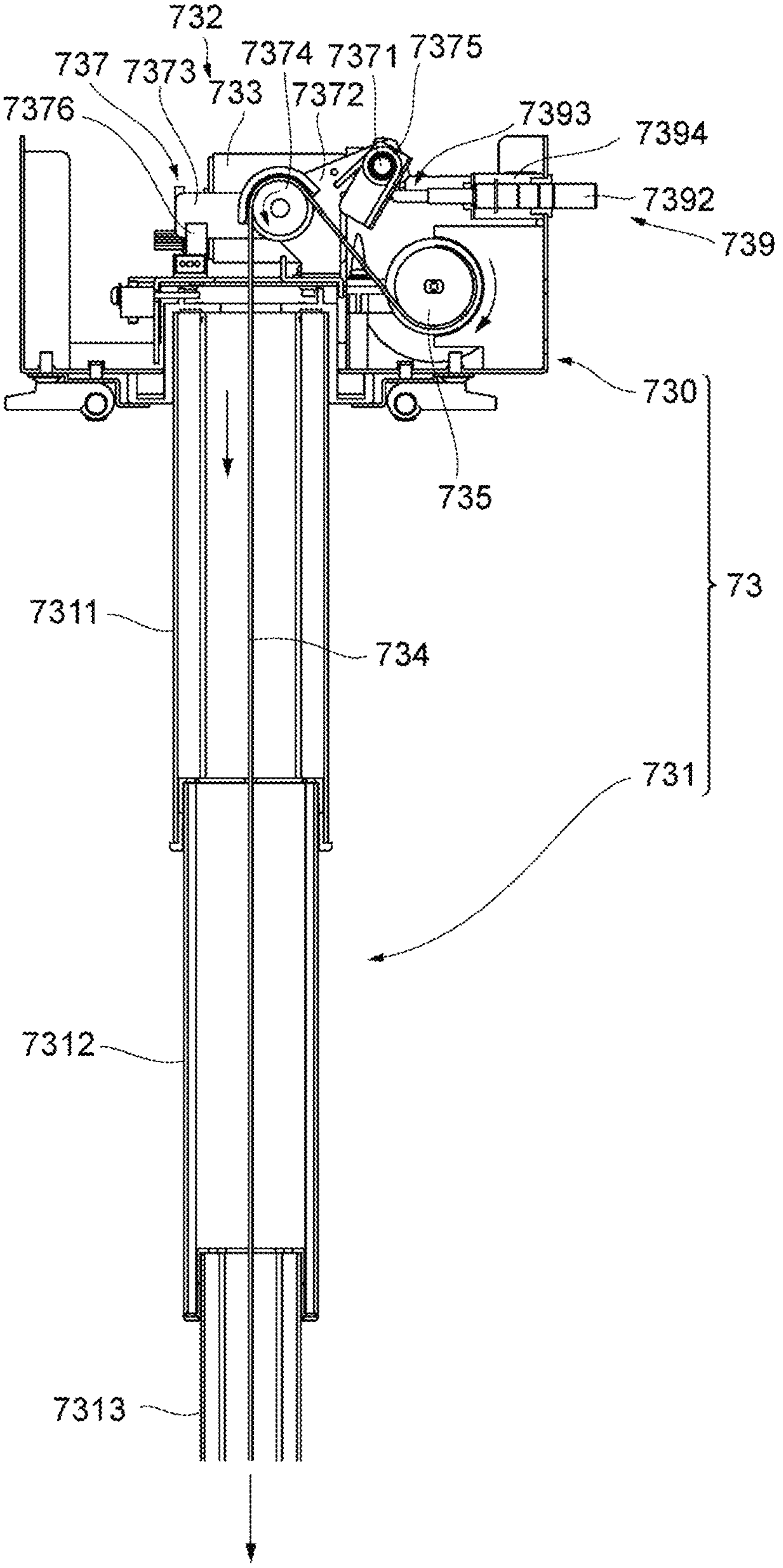
FIG. 27 is a diagram illustrating a state in which the main body of the third drive unit approaches a prize when the biasing force applied by a biasing force adjustment part of the prize acquisition game device according to one or more embodiments is in a strong spring state.
Figure 28:
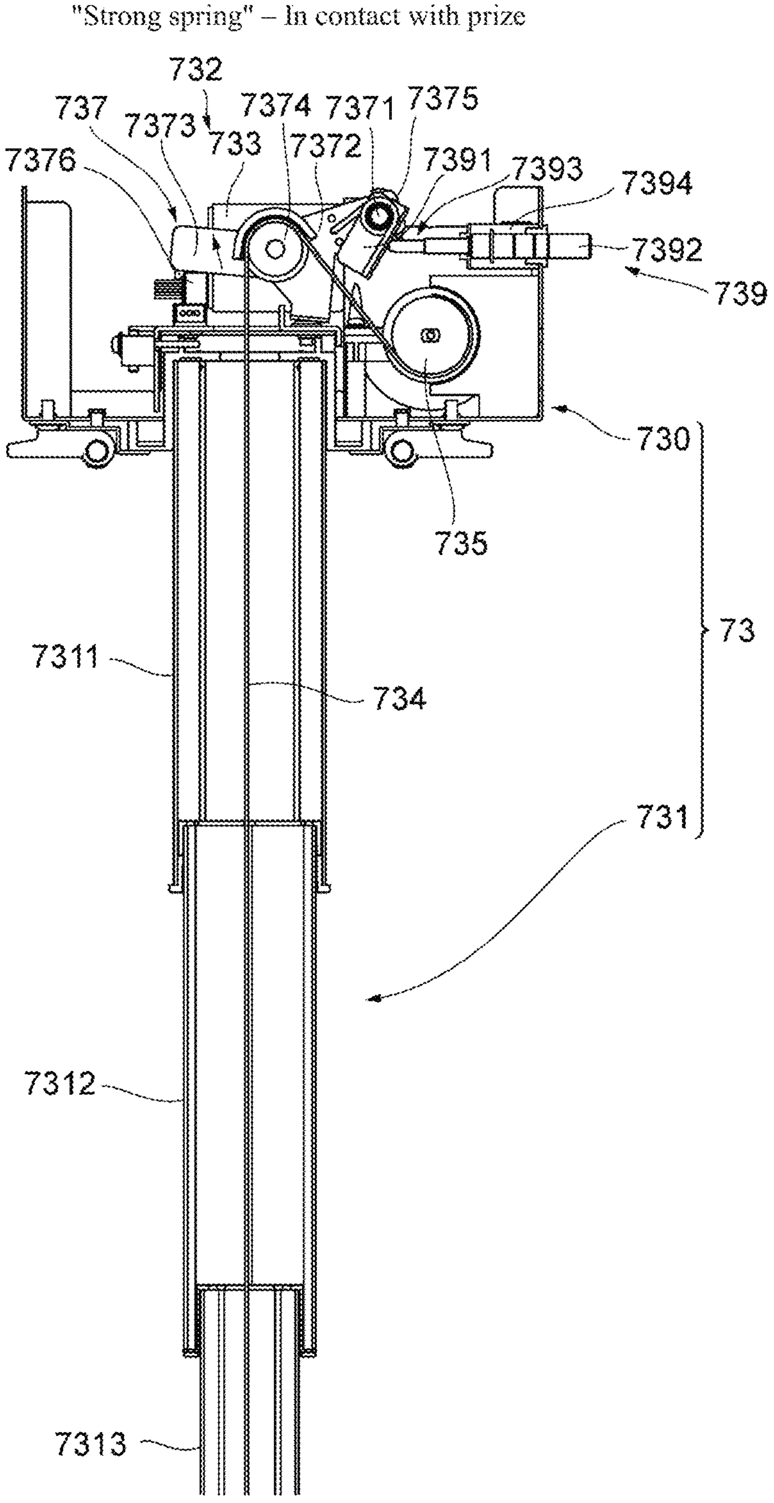
FIG. 28 is a diagram illustrating a state in which the main body of the third drive unit comes into contact with a prize when the biasing force applied by a biasing force adjustment part of the prize acquisition game device according to one or more embodiments is in a strong spring state.

When the adjustment knob 7392 is rotated forward to move the distal end portion 7393 forward, the movable control plate member 7391 is pressed in as shown in FIGS. 27 and 28, and the biasing force of the coil spring 7375 increases to create a "strong spring" state. Consequently, there is an increase in the biasing force of the coil spring 7375 that biases the swing arm 7372 in the lifting direction of the prize acquisition unit 6 and, as a result, there is also an increase in the biasing force in the lifting direction that is exerted on the prize acquisition unit 6 itself via the swing arm 7372 and the wire 734.

Figure 25:
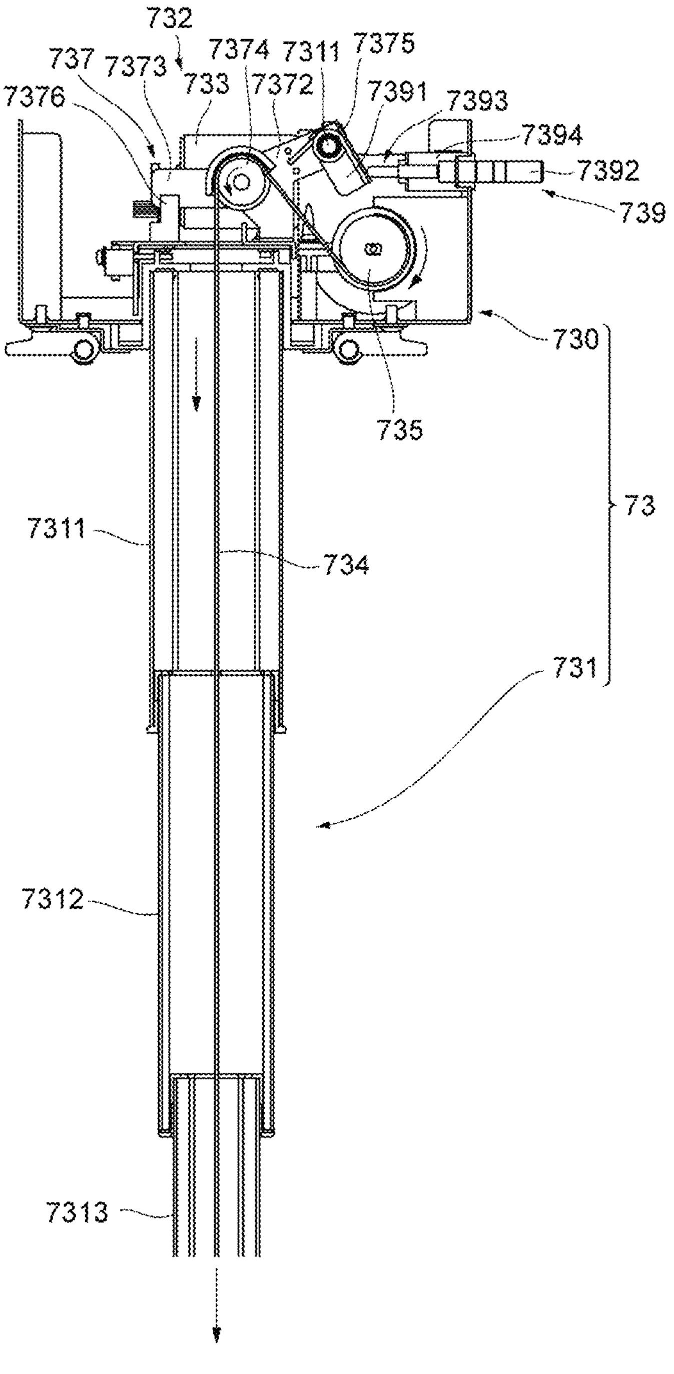
FIG. 25 is a diagram illustrating a state in which the main body of the third drive unit approaches a prize when the biasing force applied by a biasing force adjustment part of the prize acquisition game device according to one or more embodiments is in a weak spring state.
Figure 26:
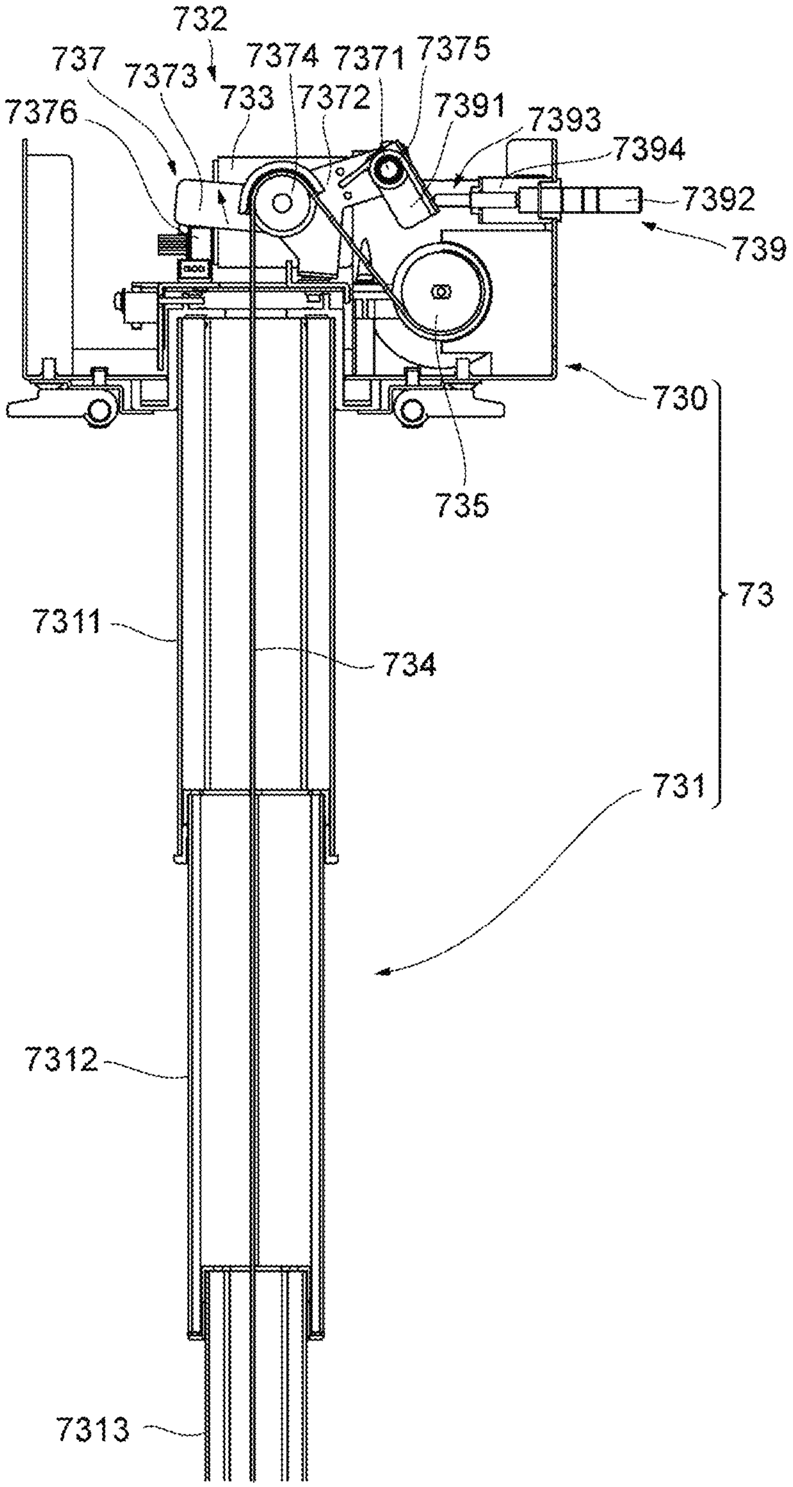
FIG. 26 is a diagram illustrating a state in which the main body of the third drive unit comes into contact with a prize when the biasing force applied by a biasing force adjustment part of the prize acquisition game device according to one or more embodiments is in a weak spring state.

On the other hand, when the adjustment knob 7392 is turned backward to retract the distal end portion 7393, the movable control plate member 7391 returns toward the adjustment knob 7392 as shown in FIGS. 25 and 26, and the biasing force of the coil spring 7375 decreases to create a "weak spring" state. In view of this, the biasing force of the coil spring 7375 that biases the swing arm 7372 in the lifting direction of the prize acquisition unit 6 is reduced and, as a result, there is also a reduction in the biasing force in the lifting direction that is exerted on the prize acquisition unit 6 itself via the swing arm 7372 and the wire 734.

Also, there is a prize acquisition game device with which the size or number of arms 61 can be freely changed in response to changes in the shape and size of the prize, changes in the layout, changes in the position of the prize drop opening 5, and so forth. Changing the size and number of the arms 61 changes the weight of the prize acquisition unit 6. If the weight of the prize acquisition unit 6 changes, the pressing force acting on the prize from the prize acquisition unit 6 can be adjusted by appropriately changing the biasing force of the coil spring 7375.

The approach stop sensor 7376 is a sensor that can send the control unit 15 a request to stop the approach movement of the main body 60 based on the detected state of the Z direction dog 7373 when the main body 60 is undergoing approach movement. More specifically, when the main body 60 continues its approach movement and the bottom part 67 of the main body 60 does not come into contact with a prize, the force in the Z direction descent direction exerted on the wire 734 is greater than the force in the Z direction ascent direction exerted on the wire 734. In this case, the force exerted on the wire 734 in the Z direction descent direction is the combined weight consisting of the weight of the main body 60, the weight of some or all of the pipes 7311, 7312, 7313, and 7314, and some of the weight of the cable 64. The force exerted on the wire 734 in the Z direction ascent direction is a biasing force in the lifting direction produced by the coil spring 7375. Therefore, the wire 734 is in a taut state as shown in FIG. 25 or FIG. 27. In this case, a Z direction dog 7373 is located to the rear of the approach stop sensor 7376 as shown in FIGS. 24, 25, and 27. Therefore, since the approach stop sensor 7376 detects the Z direction dog 7373, a request to stop the approach movement of the main body 60 is not sent to the control unit 15. As a result, under the control of the control unit 15, the third motor 733 continues to drive the wire winding pulley 735, so the main body 60 continues its approach movement.

On the other hand, when the bottom part 67 of the main body 60 makes contact with a prize and presses against the prize with a specific pressure, the force exerted on the wire 734 in the Z direction descent direction is less than the force exerted on the wire 734 in the Z direction ascent direction. In this case, the force exerted on the wire 734 in the Z direction descent direction is the combined weight consisting of the weight of the main body 60, the weight of some or all of the pipes 7311, 7312, 7313, and 7314, and some of the weight of the cable 64. On the other hand, the force exerted on the wire 734 in the Z direction ascent direction is a combination of the biasing force in the lifting direction by the coil spring 7375 and the reaction force against the above-mentioned total weight attributable to the prize. Therefore, the tension applied to the wire 734 is relaxed, as shown in FIG. 26 or 28. Then, the action of the coil spring 7375 causes the Z direction dog 7373 to swing upward along with the swing arm 7372. Consequently, the approach stop sensor 7376 can no longer detect the Z direction dog 7373, and a request to stop the approach movement of the main body 60 is sent to the control unit 15. As a result, under the control of the control unit 15, the third motor 733 stops driving the wire wind-up pulley 735, so the approach movement of the main body 60 is stopped. Also, immediately after the approach movement of the main body 60 is stopped, under the control of the control unit 15, the third motor 733 resumes driving the wire winding pulley 735, and the main body 60 moves a first distance in the retreat direction while maintaining contact between its bottom part and the prize, and then stops, so as to reduce the pressure that the main body 60 exerts on the prize to a specific value.

The ascent stop sensor is a sensor for detecting whether or not the main body 60 has returned to a specific point located above in the Z direction (for example, an approach starting point or an arbitrary point in the specific plane 601). When it has been detected that the main body 60 has returned to a specific point above in the Z direction, the ascent stop sensor sends a request to the control unit 15 to stop the ascent movement of the main body 60. As a result, under the control of the control unit 15, the third motor 733 stops driving the wire wind-up pulley 735, so the ascent movement of the main body 60 is stopped. On the other hand, when it is not detected that the main body 60 has returned to a specific point above in the Z direction, the ascent stop sensor does not send a request to the control unit 15 to stop the approach movement of the main body 60. As a result, under the control of the control unit 15, the third motor 733 continues to drive the wire wind-up pulley 735, so the ascent movement of the main body 60 continues.

In the following description, the X direction origin sensor 715, the three X direction position sensors 714, the Y direction origin sensor 725, and the three Y direction position sensors 724 of the drive unit 7 may be collectively referred to as "position sensors," the first motor 712, the second motor 722, and the third motor 733 may be collectively referred to as a "motor," and the first encoder 713 and the second encoder 723 may be collectively referred to as an "encoder."

Details of Control Unit 15

Figure 29:
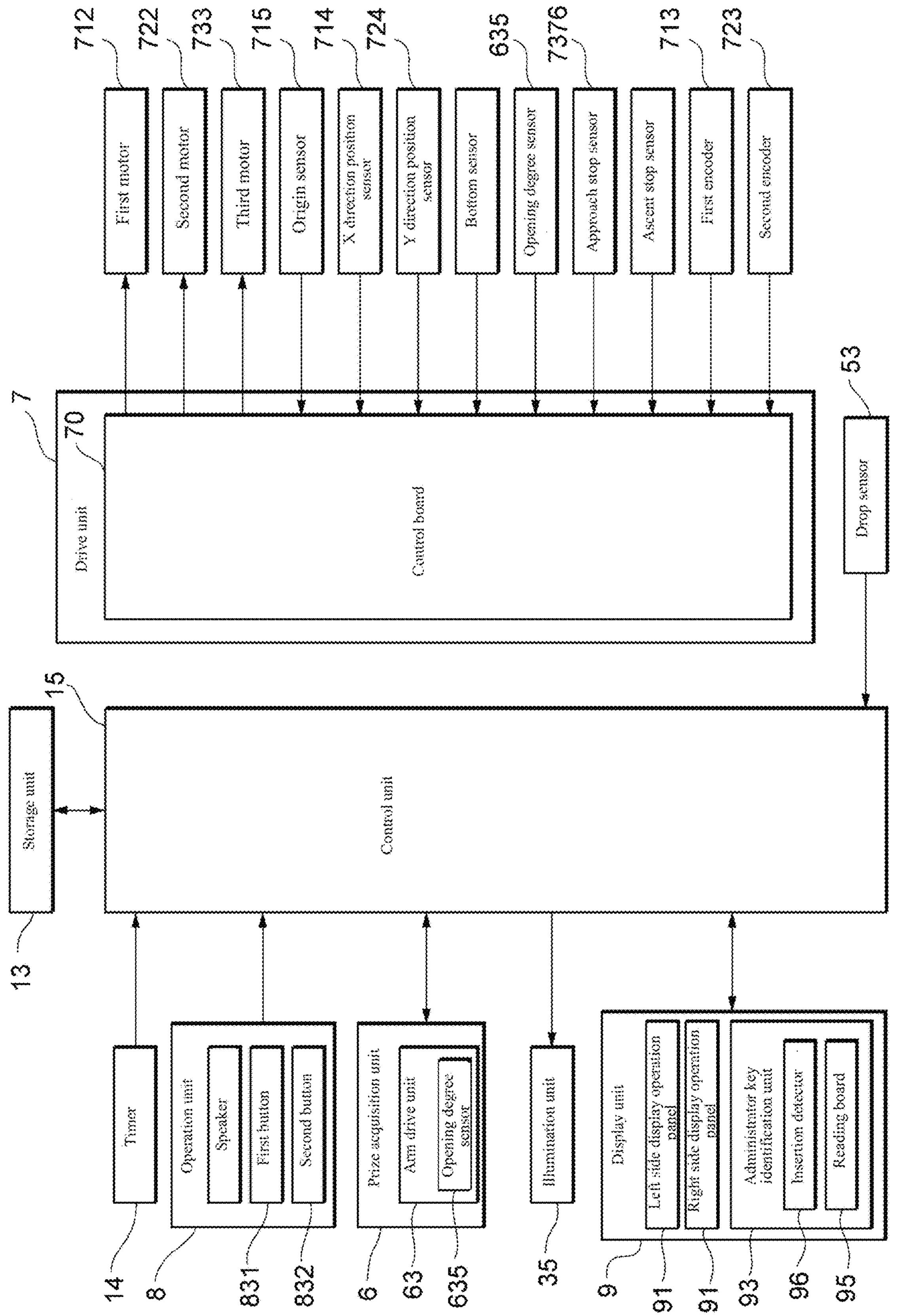
FIG. 29 is a diagram illustrating the functional configuration of a control unit of the prize acquisition game device according to one or more embodiments.
Figure 30:
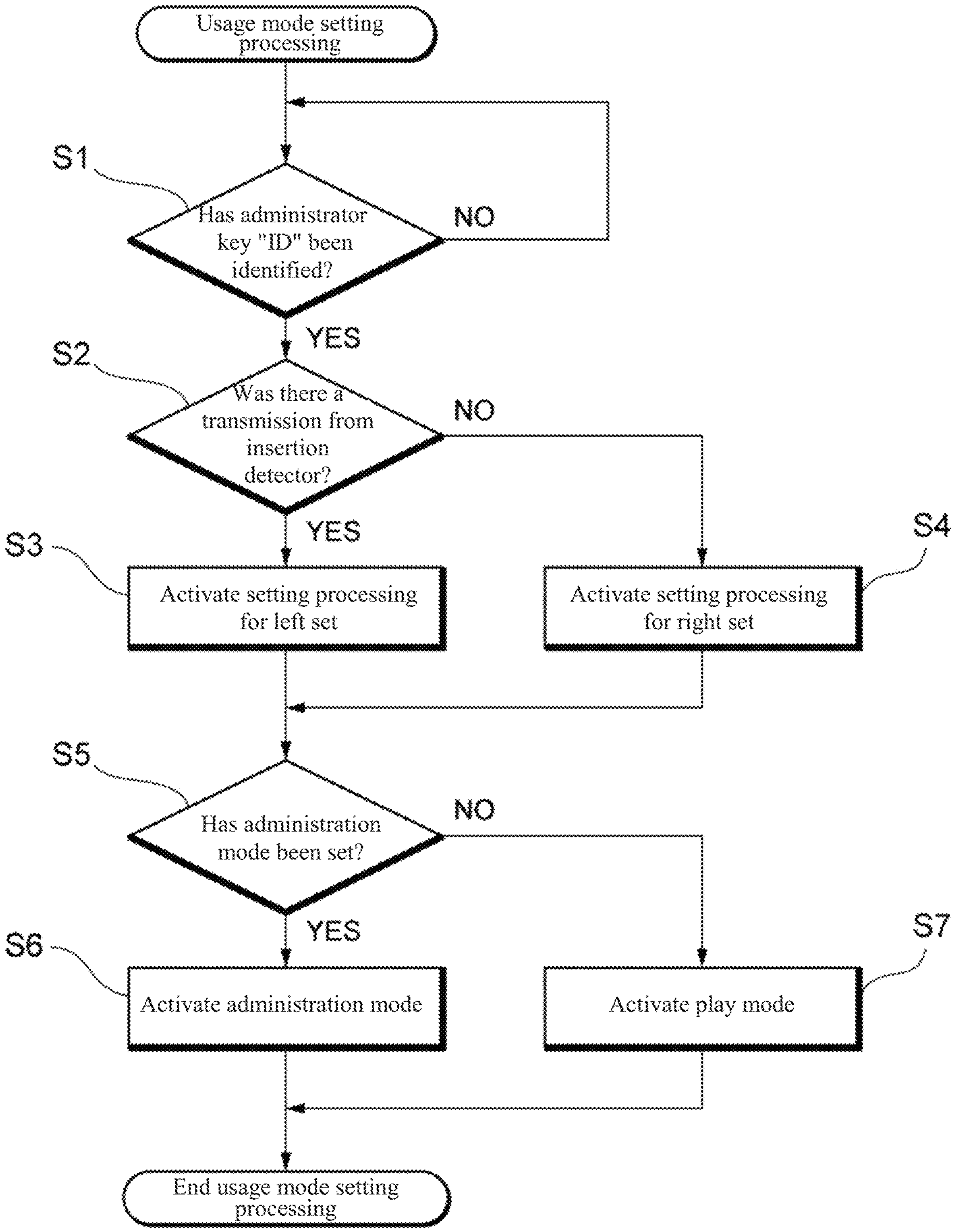
FIG. 30 is a flowchart illustrating the usage mode setting processing control performed by the control unit of the prize acquisition game device according to one or more embodiments.
Figure 31:
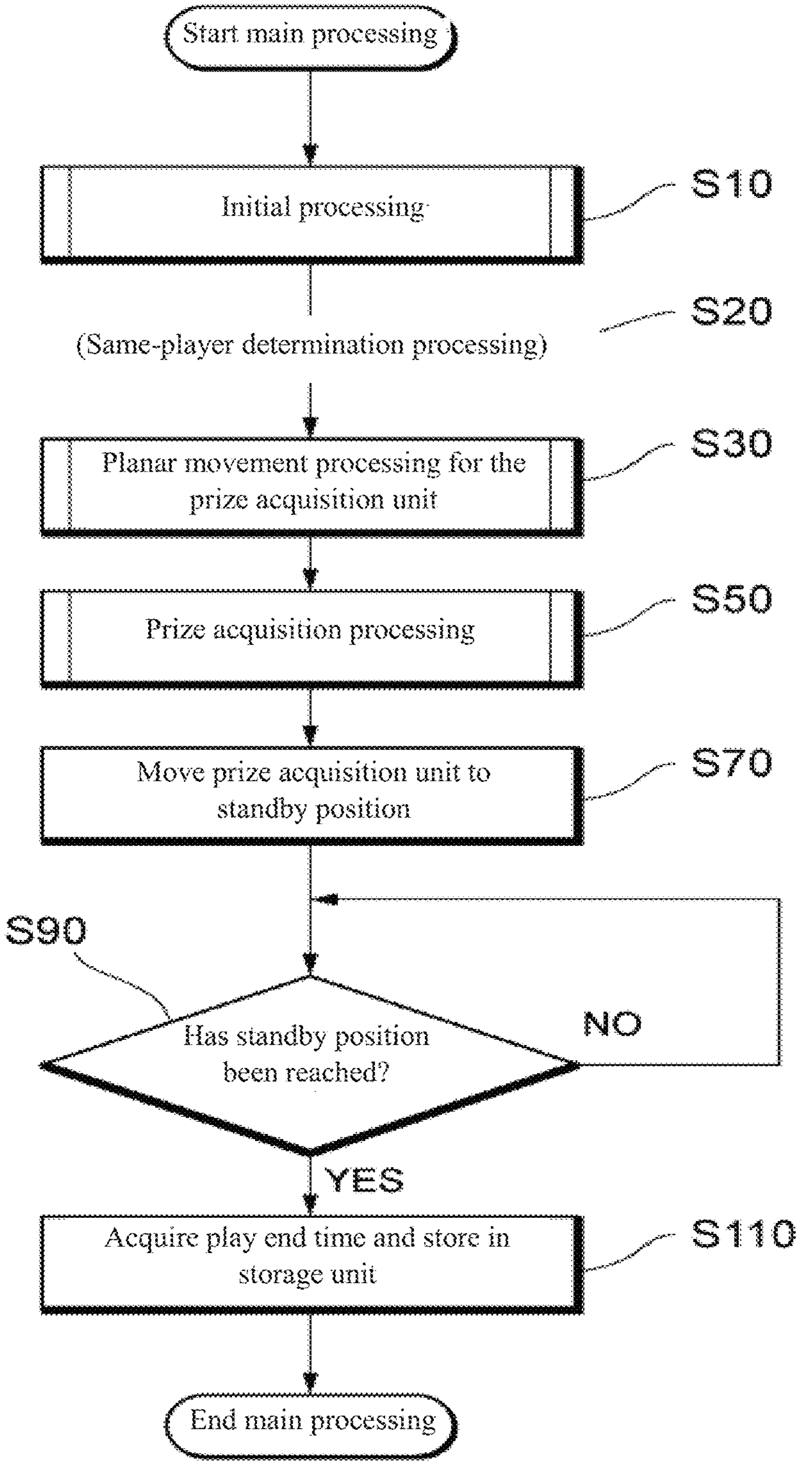
FIG. 31 is a flowchart illustrating the main processing control of the prize acquisition game performed by the control unit of the prize acquisition game device according to one or more embodiments.

Next, the control unit 15 will be described in detail with reference to FIGS. 29 to 36. FIG. 29 is a diagram illustrating the functional configuration of the control unit 15. FIG. 30 is a flowchart illustrating the usage mode setting processing control performed by the control unit 15. FIG. 31 is a flowchart illustrating the main processing control of the prize acquisition game performed by the control unit 15. FIGS. 32 to 35 are flowcharts illustrating the details of steps S10, S20, S30, and S50 in FIG. 31. FIG. 36 is a flowchart illustrating the details of step S56 in FIG. 35.

Functional Configuration of Control Unit 15

As shown in FIG. 29, the control unit 15 is connected to the storage unit 13, the timer 14, the operation unit 8, the display unit 9, the prize acquisition unit 6, the illumination unit 35, the control board 70 of the drive unit 7, and the drop detector 53. Also, the control unit 15 is connected to the sensors of the prize acquisition unit 6 and the position sensors, motors, and encoders of the drive unit 7 via a connection to the control board 70. In this way, when the control unit 15 detects that a specific play fee has been inserted into the coin insertion slot 10 by the user, or that the ID of the administrator key K has been identified, its control of the above components begins.

More specifically, upon receiving a movement request inputted by the user via the first button 831 and the second button 832 of the operation unit 8 or the display and operation panel 91 of the display unit 9, as well as time information acquired by the timer 14, the control unit 15 then drives the arm drive unit 63 of the prize acquisition unit 6 and the motors of the drive unit 7 based on the data and instructions such as programs stored in the storage unit 13, causing the main body 60 of the prize acquisition unit 6 to move (planar movement and the Z direction movement) and the pair of arms 61 to open and close, thereby carrying out a prize acquisition game. Here, in the movement of the main body 60, the control unit 15 causes the main body 60 to perform planar movement and then Z direction movement, for example. Also, the control unit 15 executes output control of the illumination unit 35, the speaker, etc., in order to output lighting effects or sound effects according to the progress of the prize acquisition game, etc.

Also, the control unit 15 can receive play information for each of the multiple plays on the prize acquisition unit 6 moved by the second method or movement information for the prize acquisition unit 6 moved by the first method, respectively transmitted from the position sensors of the drive unit 7, the drop detector 53, the opening degree sensor 635 of the arm drive unit 63, the insertion detector 96 of the administrator key identification unit 93 of the display unit 9, and the timer 14, and store this information in the storage unit 13.

Here, the play information includes movement information and play history corresponding to each play. The movement information is information acquired by the position sensors and encoders of the drive unit 7 about past movements of the prize acquisition unit 6 that was moved by the first method and second method in the game space S. The play history includes the time at which each play was performed, which is acquired by the timer 14, whether or not a prize was acquired corresponding to each play, which was acquired by the drop detector 53, the number of consecutive plays to acquire one prize, the number of prizes obtained through continuous play, and so forth.

Also, the control unit 15 can perform a first pressure adjustment to adjust the pressure applied to the prize or the prize support unit 40 by the arms 61, or a second pressure adjustment to adjust the pressure applied to the prize by the main body 60, on the basis of the contact state between the prize acquisition unit 6 and the prize or the prize support unit 40. The control unit 15 performs the first pressure adjustment when the arms 61 of the prize acquisition unit 6 have moved beyond a specific threshold value. Also, the control unit 15 performs the second pressure adjustment when the bottom part of the main body 60 presses against the prize with a specific pressure. The first pressure adjustment is for reducing the pressure applied by the arms 61 to the prize or the prize support unit 40 by stopping the approach movement of the main body 60. The second pressure adjustment is for reducing the pressure applied by the main body 60 to the prize by stopping the approach movement of the main body 60, then moving the main body 60 a first distance in the retreat direction, and then stopping it.

Also, the control unit 15 can determine the first distance so as to reduce the pressure applied by the main body 60 to the prize to a specific value while maintaining contact between the bottom part 67 of the main body 60 and the prize, depending on the type of prize.

Control by Control Unit 15

Next, an example of control of the prize acquisition game by the control unit 15 will be described in detail with reference to FIG. 1 and FIGS. 30 to 36. Depending on the settings, the control unit 15 can control different prize acquisition games.

The control unit 15 performs usage mode setting processing (that is, setting to either administration mode or player mode), and then executes main processing for implementing the prize acquisition game in the set usage mode.

First, the usage mode setting processing performed by the control unit 15 will be described with reference to FIG. 30.

In the usage mode setting processing, the control unit 15 first determines whether the ID of the administrator key has been identified on the basis of whether there has been a transmission from the reading board 95 of the administrator key identification unit 93 (step S1). If it is determined that the ID of the administrator key has been identified (Yes in step S1), the control unit 15 determines whether or not there has been a transmission from the insertion detector 96 of the administrator key identification unit 93 (step S2). If it is determined that there has been a transmission from the insertion detector 96 (Yes in step S2), the control unit 15 activates setting processing for the left set of the prize acquisition game device 1 (step S3). Then, the control unit 15 determines whether or not the administration mode has been set (step S5). If it is determined that the administration mode has been set (Yes in step S5), the control unit 15 activates the administration mode (step S6) and ends the usage mode setting processing.

On the other hand, if it is determined that the ID of the administrator key has not been identified (No in step S1), the control unit 15 returns to the processing to step S1. If it is determined that there has been no transmission from the insertion detector 96 (No in step S2), the control unit 15 activates setting processing for the right set of the prize acquisition game device 1 (step S4). If it is determined that the administration mode has not been set (No in step S5), the control unit 15 activates the player mode (step S7) and ends the usage mode setting processing.

Next, the main processing performed by the control unit 15 will be described with reference to FIGS. 31 to 36.

Step S10

First, the control unit 15 performs initialization processing (step S10).

Figure 32:
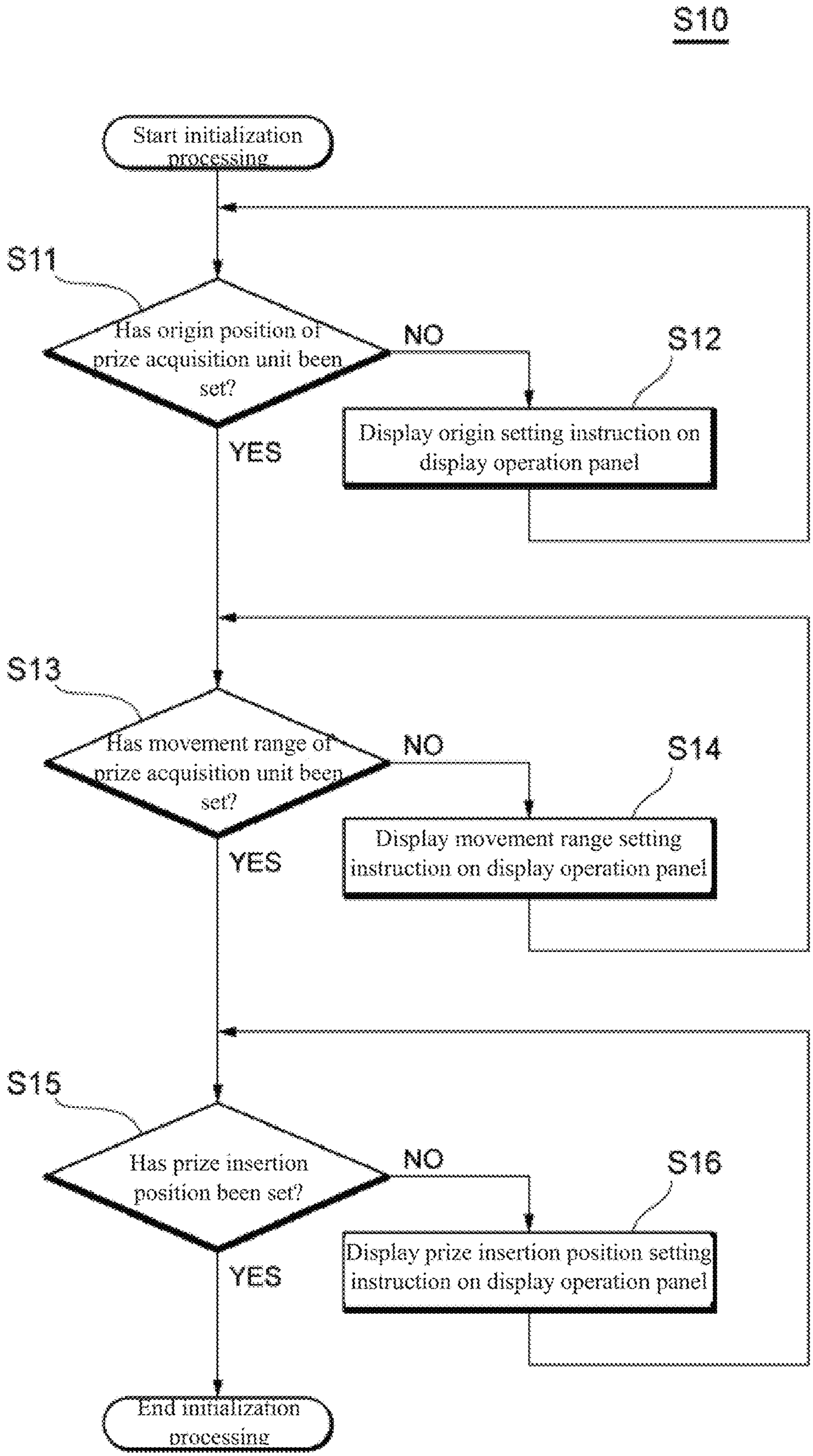
FIG. 32 is a flowchart illustrating the details of step S10 in FIG. 31.

In step S10, as shown in FIG. 32, the control unit 15 first determines whether or not the origin position of the prize acquisition unit 6 has been set (step S11). If it is determined that the origin position of the prize acquisition unit 6 has been set (Yes in step S11), the control unit 15 determines whether or not the movement range of the prize acquisition unit 6 has been set (step S13). If it is determined that the movement range of the prize acquisition unit 6 has been set (Yes in step S13), the control unit 15 determines whether or not the prize insertion position of the prize acquisition unit 6 has been set (step S15). If it is determined that the prize insertion position of the prize acquisition unit 6 has been set (Yes in step S15), the control unit 15 terminates the initialization process.

On the other hand, if it is determined that the origin position of the prize acquisition unit 6 has not been set (No in step S11), the control unit 15 displays an origin setting instruction on the display and operation panel 91 (step S12). In this case, the administrator can manually move the prize acquisition unit 6 to the standby position using the first method based on the origin setting instruction. When the prize acquisition unit 6 stops at its standby position, the X direction origin sensor 715 and the Y direction origin sensor 725 of the drive unit 7 acquire the coordinates of the standby position of the prize acquisition unit 6 and send them to the control unit 15. The control unit 15 then sets the standby position as the origin and stores this information in the storage unit 13, and the processing moves on to step S13.

Similarly, if it is determined that the movement range of the prize acquisition unit 6 has not been set (No in step S13), the control unit 15 displays on the display and operation panel 91 an instruction to set the movement range (step S14). In this case, the administrator can manually move the prize acquisition unit 6 along the desired movement range by the first method based on an instruction to set the movement range. Then, the X direction position sensor 714, the Y direction position sensor 724, the first encoder 713, and the second encoder 723 of the drive unit 7 acquire the coordinates of points on the movement path and transmit these to the control unit 15. The control unit 15 then stores the movement range information in the storage unit 13, and the processing moves on to step S15.

Also, if it is determined that the prize insertion position of the prize acquisition unit 6 has not been set (No in step S15), the control unit 15 displays on the display and operation panel 91 an instruction to set the prize insertion position (step S104). In this case, the administrator can manually move the prize acquisition unit 6 to the desired prize insertion position by the first method based on the instruction to set the prize insertion position. Then, the X direction position sensor 714, the Y direction position sensor 724, the first encoder 713, and the second encoder 723 of the drive unit 7 acquire the coordinates of points on the movement path and transmit these to the control unit 15. Then, the control unit 15 stores the prize insertion position information in the storage unit 13, and then terminates the initialization process.

Step S20

The description will now return to FIG. 31. When the play mode is selected in the usage mode setting processing, the control unit 15 performs same-player determination processing (step S20).

Figure 33:
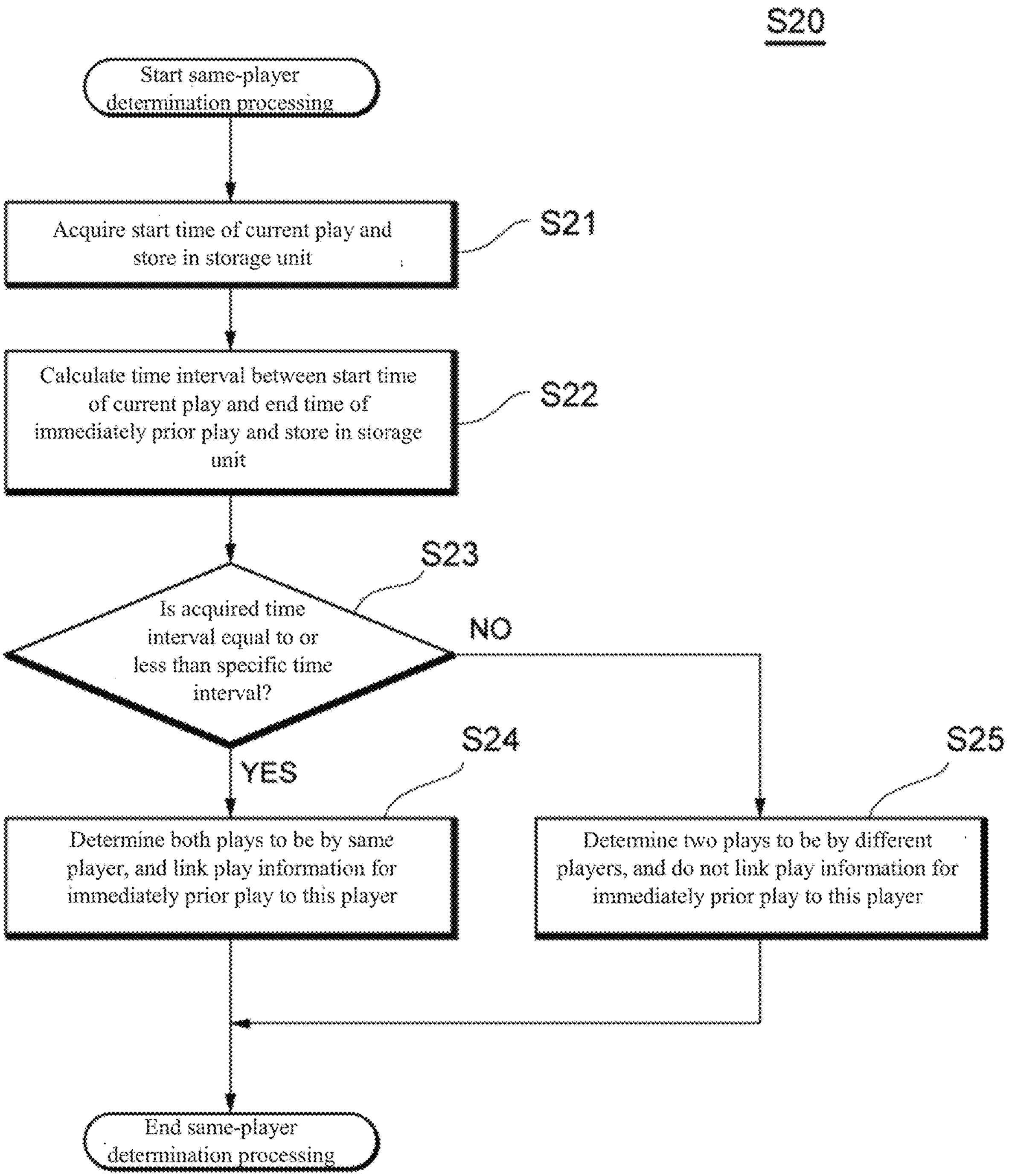
FIG. 33 is a flowchart illustrating the details of step S20 in FIG. 31.

In step S20, as shown in FIG. 33, the control unit 15 first acquires play information related to the start time of the current play and stores it in the storage unit 13 (step S21), and then calculates play information related to the time interval between the start time of the current play and the end time of the immediately prior play stored in the storage unit 13, and stores this in the storage unit 13 (step S22). Next, the control unit 15 determines whether or not the acquired time interval is less than or equal to a specific time interval (such as 60 seconds) (step S23). If it is determined that the time interval is less than or equal to the specific time interval (Yes in step S23), the control unit 15 determines that both plays were done by the same person, links the play information for the immediately prior play, or play information linked to the play information for the immediately prior play, to this player (step S24), and ends the same-player determination processing.

On the other hand, if it is determined that the specific time interval has been exceeded (No in step S23), the control unit 15 determines that the two plays were not done by the same person, and ends the same-player determination processing without linking to the same player the play information for the immediately prior play, or the play information linked to the play information for the immediately prior play (step S25).

Step S30

The description will now return to FIG. 31. Next, the control unit 15 performs planar movement processing for the prize acquisition unit 6 (step S30).

Figure 34:
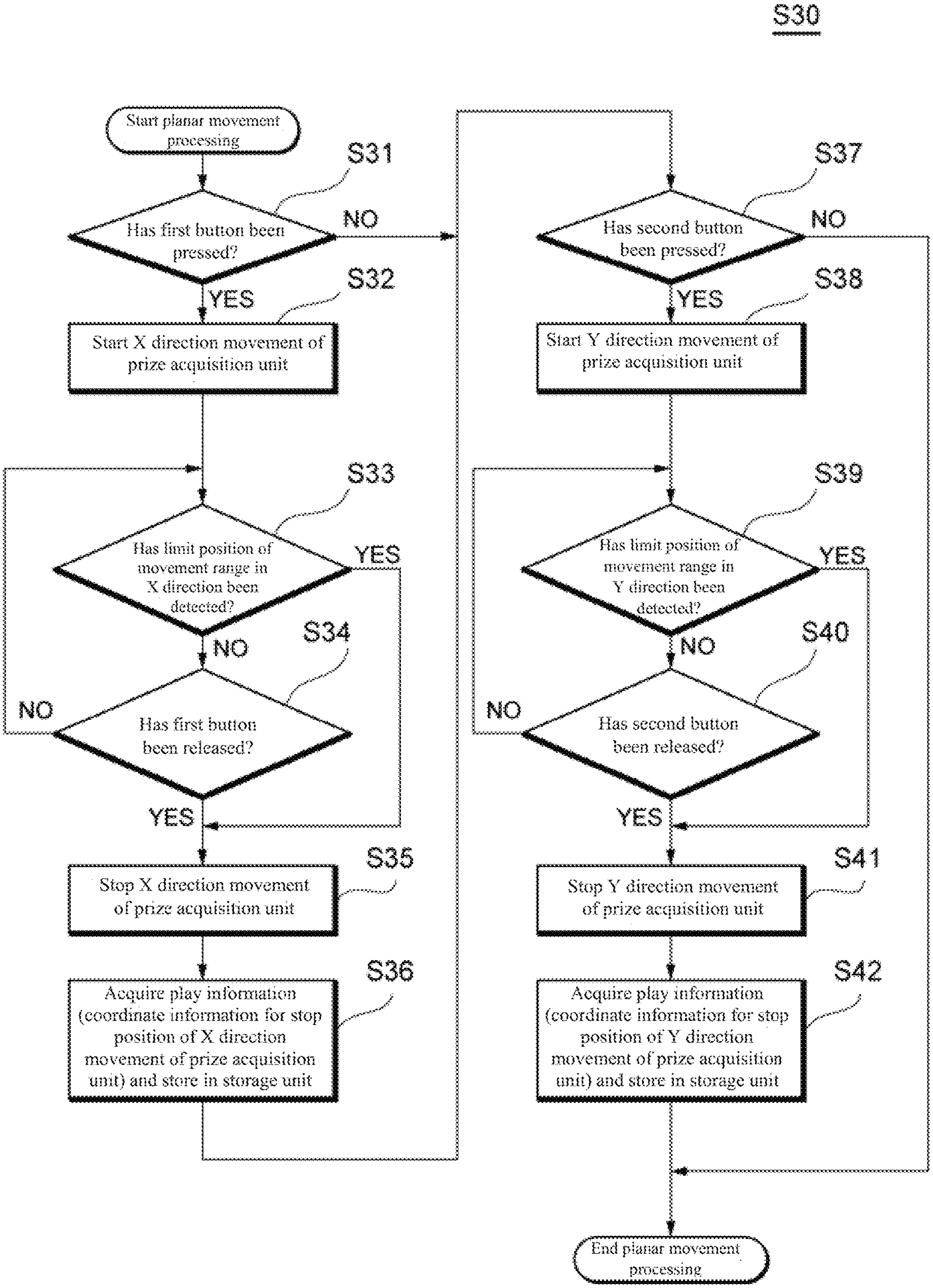
FIG. 34 is a flowchart illustrating the details of step S30 in FIG. 31.

In step S30, the control unit 15 first moves the prize acquisition unit 6 in the X direction, as shown in FIG. 34. More specifically, the control unit 15 determines whether or not the first button 831 has been pressed by the player (step S31). If it is determined that the first button 831 has been pressed by the player (Yes in step S31), the control unit 15 actuates the first motor 712 based on the operation signal from the first button 831 to start moving the prize acquisition unit 6, which was located at the standby position (origin), in the X direction (step S32). Next, the control unit 15 determines whether or not the prize acquisition unit 6 has moved to the limit position of its movement range in the X direction based on a movement limit detection signal from the X direction dog 716 (step S33). If it is determined that the prize acquisition unit 6 has not moved to the limit position of its movement range in the X direction (No in step S33), the control unit 15 determines whether or not the player has released the first button 831 (step S34). If it is determined that the player has released the first button 831 (Yes in step S34), the control unit 15 stops the movement of the prize acquisition unit 6 in the X direction (step S35). After step S35 is performed, the prize acquisition unit 6 is located at the stop position of its movement in the X direction, that is, at the direction change point. The control unit 15 then acquires the play information sent by the position sensors and encoders of the drive unit 7, that is, the coordinate information for the direction change point, and stores this in the storage unit 13 (step S36).

After this, the control unit 15 causes the prize acquisition unit 6 to move in the Y direction. More specifically, the control unit 15 determines whether or not the second button 832 has been pressed by the player (step S37). If it is determined that the second button 832 has been pressed by the player (Yes in step S37), the control unit 15 actuates the second motor 722 based on the operation signal from the second button 832 to start moving the prize acquisition unit 6, which is located at the direction change point, in the Y direction (step S38). Next, the control unit 15 determines whether or not the prize acquisition unit 6 has moved to the limit position of its movement range in the Y direction based on the movement limit detection signal from the Y direction dog 726 (step S39). If it is determined that the prize acquisition unit 6 has not moved to the limit position of its movement range in the Y direction (No in step S39), the control unit 15 determines whether or not the player has released the second button 832 (step S40). If it is determined that the player has released the second button 832 (Yes in step S40), the control unit 15 stops the movement of the prize acquisition unit 6 in the Y direction (step S41). After step S41 is performed, the prize acquisition unit 6 is located at the stop position of its movement in the Y direction, that is, at the approach starting point. The control unit 15 then acquires the play information sent by the position sensors and encoders of the drive unit 7, that is, the coordinate information for the approach starting point, stores this in the storage unit 13 (step S42), and ends the planar movement processing.

On the other hand, in the above planar movement processing, if it is determined that the first button 831 has not been pressed by the player (No in step S31), the control unit 15 moves the processing to step S37. If it is determined that the prize acquisition unit 6 has moved to the limit position of its movement range in the X direction (Yes in step S33), the control unit 15 moves the processing to step S35. If it is determined that the player has not released the first button 831 (No in step S34), the control unit 15 returns the processing to step S33. If it is determined that the second button 832 has not been pressed by the player (No in step S37), the control unit 15 ends the planar movement processing. If it is determined that the prize acquisition unit 6 has moved to the limit position of its movement range in the Y direction (Yes in step S39), the control unit 15 moves the processing to step S41. If it is determined that the player has not released the second button 832 (No in step S40), the control unit 15 returns the processing to step S39.

Step S50

The description will now return to FIG. 31. Once the planar movement processing for the prize acquisition unit 6 is ended, the control unit 15 performs prize acquisition processing for the prize acquisition unit 6 (step S50).

Figure 35:
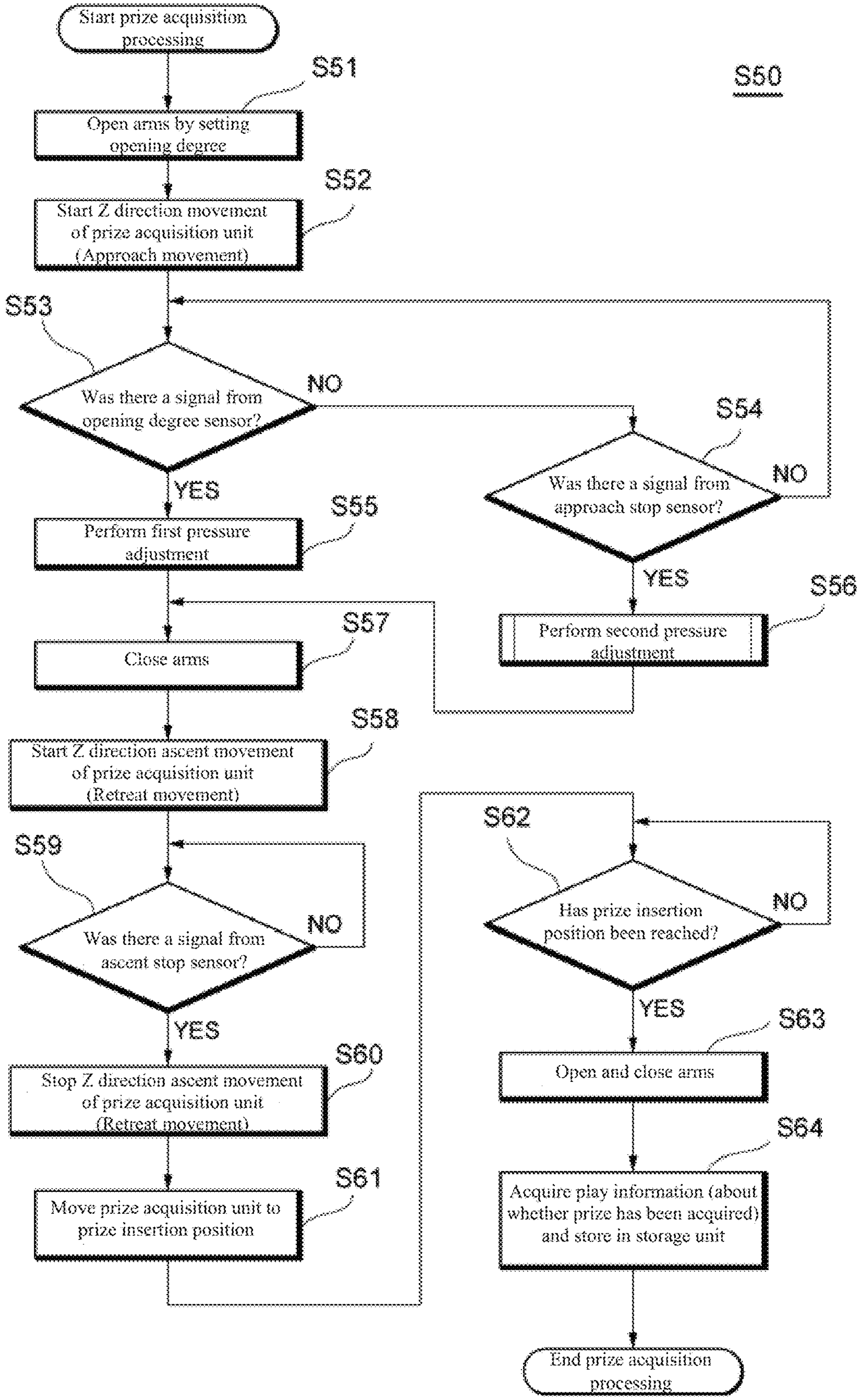
FIG. 35 is a flowchart illustrating the details of step S50 in FIG. 31.
Figure 36:
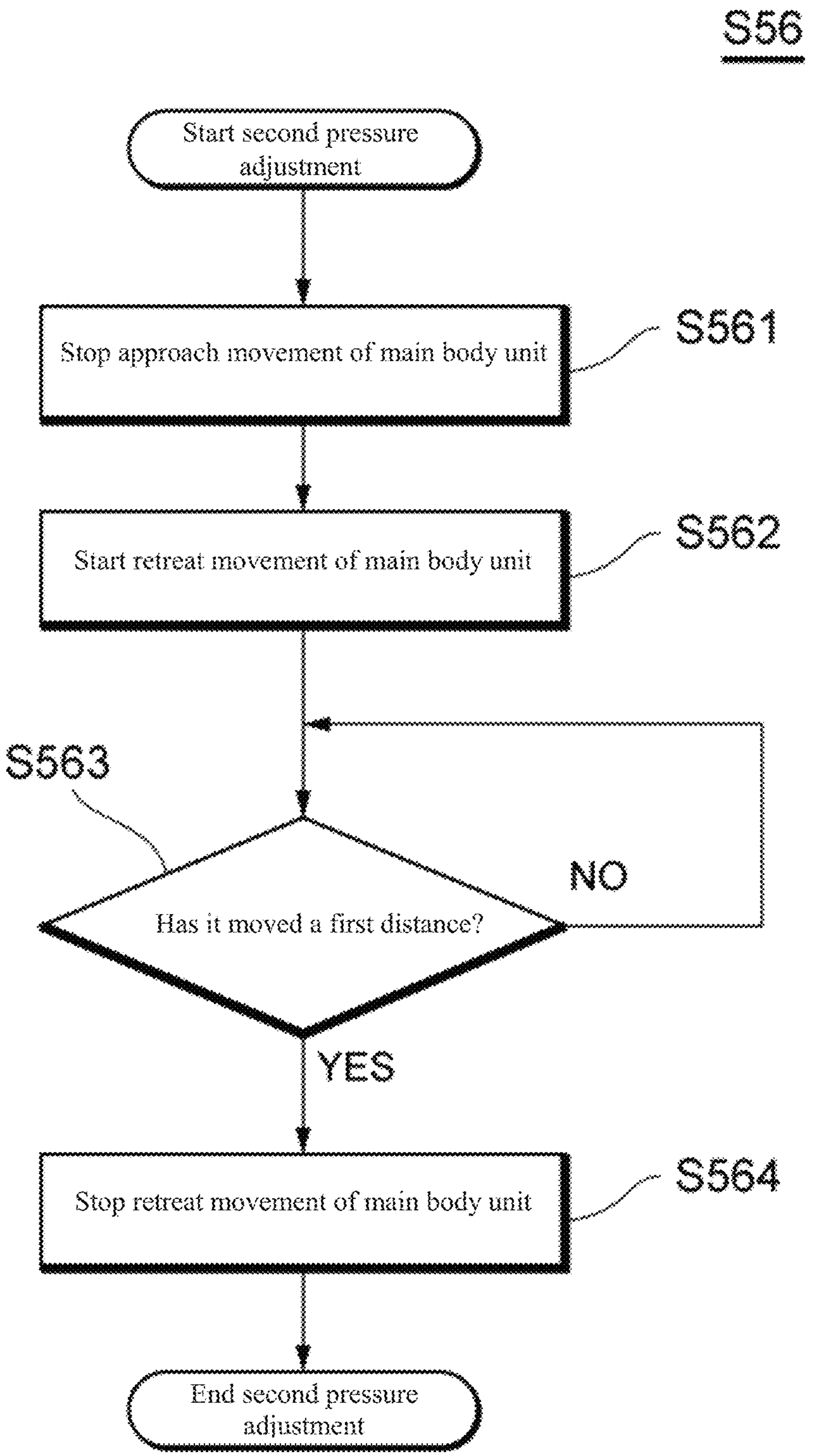
FIG. 36 is a flowchart illustrating the details of step S56 in FIG. 35.

In step S50, as shown in FIG. 35, the control unit 15 first adjusts the approach movement of the prize acquisition unit 6, the opening and closing of the arms 61, and the pressure. More specifically, the control unit 15 actuates the arm drive unit of the prize acquisition unit 6 to open the pair of arms 61 of the prize acquisition unit 6 at the approach starting point by a set degree of opening (step S51). Then, the control unit 15 actuates the third motor 733 to start the Z direction descent direction movement of the prize acquisition unit 6, that is, approach movement (step S52). Next, the control unit 15 determines whether or not there is a detection signal from the opening degree sensor 635 indicating that the arms 61 have moved beyond a specific threshold value due to contact with a prize or the prize support unit 40 (step S53). If it is determined that there is a detection signal from the opening degree sensor 635 (Yes in step S53), the control unit 15 performs a first pressure adjustment to reduce the pressure applied by the arms 61 to the prize or the prize support unit 40 (step S55). In step S55, the control unit 15 stops the approach movement of the prize acquisition unit 6. The control unit 15 then actuates the arm drive unit of the prize acquisition unit 6 to close the pair of arms 61, thereby causing the prize to be grasped (step S57).

The control unit 15 then causes the prize acquisition unit 6 to move to the prize insertion position. More specifically, after closing the pair of arms 61, the control unit 15 actuates the third motor 733 to start the Z direction ascent direction of the prize acquisition unit 6, that is, retreat movement (step S58). Next, the control unit 15 determines whether or not the prize acquisition unit 6 has moved to the limit position of its movement range in the Z direction on the basis of whether there is a request to stop the ascent movement from the ascent stop sensor (step S59). If it is determined that there is a request from the ascent stop sensor to stop the ascent movement (Yes in step S59), the control unit 15 stops the Z direction ascent direction movement of the prize acquisition unit 6 (retreat movement) (step S60). Next, the control unit 15 actuates the second motor 722 and then the first motor 712 to move the prize acquisition unit 6 toward the prize insertion position (step S61). In step S61, the control unit 15 causes the prize acquisition unit 6 to move in the Y direction and the X direction. The control unit 15 then determines whether the prize acquisition unit 6 has reached the prize insertion position (step S62). If it is determined that the prize acquisition unit 6 has reached the prize insertion position (Yes in step S62), the control unit 15 actuates the arm drive unit of the prize acquisition unit 6 to open and then close the pair of arms 61 (step S63).

Here, if the pair of arms 61 have grasped the prize in step S57, the pair of arms 61 are opened in step S63 to drop the prize through the first drop opening 51. When the prize drops, the prize passes through the second drop opening 52 and is temporarily accommodated in the prize accommodating unit 11. Also, the prize is detected by the drop detection sensor 53 upon passing through the second drop opening 52. Consequently, it can be detected whether or not a prize is acquired in each play. The control unit 15 then acquires play information, which is sent by the drop detector 53, related to information about whether or not a prize has been acquired, stores this in the storage unit 13 (step S64), and ends the prize acquisition processing. At this point the control unit 15 ends the main processing.

On the other hand, if it is determined that there is no detection signal from the opening degree sensor 635 (No in step S53), the control unit 15 determines whether or not there is a detection signal from the approach stop sensor 7376 that indicates that the bottom part 67 of the main body 60 has come into contact with the prize and is pressing against the prize with a specific pressure (step S54). If it is determined that there is a detection signal from the approach stop sensor 7376 (Yes in step S54), the control unit 15 performs a second pressure adjustment to reduce the pressure applied to the prize by the main body 60 (step S56). In step S56, as shown in FIG. 36, the control unit 15 stops the approach movement of the main body 60 (step S561), and then starts the retreat movement of the main body 60 (step S562). Next, the control unit 15 determines whether or not the main body 60 has moved a first distance in the retreat direction (step S563). In step S563, the control unit 15 determines the first distance so as to reduce the pressure applied by the main body 60 to the prize to a specific value while maintaining contact between the bottom part 67 of the main body 60 and the prize, depending on the type of prize. If it is determined that the main body 60 has moved the first distance in the retreat direction (Yes in step S563), the control unit 15 stops the retreat movement of the main body 60 (step S564) and ends the second pressure adjustment. On the other hand, if it is determined that the main body 60 has not moved the first distance in the retreat direction (No in step S563), the control unit 15 returns the processing to step S563.

If it is determined that there is not a request from the ascent stop sensor to stop the ascent movement (No in step S59), the control unit 15 returns the processing to step S59. If it is determined that the prize acquisition unit 6 has not reached the prize insertion position (No in step S62), the control unit 15 returns the processing to step S62.

Steps S70, 90, and 110

The description will now return to FIG. 31. Once the prize acquisition processing of the prize acquisition unit 6 is ended, the control unit 15 moves the prize acquisition unit 6 to the standby position (step S70). After this, the control unit 15 determines whether or not the prize acquisition unit 6 has arrived at the standby position (step S90). If it is determined that the prize acquisition unit 6 has arrived at the standby position (Yes in step S90), the control unit 15 acquires the end time of the play, stores this in the storage unit 13 (step S110), and ends the main processing. On the other hand, if it is determined that the prize acquisition unit 6 has not arrived at the standby position (No in step S90), the control unit 15 returns the processing to step S90.

The prize support unit 40 for configuring the prize display unit 3 of the prize acquisition game device 1 according to the embodiments described above comprises a main body 41 that directly or indirectly supports prizes, and couplers 42 that are disposed around the periphery of the main body 41 and link the prize support units together; wherein each coupler 42 has a rotary body 43 that is rotatable with respect to the main body 41, and a support 44 that sandwiches and supports the rotary body 43 from both sides in the thickness direction of the rotary body 43 while guiding the rotation of the rotary body 43; the rotary body 43 has a first part 432, which is a raised part or a recessed part, that is provided on a first surface 431 on at least one side in the thickness direction, a first support 45 of the support 44 has a second part 452, which is a recessed part or a raised part corresponding to the first part 432, that is provided on a second surface 451 opposite the first surface 431, the first part 432 and the second part 452 are rotatably engaged, and the first part 432 is configured such that, by the rotation of the rotary body 43, one portion thereof maintains engagement with the second part 452 and another portion thereof can engage with the second part 452 of another prize support unit 40. As a result, the prize support units can be linked together with a simple structure without using any screws, thereby improving the productivity of the linking work. More specifically, when linking work is performed using this configuration, fewer components are needed in the linking work than when screws are used to perform the linking work, so the linking work can be simplified, which reduces the amount of work and cost entailed by the linking work. As a result, the productivity of the linking work can be improved.

Also, in the prize support unit 40 according to the embodiments described above, the configuration may be such that the first part 432 has a first side surface 4321, and the second part 452 has a second side surface 4521 that contacts the first side surface 4321, and when the first surface 431 is seen in plan view, the plan view shapes of the first side surface 4321 and the second side surface 4521 are each arc-shaped, and the first part 432 is rotatable relative to the second part 452 when the first side surface 4321 slides along the second side surface 4521. As a result, the second part 452 can be used as a component that guides the rotation of the first part 432, thereby simplifying the configuration of the couplers 42.

Also, in the prize support unit 40 according to the embodiments described above, the configuration may be such that the first support 45 of the support 44 has a holding space S2 including an opening 47 that opens into an outer peripheral surface 411, which is the side surface of the main body 41, and the rotary body 43 is positioned inside the holding space S2 such that the first surface 431 intersects the outer peripheral surface 411 such that it can, by rotating, enter and exit the holding space S2 through the opening 47. As a result, the rotary body 43 can easily enter and exit the holding space S2.

In the prize support unit 40 according to the embodiments described above, the configuration may be such that when the opening 47 is disposed so as to communicate with the opening 47 of another prize support unit 40, the plan view shape of the second side surface 4521 of the second part 452 and the plan view shape of the second side surface 4521 of the second part 452 of another prize support unit 40 are located on a single circle. As a result, the prize support units can be linked smoothly and stably.

Also, in the prize support unit 40 according to the embodiments described above, the configuration may be such that a first bottom surface stopper 435 and a first side surface stopper 436, which are examples of a first stopper that is a raised part, and a second bottom surface stopper 455 and a second side surface stopper 456, which are examples of a second stopper, are provided on the mutually opposing surfaces of the first part 432 and the second part 452, and the stoppers respectively corresponding to the first bottom surface stopper 435 and the first side surface stopper 436 and the second bottom surface stopper 455 and the second side surface stopper 456 are provided so as to come into contact with each other by the rotation of the rotary body, thereby stopping the rotation of the first part 432 relative to the second part 452. As a result, the rotation of the first part 432 can be stopped with a simple structure.

Also, in the prize support unit 40 according to the embodiments described above, the configuration may be such that the stoppers respectively corresponding to the first bottom surface stopper 435 and the first side surface stopper 436 and the second bottom surface stopper 455 and the second side surface stopper 456 are provided so as to come into contact when another portion of the first part 432 engages with the second part 452 of another prize support unit 40. As a result, the linking between the prize support units can be easily maintained.

Also, in the prize support unit 40 according to the embodiments described above, the configuration may be such that the holding space S2 has a second opening 48 that is provided on the side opposite the opening 47, and the rotary body 43 has a main body 430 including a first part 432 and a knob 437 for controlling the rotation of the main body 430; the knob 437 extends from the main body 430, through the second opening 48, to the outside of the holding space S2 and is provided so as to be able, by rotating, to come into contact with a first end part 4571 and a second end part 4572, which are the two ends of the second opening 48, and the main body 430 is configured such that when the knob 437 comes into contact with the first end part 4571 of the second opening 48, the entire main body 430 is held inside the holding space S2, and when the knob 437 comes into contact with the second end part 4572 of the second opening 48, half of the first part 432 is located outside the holding space S2 and can engage with the second part 452 of another prize support unit 40. As a result, the rotation range of the rotary body 43 and the stability of the linking between the prize support units can be adjusted with a simple structure.

The prize acquisition game device 1 of the embodiments described above comprises the prize display unit 3 having the game space S, and any one of the prize support units 40 described above that supports prizes in the game space S. As a result, the prize support units 40 can be linked together with a simple structure without using any screws, thereby improving the productivity of the linking work.

The present invention is not limited to or by the embodiments described above, and suitable design changes made to the above embodiments by a person skilled in the art are also encompassed by the scope of the present invention as long as they still have the features of the present invention. That is, the elements of the embodiments described above, as well as their arrangement, material, condition, shape, size, and the like, are not limited to the examples and may be changed as needed. Also, the elements of the embodiments described above can be combined to the extent that this is technically possible, and these combinations are also encompassed by the scope of the present invention as long as they still have the features of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . prize acquisition game device
3 . . . prize display unit
4 . . . prize support plate
6 . . . prize acquisition unit
15 . . . control unit
40 . . . prize support unit
41 . . . main body
42 . . . coupler
43 . . . rotary body
44 . . . support
45 . . . first support
47 . . . opening
48 . . . second opening
430 . . . main body
431 . . . first surface
432 . . . first part
435 . . . first bottom surface stopper
436 . . . first side surface stopper
437 . . . knob
451 . . . second surface
452 . . . second part
455 . . . second bottom surface stopper
456 . . . second side surface stopper
4321 . . . first side surface
4521 . . . second side surface
4571 . . . first end part
4572 . . . second end part
s2 . . . holding space

What is claimed is:

1. A prize support unit for a prize display case of a prize acquisition game device, comprising:
a main body that directly or indirectly supports prizes, and
couplers that are disposed around a periphery of the main body and couples the prize support unit with another prize support unit; wherein
each of the couplers comprises:
a rotary body that is rotatable with respect to the main body, and
a support that sandwiches and supports both sides of the rotary body in a thickness direction of the rotary body, and guides a rotation of the rotary body;
the rotary body has, as a first part, a raised part or a recessed part that is disposed on a first surface of the rotary body on one side in the thickness direction,
the support has, as a second part, a recessed part or a raised part that corresponds to the first part and is disposed on a second surface of the support opposite to the first surface,
the first part and the second part are rotatably engaged, and
with the rotation of the rotary body, one portion of the first part maintains engagement with the second part while another portion of the first part can engage with a second part of a support of a coupler of the other prize support unit.

2. The prize support unit according to claim 1, wherein
the first part has a first side surface,
the second part has a second side surface that contacts the first side surface, and
each of the first side surface and the second side surface has an arc shape in a plan view, and
the first part is rotatable relative to the second part with a slide of the first side surface along the second side surface.

3. The prize support unit according to claim 1, wherein
the support has a holding space including an opening formed in a side surface of the main body, and
the rotary body is positioned inside the holding space such that the first surface intersects the side surface and such that the rotary body can enter and exit the holding space through the opening with the rotation of the rotary body.

4. The prize support unit described in claim 3, wherein
the first part has a first side surface,
the second part has a second side surface that contacts the first side surface, and
once the opening communicates with an opening of the support of the other prize support unit, the second side surface of the second part and a second side surface of the second part of the other prize support unit are located on a single circle in a plan view.

5. The prize support unit according to claim 1, wherein
the first part and the second part respectively have a first stopper and a second stopper that are raised parts on mutually opposing surfaces of the first part and the second part, and
the first stopper and the second stopper come into contact with each other, with the rotation of the rotary body, and stop a rotation of the first part relative to the second part.

6. The prize support unit according to claim 5, wherein
the first stopper and the second stopper come into contact with each other once the other portion of the first part engages with the second part of the other prize support unit.

7. The prize support unit of claim 6, wherein
the support has a holding space including a first opening formed in a side surface of the main body,
the holding space further includes a second opening disposed opposite to the first opening, and
the rotary body has a main body including the first part and a knob for controlling the rotation of the main body;
the knob extends from the main body, through the second opening, to an outside of the holding space, and come into contact with one of first and second ends of the second opening with the rotation of the rotary body, and while the knob contacts the first end, the entire main body is held inside the holding space, and while the knob contacts the second end, a half of the first part is located outside the holding space and can engage with the second part of the other prize support unit.

8. A prize acquisition game device, comprising:

a prize display case that comprises a casing defining a game space and the prize support unit according to claim 1 that supports the prizes in the game space.

* * * * *